United States Patent
Ferran

(10) Patent No.: US 8,604,655 B1
(45) Date of Patent: Dec. 10, 2013

(54) MULTI-PHASE PERMANENT MAGNET BRUSHLESS DC ELECTRIC MOTOR

(71) Applicant: Electro-Mariner Corp., San Diego, CA (US)

(72) Inventor: Robert J. Ferran, San Diego, CA (US)

(73) Assignee: Electro-Mariner Corp., San Diego, CA (US)

( * ) Notice: Subject to any disclaimer, the term of this patent is extended or adjusted under 35 U.S.C. 154(b) by 0 days.

(21) Appl. No.: 13/791,203

(22) Filed: Mar. 8, 2013

Related U.S. Application Data

(60) Provisional application No. 61/705,602, filed on Sep. 25, 2012.

(51) Int. Cl.
*H02K 11/00* (2006.01)

(52) U.S. Cl.
USPC ............... 310/71; 310/179; 310/256

(58) Field of Classification Search
USPC ............ 310/71, 179–180, 184, 198, 310/156.12–156.14
See application file for complete search history.

(56) References Cited

U.S. PATENT DOCUMENTS

| | | |
|---|---|---|
| 1,273,782 A | 7/1918 | Hobart |
| 1,497,448 A | 2/1919 | Keith |
| 1,503,245 A | 7/1924 | Reed |
| 1,915,778 A | 9/1930 | Dreese |
| 3,611,088 A | 10/1971 | Hill |
| 3,611,091 A | 10/1971 | Genovese |
| 3,624,472 A | 11/1971 | Graham |
| 3,633,055 A | 1/1972 | Maier |
| 3,930,190 A | 12/1975 | Liska |
| 4,208,620 A | 6/1980 | Ringland |
| 4,329,122 A | 5/1982 | Owada et al. |
| 4,381,465 A | 4/1983 | Renkl et al. |
| 4,404,486 A * | 9/1983 | Keim et al. ............ 310/198 |
| 4,513,237 A | 4/1985 | Ford |
| 4,678,972 A | 7/1987 | Lehnhoff et al. |
| 4,918,347 A | 4/1990 | Takaba |

(Continued)

FOREIGN PATENT DOCUMENTS

WO 9949563 A1 9/1999

OTHER PUBLICATIONS

Munoz, Alfredo R. et al., "Dual Stator Winding Induction Machine Drive," IEEE Transactions on Industry Applications, vol. 36, No. 5, Sep./Oct. 2000, pp. 1369-1379.

(Continued)

*Primary Examiner* — Thanh Lam
(74) *Attorney, Agent, or Firm* — Jerry Turner Sewell

(57) ABSTRACT

A multi-phase, permanent magnet brushless DC electric motor includes 24 phase windings operating at a reduced voltage so that the motor can be powered by batteries or other sources of DC voltage to enable the motor to be used safely for propelling watercraft or other vehicles where the higher voltages required for conventional high horsepower motors would not be acceptable. The motor is wound by solid conductors spaced apart by 7.5 degrees. The conductors are interconnected and electrically driven by a sequence of drive currents to provide a six-pole stator. The connections to and interconnections between the stator windings are mirrored at each end of the stator to distribute the connections and interconnections between the two ends of the motor. A corresponding six-pole rotor using permanent magnets secured to a hollow rotor core is caused to rotate by the fields generated by the stator.

6 Claims, 46 Drawing Sheets

(56) References Cited

U.S. PATENT DOCUMENTS

| | | | |
|---|---|---|---|
| 4,937,485 A | 6/1990 | Mihalko | |
| 5,229,676 A | 7/1993 | Bood | |
| 5,705,909 A | 1/1998 | Rajashekara | |
| 5,714,821 A * | 2/1998 | Dittman | 310/179 |
| 5,714,823 A * | 2/1998 | Shervington et al. | 310/184 |
| 5,804,904 A | 9/1998 | Park et al. | |
| 5,831,409 A * | 11/1998 | Lindberg et al. | 318/801 |
| 5,898,251 A * | 4/1999 | Mochizuki et al. | 310/179 |
| 5,917,295 A * | 6/1999 | Mongeau | 318/400.29 |
| 6,153,953 A | 11/2000 | Isozaki et al. | |
| 6,157,112 A | 12/2000 | Suzuki et al. | |
| 6,170,974 B1 * | 1/2001 | Hyypio | 716/136 |
| 6,380,653 B1 | 4/2002 | Seguchi | |
| 7,005,772 B1 * | 2/2006 | Frederick et al. | 310/179 |
| 7,038,405 B2 | 5/2006 | Makinen et al. | |
| 7,075,206 B1 * | 7/2006 | Chen | 310/179 |
| 7,417,355 B2 | 8/2008 | Shichijo et al. | |
| 7,564,156 B2 | 7/2009 | Okumoto et al. | |
| 7,592,728 B2 | 9/2009 | Jones | |
| 7,800,276 B2 | 9/2010 | Purvines | |
| 8,283,831 B1 | 10/2012 | Kaminsky et al. | |
| 2002/0057030 A1 * | 5/2002 | Fogarty | 310/196 |
| 2008/0179981 A1 * | 7/2008 | Edelson | 310/166 |
| 2009/0160282 A1 * | 6/2009 | Hayasaka et al. | 310/156.28 |

OTHER PUBLICATIONS

Cho, Byung-Geuk et al., "A Separate Double-winding 12-phase Brushless DC Motor Drive Fed from Individual H-Bridge Inverters," 2010 IEEE Energy Conversion Congress and Exposition, Sep. 12-16, 2010, pp. 3889-3895.

* cited by examiner

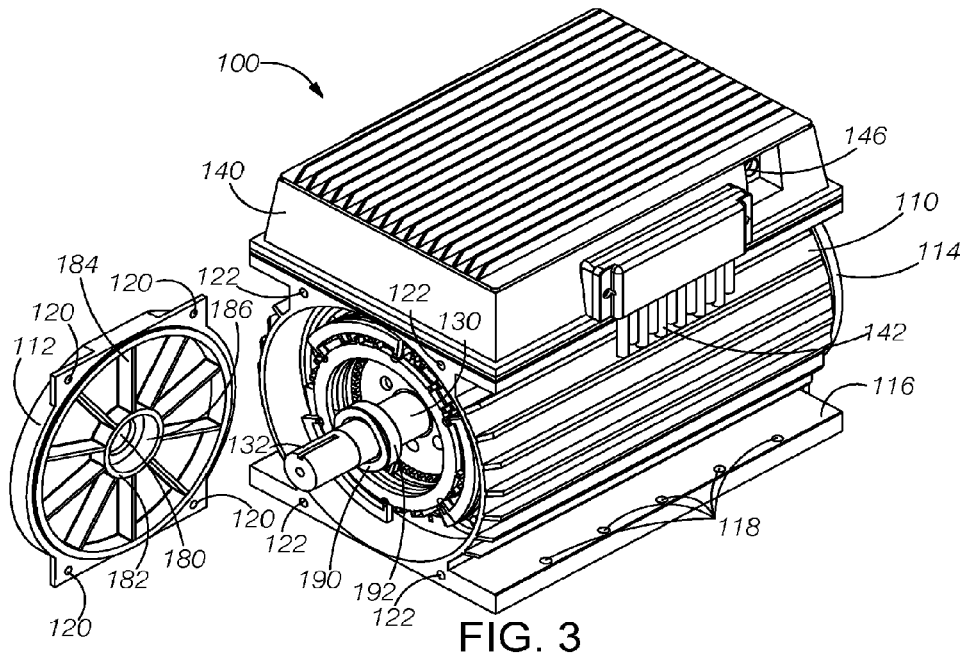
FIG. 3
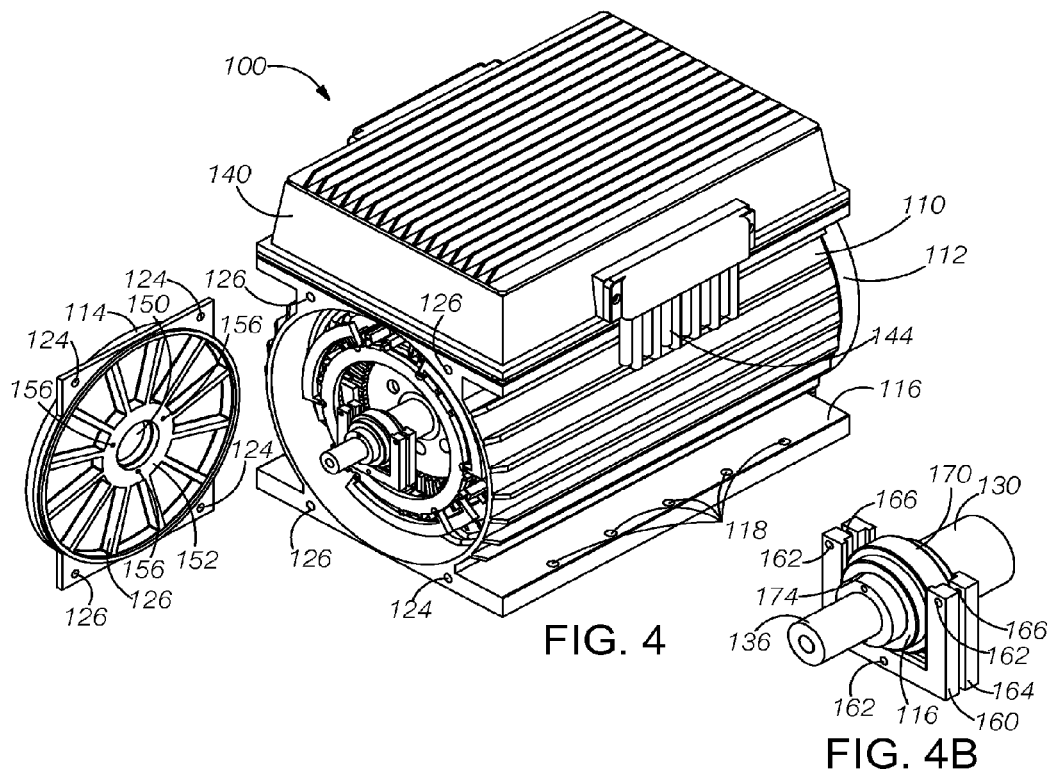
FIG. 4
FIG. 4B

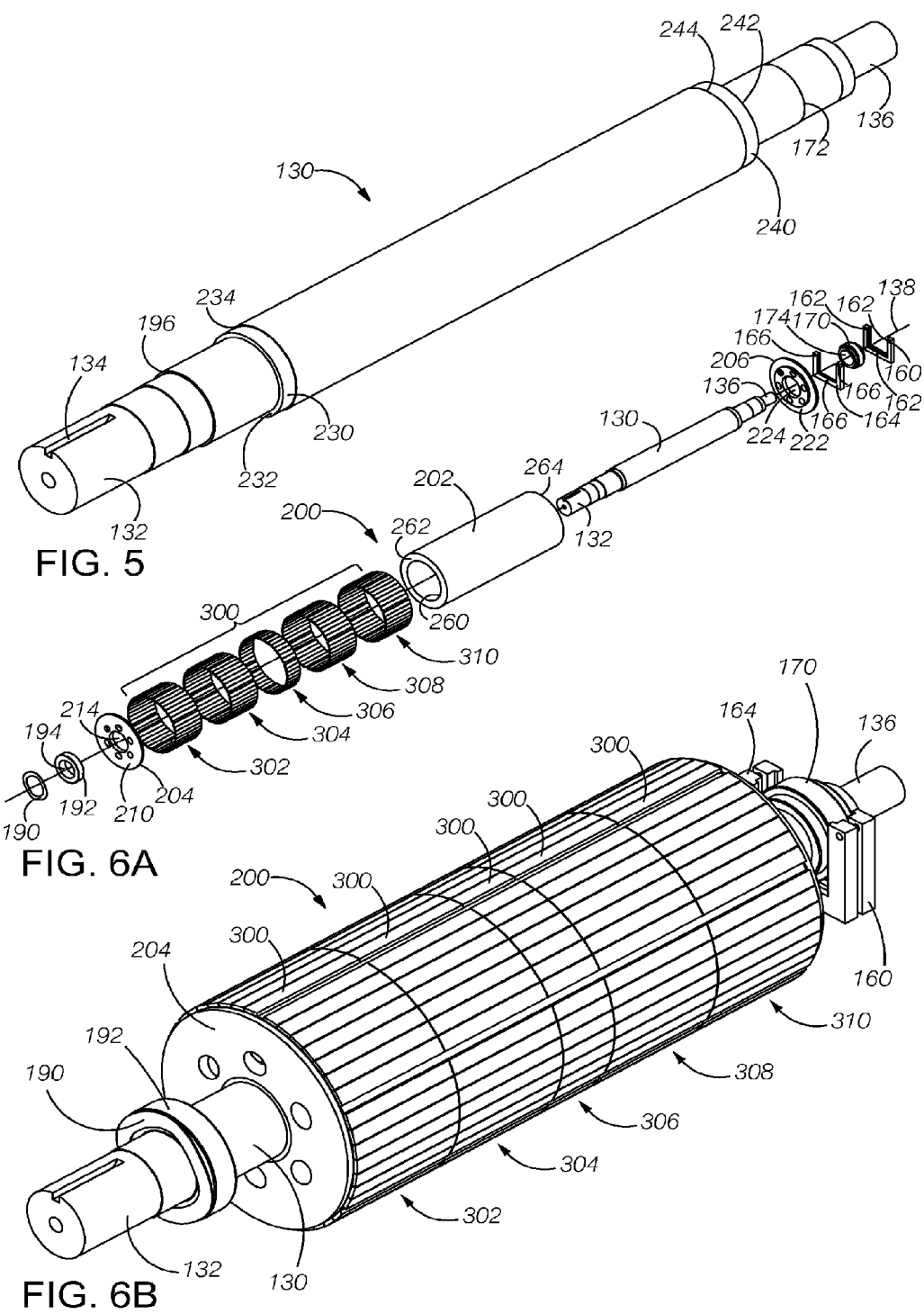

| | T0 | T1 | T2 | T3 | T4 | T5 | T6 | T7 | T8 | T9 | T10 | T11 | T12 | T13 | T14 | T15 | T16 | T17 | T18 | T19 | T20 | T21 | T22 | T23 |
|---|---|---|---|---|---|---|---|---|---|---|---|---|---|---|---|---|---|---|---|---|---|---|---|---|
| A (L2) | H | H | H | H | H | H | H | 0 | L | L | L | L | L | L | L | 0 | H | H | H | H | H | H | H | 0 |
| B (M2) | H | H | H | H | H | H | 0 | L | L | L | L | L | L | L | 0 | H | H | H | H | H | H | H | 0 | L |
| N (Y2) | L | L | L | L | 0 | H | H | H | H | H | H | H | 0 | L | L | L | L | L | L | L | 0 | H | H | H |
| O (Z2) | L | L | L | 0 | H | H | H | H | H | H | H | 0 | L | L | L | L | L | L | L | 0 | H | H | H | H |
| C (A2) | L | L | L | L | L | L | 0 | H | H | H | H | H | H | H | 0 | L | L | L | L | L | L | L | 0 | H |
| D (B2) | L | L | L | L | L | 0 | H | H | H | H | H | H | H | 0 | L | L | L | L | L | L | L | 0 | H | H |
| P (N2) | H | H | H | 0 | L | L | L | L | L | L | L | 0 | H | H | H | H | H | H | H | 0 | L | L | L | L |
| Q (O2) | H | 0 | L | L | L | L | L | L | L | 0 | H | H | H | H | H | H | H | 0 | L | L | L | L | L | L |
| E (C2) | H | H | H | H | H | H | 0 | L | L | L | L | L | L | L | 0 | H | H | H | H | H | H | H | H | 0 |
| F (D2) | H | H | H | H | H | 0 | L | L | L | L | L | L | L | 0 | H | H | H | H | H | H | H | 0 | L | L |
| R (P2) | L | L | L | 0 | H | H | H | H | H | H | H | 0 | L | L | L | L | L | L | L | 0 | H | H | H | H |
| S (Q2) | L | 0 | H | H | H | H | H | H | H | 0 | L | L | L | L | L | L | L | 0 | H | H | H | H | H | H |
| G (E2) | L | L | L | L | L | L | 0 | H | H | H | H | H | H | H | 0 | L | L | L | L | L | L | L | L | 0 |
| H (F2) | L | L | L | L | L | 0 | H | H | H | H | H | H | H | 0 | L | L | L | L | L | L | L | 0 | H | H |
| T (R2) | H | H | H | 0 | L | L | L | L | L | L | L | 0 | H | H | H | H | H | H | H | 0 | L | L | L | L |
| V (S2) | H | 0 | L | L | L | L | L | L | L | 0 | H | H | H | H | H | H | H | 0 | L | L | L | L | L | L |
| J (G2) | H | H | H | H | H | H | H | 0 | L | L | L | L | L | L | 0 | H | H | H | H | H | H | H | H | 0 |
| K (H2) | H | H | H | H | H | 0 | L | L | L | L | L | L | 0 | H | H | H | H | H | H | H | 0 | L | L |
| W (T2) | L | L | L | 0 | H | H | H | H | H | H | 0 | L | L | L | L | L | L | 0 | H | H | H | H | H | H |
| X (V2) | L | 0 | H | H | H | H | H | H | 0 | L | L | L | L | L | L | 0 | H | H | H | H | H | H | H | H |
| L (J2) | L | L | L | L | L | L | 0 | H | H | H | H | H | H | 0 | L | L | L | L | L | L | L | 0 |
| M (K2) | L | L | L | L | 0 | H | H | H | H | H | H | 0 | L | L | L | L | L | L | L | 0 | H | H |
| Y (W2) | H | H | H | 0 | L | L | L | L | L | L | 0 | H | H | H | H | H | H | 0 | L | L | L | L |
| Z (X2) | H | 0 | L | L | L | L | L | L | 0 | H | H | H | H | H | H | 0 | L | L | L | L | L | L |

CLOCKWISE ROTATION SEQUENCE

FIG. 48A

| | T24 | T25 | T26 | T27 | T28 | T29 | T30 | T31 | T32 | T33 | T34 | T35 | T36 | T37 | T38 | T39 | T40 | T41 | T42 | T43 | T44 | T45 | T46 | T47 |
|---|---|---|---|---|---|---|---|---|---|---|---|---|---|---|---|---|---|---|---|---|---|---|---|---|
| A (L2) | L | L | L | L | L | L | L | 0 | H | H | H | H | H | H | 0 | L | L | L | L | L | L | L | L | 0 |
| B (M2) | L | L | L | L | L | L | 0 | H | H | H | H | H | H | 0 | L | L | L | L | L | L | L | 0 | H | H |
| N (Y2) | H | H | H | 0 | L | L | L | L | L | L | 0 | H | H | H | H | H | H | 0 | L | L | L | L | L | L |
| O (Z2) | H | 0 | L | L | L | L | L | L | 0 | H | H | H | H | H | H | 0 | L | L | L | L | L | L | L | L |
| C (A2) | H | H | H | H | H | H | 0 | L | L | L | L | L | L | 0 | H | H | H | H | H | H | H | H | H | 0 |
| D (B2) | H | H | H | H | H | 0 | L | L | L | L | L | L | 0 | H | H | H | H | H | H | H | H | 0 | L | L |
| P (N2) | L | L | L | 0 | H | H | H | H | H | H | 0 | L | L | L | L | L | L | 0 | H | H | H | H | H | H |
| Q (O2) | L | 0 | H | H | H | H | H | H | 0 | L | L | L | L | L | L | 0 | H | H | H | H | H | H | H | H |
| E (C2) | L | L | L | L | L | L | 0 | H | H | H | H | H | H | 0 | L | L | L | L | L | L | L | L | L | 0 |
| F (D2) | L | L | L | L | L | 0 | H | H | H | H | H | H | 0 | L | L | L | L | L | L | L | L | L | 0 | H |
| R (P2) | H | H | H | 0 | L | L | L | L | L | L | 0 | H | H | H | H | H | H | 0 | L | L | L | L | L | L |
| S (Q2) | H | 0 | L | L | L | L | L | L | 0 | H | H | H | H | H | H | 0 | L | L | L | L | L | L | L | L |
| G (E2) | H | H | H | H | H | H | H | 0 | L | L | L | L | L | L | 0 | H | H | H | H | H | H | H | H | 0 |
| H (F2) | H | H | H | H | H | H | 0 | L | L | L | L | L | L | 0 | H | H | H | H | H | H | H | H | 0 | L |
| T (R2) | L | L | L | L | 0 | H | H | H | H | H | H | 0 | L | L | L | L | L | L | 0 | H | H | H | H | H |
| V (S2) | L | 0 | H | H | H | H | H | H | 0 | L | L | L | L | L | L | 0 | H | H | H | H | H | H | H | H |
| J (G2) | L | L | L | L | L | L | L | 0 | H | H | H | H | H | H | 0 | L | L | L | L | L | L | L | L | 0 |
| K (H2) | L | L | L | L | L | 0 | H | H | H | H | H | H | 0 | L | L | L | L | L | L | L | L | 0 | H | H |
| W (T2) | H | H | H | 0 | L | L | L | L | L | L | 0 | H | H | H | H | H | H | 0 | L | L | L | L | L | L |
| X (V2) | H | 0 | L | L | L | L | L | L | 0 | H | H | H | H | H | H | 0 | L | L | L | L | L | L | L | L |
| L (J2) | H | H | H | H | H | 0 | L | L | L | L | L | L | 0 | H | H | H | H | H | H | H | H | H | H | 0 |
| M (K2) | H | H | H | H | H | 0 | L | L | L | L | L | L | 0 | H | H | H | H | H | H | H | 0 | L | L |
| Y (W2) | L | L | L | 0 | H | H | H | H | H | H | 0 | L | L | L | L | L | L | 0 | H | H | H | H | H | H |
| Z (X2) | L | 0 | H | H | H | H | H | H | 0 | L | L | L | L | L | L | 0 | H | H | H | H | H | H | H | H |

CLOCKWISE ROTATION SEQUENCE (CONT.)

FIG. 48B

|  | T0 | T1 | T2 | T3 | T4 | T5 | T6 | T7 | T8 | T9 | T10 | T11 | T12 | T13 | T14 | T15 | T16 | T17 | T18 | T19 | T20 | T21 | T22 | T23 |
|---|---|---|---|---|---|---|---|---|---|---|---|---|---|---|---|---|---|---|---|---|---|---|---|---|
| A (L2) | H | 0 | L | L | L | L | L | L | L | 0 | H | H | H | H | H | H | 0 | L | L | L | L | L | L | L |
| B (M2) | H | H | H | 0 | L | L | L | L | L | L | L | 0 | H | H | H | H | H | H | 0 | L | L | L | L | L |
| N (Y2) | L | L | L | L | L | L | 0 | H | H | H | H | H | H | 0 | L | L | L | L | L | L | L | 0 | H | H |
| O (Z2) | L | L | L | L | L | L | L | 0 | H | H | H | H | H | H | 0 | L | L | L | L | L | L | L | L | 0 |
| C (A2) | L | 0 | H | H | H | H | H | H | H | 0 | L | L | L | L | L | L | L | 0 | H | H | H | H | H | H |
| D (B2) | L | L | L | 0 | H | H | H | H | H | H | H | 0 | L | L | L | L | L | L | L | 0 | H | H | H | H |
| P (N2) | H | H | H | H | H | 0 | L | L | L | L | L | L | L | 0 | H | H | H | H | H | H | H | H | 0 | L |
| Q (O2) | H | H | H | H | H | H | 0 | L | L | L | L | L | L | L | 0 | H | H | H | H | H | H | H | H | 0 |
| E (C2) | H | 0 | L | L | L | L | L | L | 0 | H | H | H | H | H | H | 0 | L | L | L | L | L | L | L | L |
| F (D2) | H | H | H | 0 | L | L | L | L | L | L | 0 | H | H | H | H | H | H | 0 | L | L | L | L | L | L |
| R (P2) | L | L | L | L | L | 0 | H | H | H | H | H | H | 0 | L | L | L | L | L | L | L | 0 | H | H | H |
| S (Q2) | L | L | L | L | L | L | L | 0 | H | H | H | H | H | H | 0 | L | L | L | L | L | L | L | L | 0 |
| G (E2) | L | 0 | H | H | H | H | H | H | H | 0 | L | L | L | L | L | L | L | 0 | H | H | H | H | H | H |
| H (F2) | L | L | L | 0 | H | H | H | H | H | H | H | 0 | L | L | L | L | L | L | L | 0 | H | H | H | H |
| T (R2) | H | H | H | H | H | 0 | L | L | L | L | L | L | L | 0 | H | H | H | H | H | H | H | 0 | L | L |
| V (S2) | H | H | H | H | H | H | H | 0 | L | L | L | L | L | L | 0 | H | H | H | H | H | H | H | H | 0 |
| J (G2) | H | 0 | L | L | L | L | L | L | 0 | H | H | H | H | H | H | 0 | L | L | L | L | L | L | L | L |
| K (H2) | H | H | H | 0 | L | L | L | L | L | L | 0 | H | H | H | H | H | H | 0 | L | L | L | L | L | L |
| W (T2) | L | L | L | L | L | 0 | H | H | H | H | H | H | 0 | L | L | L | L | L | L | L | 0 | H | H | H |
| X (V2) | L | L | L | L | L | L | L | 0 | H | H | H | H | H | H | 0 | L | L | L | L | L | L | L | L | 0 |
| L (J2) | L | 0 | H | H | H | H | H | H | 0 | L | L | L | L | L | L | 0 | H | H | H | H | H | H | H | H |
| M (K2) | L | L | L | 0 | H | H | H | H | H | H | 0 | L | L | L | L | L | L | 0 | H | H | H | H | H | H |
| Y (W2) | H | H | H | H | H | 0 | L | L | L | L | L | L | 0 | H | H | H | H | H | H | 0 | L | L | L | L |
| Z (X2) | H | H | H | H | H | H | H | 0 | L | L | L | L | L | L | 0 | H | H | H | H | H | H | H | 0 | L |

COUNTERCLOCKWISE ROTATION SEQUENCE

FIG. 49A

| | T24 | T25 | T26 | T27 | T28 | T29 | T30 | T31 | T32 | T33 | T34 | T35 | T36 | T37 | T38 | T39 | T40 | T41 | T42 | T43 | T44 | T45 | T46 | T47 |
|---|---|---|---|---|---|---|---|---|---|---|---|---|---|---|---|---|---|---|---|---|---|---|---|---|
| A (L2) | L | 0 | H | H | H | H | H | H | H | 0 | L | L | L | L | L | L | 0 | H | H | H | H | H | H | H |
| B (M2) | L | L | 0 | H | H | H | H | H | H | H | 0 | L | L | L | L | L | L | 0 | H | H | H | H | H | H |
| N (Y2) | H | H | H | H | H | 0 | L | L | L | L | L | L | 0 | H | H | H | H | H | H | 0 | L | L | L | L |
| O (Z2) | H | H | H | H | H | H | 0 | L | L | L | L | L | L | 0 | H | H | H | H | H | H | H | H | H | 0 |
| C (A2) | H | 0 | L | L | L | L | L | L | 0 | H | H | H | H | H | H | 0 | L | L | L | L | L | L | L | L |
| D (B2) | H | H | H | 0 | L | L | L | L | L | L | 0 | H | H | H | H | H | H | 0 | L | L | L | L | L | L |
| P (N2) | L | L | L | L | 0 | H | H | H | H | H | H | 0 | L | L | L | L | L | L | 0 | H | H | H | H | H |
| Q (O2) | L | L | L | L | L | 0 | H | H | H | H | H | H | 0 | L | L | L | L | L | L | 0 | H | H | H | H |
| E (C2) | L | 0 | H | H | H | H | H | H | 0 | L | L | L | L | L | L | 0 | H | H | H | H | H | H | H | H |
| F (D2) | L | L | 0 | H | H | H | H | H | H | 0 | L | L | L | L | L | L | 0 | H | H | H | H | H | H | H |
| R (P2) | H | H | H | H | 0 | L | L | L | L | L | L | 0 | H | H | H | H | H | H | 0 | L | L | L | L | L |
| S (Q2) | H | H | H | H | H | H | 0 | L | L | L | L | L | L | 0 | H | H | H | H | H | H | H | H | H | 0 |
| G (E2) | H | 0 | L | L | L | L | L | L | 0 | H | H | H | H | H | H | 0 | L | L | L | L | L | L | L | L |
| H (F2) | H | H | H | 0 | L | L | L | L | L | L | 0 | H | H | H | H | H | H | 0 | L | L | L | L | L | L |
| T (R2) | L | L | L | L | L | 0 | H | H | H | H | H | H | 0 | L | L | L | L | L | L | 0 | H | H | H | H |
| V (S2) | L | L | L | L | L | L | 0 | H | H | H | H | H | H | 0 | L | L | L | L | L | L | 0 | H | H | H |
| J (G2) | L | 0 | H | H | H | H | H | H | 0 | L | L | L | L | L | L | 0 | H | H | H | H | H | H | H | H |
| K (H2) | L | L | L | 0 | H | H | H | H | H | H | 0 | L | L | L | L | L | L | 0 | H | H | H | H | H | H |
| W (T2) | H | H | H | H | H | 0 | L | L | L | L | L | L | 0 | H | H | H | H | H | H | H | 0 | L | L |
| X (V2) | H | H | H | H | H | H | 0 | L | L | L | L | L | L | 0 | H | H | H | H | H | H | H | H | H | 0 |
| L (J2) | H | 0 | L | L | L | L | L | L | 0 | H | H | H | H | H | H | 0 | L | L | L | L | L | L | L | L |
| M (K2) | H | H | H | 0 | L | L | L | L | L | 0 | H | H | H | H | H | H | 0 | L | L | L | L | L | L | L |
| Y (W2) | L | L | L | L | 0 | H | H | H | H | H | 0 | L | L | L | L | L | L | 0 | H | H | H | H | H | H |
| Z (X2) | L | L | L | L | L | L | 0 | H | H | H | H | H | 0 | L | L | L | L | L | L | L | L | L | L | 0 |

COUNTERCLOCKWISE ROTATION SEQUENCE (CONT.)

FIG. 49B

MULTI-PHASE PERMANENT MAGNET BRUSHLESS DC ELECTRIC MOTOR

BACKGROUND OF THE INVENTION

1. Field of the Invention

The present invention is in the field of electric motors, and, more particularly, is in the field of brushless DC electric motors for use in propelling vehicles such as watercraft.

2. Description of the Related Art

The need for the motor development described here comes from events that started a century ago when recreation size boats were propelled by electric motors. Eventually, such boats were converted to steam propulsion and then to propulsion by internal combustion engines. Except for small, slow-moving sightseeing boats and other limited horsepower boats, electric power is generally not used for recreational boats. Any trend towards the use of electric propulsion is generally stifled because of the inadequacies of the available batteries, which limits uses to low power, short duration applications.

Today, the economics of gas and diesel fuel and the atmospheric degradation caused by internal combustion engines have pushed for more extended use of electric propulsion as evidenced by hybrid automobiles and a few pure electric automobiles that have appeared over the last decade or so. The more extensive use of electric power for automobiles does not translate directly to corresponding use for recreational boats because of a combination of factors that are present in recreational boats that are not present, at least to the same extent, in automobiles. For example, boats are used in open water where one cannot easily obtain assistance. Unlike automobiles, boats are not readily adaptable to regeneration of electrical power, such as occurs when an automobile coasts and is slowed by braking. Recharging stations are not available on the open water. Notwithstanding the differences, it is desirable to produce an electric recreational boat to free the owners and their passengers from the bilious fumes, the explosive dangers, the noise, and of course the high operating costs associated with propulsion by internal combustion engines.

The use of electric propulsion in recreation boats is further complicated by the requirement that the electric propulsion system be safe beyond what is seemingly accepted for electrification of cars. Because of the inherently damp environment, the propulsion system should operate with a relatively low voltage. The batteries should be safe to handle and operate to substantially reduce or eliminate the possibility of an explosion or fire while in the open water or while docked proximate to other boats. Although no product can be totally safe, the reduction of the hundreds of volts required for a conventional high horsepower electric motor to a voltage that is generally considered to be safe is a basic safety requirement. As a result, the current state of the art of marine motors is less than 20 horsepower.

To provide an electric motor having the horsepower of a moderate-sized combustion engine for a recreational boat, such as for example, a 165 horsepower motor requires an electric motor having a rating of approximately 123 kilowatts. To obtain that power with a voltage no greater than approximately 50 volts, requires thousands of amperes of current. Such current is much greater than the currents in automotive use, which are typically in the low hundreds of amperes. Higher currents are generally beyond the capabilities of demountable contacts because of the contact resistance, for example. Furthermore, the resistive heating of the wiring caused by current flowing through the wiring would be excessive and would result in danger from overheating and breakdown of the wiring insulation.

SUMMARY OF THE INVENTION

The high horsepower electric motor disclosed herein operates at a sufficiently low voltage to be acceptable for marine use and which distributes the current among windings to maintain the current through any winding within an acceptably range. In particular, a multi-phase, permanent magnet brushless DC electric motor includes 24 phase windings connected as two sets of 12 windings with each set configured as a wye-connected circuit. The windings operate at a reduced voltage so that the motor can be powered by batteries or other sources of DC voltage. The high currents needed to produce a high horsepower motor are distributed among the 24 phase windings. The motor can be used safely for propelling watercraft or other vehicles where the higher voltages required for conventional high horsepower motors would not be acceptable. The motor is wound by solid conductors spaced apart by 7.5 degrees. The two sets of wye-connected conductors are mechanically distributed on the same stator structure and are electrically driven by a sequence of drive currents to provide a single six-pole stator that incorporates both sets of 12 windings. A six-pole rotor using permanent magnets secured to a hollow rotor core is caused to rotate by the fields generated by the stator. The motor includes a unique configuration for interconnecting the two sets of 12-phase windings are positioned in the stator structure in a unique configuration which "mirrors" the windings at each end of the motor stator. Distributing the connections to the windings and the interconnections between the windings between the two ends of the stator structure provides sufficient volume to accommodate the connections and interconnections without substantially increasing the overall volume of the motor enclosure.

An aspect of embodiments in accordance with the present invention is an electric motor that comprises a rotor, a stator and a drive circuit. The rotor comprises a plurality of permanent magnets organized as alternating poles of opposite polarities. The stator surrounds the rotor. The stator comprises a plurality of conductors positioned in a respective plurality of slots extending from a first end to a second end of the stator. A first set of conductors is electrically connected as a first wye-connected circuit. A second set of conductors is electrically connected as a second wye connected circuit. The conductors in the first wye-connected circuit receive power from terminals at the first end of the stator, and the conductors in the second wye-connected circuit receiving power from terminals at the second end of the stator. The conductors are positioned in the slots with selected subsets of the conductors in the first set of conductors interleaved with selected subsets of the conductors in the second set of conductors. The drive circuit provides electrical currents to the conductors of the first and second wye-connected circuits. The drive circuit controls the direction of flow and the timing of the currents in the conductors such that at any time the conductors of the first and second wye-connected circuits produce a plurality of stator poles. Each stator pole is produced by currents flowing through equal numbers of conductors in the first wye-connected circuit and conductors in the second wye-connected circuit.

Another aspect of embodiments in accordance with the present invention is an electric motor comprising an enclosure, a rotor and a stator structure. The enclosure has a first end and a second end. The rotor has a plurality of permanent magnet poles. The rotor rotates about a longitudinal axis that extends between the first end and the second end of the enclosure. The rotor has an outer diameter. The stator structure surrounds the rotor. The stator structure has a first end nearer the first end of the enclosure and has a second end nearer the second end of the enclosure. The stator structure comprises a first wye circuit configuration and a second wye circuit configuration. The first wye circuit configuration comprises a first set of stator conductor pairs, and each conductor pair comprises a respective first conductor and a respective second conductor. Each conductor in the first set of conductors has a respective first end proximate the first end of the stator structure and has a respective second end proximate the second end of the stator structure. The stator structure further includes a first set of input terminals. Each input terminal in the first set of input terminals is electrically connected to a respective first end of the respective first conductor of one of the conductor pairs in the first set of conductors. A first set of interconnection jumpers is located proximate the second end of the stator structure. Each interconnection jumper in the first set of interconnection jumpers electrically connects the second end of the first conductor and the second end of the second conductor in a respective conductor pair in the first set of conductor pairs. A first common node jumper electrically interconnects all of the first ends of the second conductors in the first set of stator conductor pairs. The second wye circuit configuration comprises a second set of stator conductor pairs, and each conductor pair comprises a respective first conductor and a respective second conductor. Each conductor in the second set of conductors has a respective first end proximate the first end of the stator structure and has a respective second end proximate the second end of the stator structure. The stator structure further includes a second set of input terminals. Each input terminal in the second set of input terminals electrically connects to a respective second end of the respective first conductor of one of the conductor pairs in the second set of conductor pairs. A second set of interconnection jumpers is located proximate the first end of the stator structure. Each interconnection jumper in the second set of interconnection jumpers electrically connects the first end of the first conductor and the first end of the second conductor in a respective conductor pair in the second set of conductor pairs. A second common node jumper electrically interconnects all of the second ends of the second conductors in the second set of stator conductor pairs. The stator structure comprises a cylindrical stator laminate having an inner cylindrical surface, an outer surface and a wall thickness between the inner surface and the outer surface. The inner surface has a diameter greater than the outer diameter of the rotor. A plurality of slots extend from the inner surface toward the outer surface for a distance less than the wall thickness. Each slot receives a respective one of the conductors in the first set of stator conductor pairs and the second set of stator conductor pairs. The first and second sets of stator conductor pairs are positioned in the slots such that the second conductor in a conductor pair is spaced apart from the first conductor in a conductor pair by slots having conductors from other conductor pairs.

An electric motor comprises an enclosure, a stator structure and a rotor. The stator structure is positioned within the enclosure and has a central longitudinal axis. The rotor is positioned within the stator structure and is rotatable about the central longitudinal axis. The stator structure comprises a generally cylindrical stator laminate having an inner surface and an outer surface. The inner surface is centered about the central longitudinal axis. The stator laminate has a thickness between the inner surface and the outer surface. The stator laminate has a first end and a second end. A plurality of slots extend longitudinally from the first end to the second end of the stator laminate. Each slot extends from the inner surface toward the outer surface along a radial line from the central longitudinal axis, and has a radial length less than the thickness of the stator laminate. A respective conductor is positioned in each slot and extends longitudinally from at least the first end to at least the second end of the stator laminate. Each conductor has dimensions selected to fit tightly within the respective slot. Each conductor has a respective front end and a respective rear end. A plurality of power supply wires and interconnection jumpers are connected to the front ends and the rear ends of the conductors. The power supply wires and interconnection jumpers are configured as a first multiple-phase circuit and a second multiple phase circuit, with each multiple phase circuit interconnected in a wye-configuration. The configuration of the second multiple phase circuit is a rotated mirror of the configuration of the first multiple phase circuit such that a corresponding number of power supply wires and interconnection jumpers are connected to the first ends of the conductors and to the second ends of the conductors. The rotor comprises a central shaft that is aligned with the central longitudinal axis. A cylindrical rotor yoke is concentric to the central shaft. The rotor yoke has a first end, a second end and an outer surface. The rotor yoke is coupled to the central shaft by a first end support and a second end support. A plurality of permanent magnets are mounted to the outer surface of the rotor yoke and are arranged with magnetic poles oriented radially with respect to the central shaft. Selected ones of the permanent magnets are positioned with respective magnetic north poles oriented outwardly away from the central shaft, and selected others of the permanent magnets are positioned with respective magnetic north poles oriented inwardly toward the central shaft. The selected ones and the selected others of the permanent magnets are configured to provide a plurality of alternating north and south poles around the outer surface of the rotor yoke.

BRIEF DESCRIPTION OF THE DRAWINGS

Embodiments in accordance with aspects of the present invention are described below in connection with the attached drawings in which:

FIG. 3 illustrates the front perspective view of the brushless DC electric motor of FIG. 1 with the front cover removed and rotated to show the inside of the front cover and the inside of the front of the motor;

FIG. 4 illustrates the rear perspective view of the brushless DC electric motor of FIG. 2 with the rear cover removed and rotated to show the inside of the rear cover and the inside of the rear of the motor;

FIG. 4B illustrates an enlarged perspective view of the rear end of the shaft, the rear shaft bearing and the rear shaft bearing retainers of the brushless DC electric motor of FIG. 4;

FIG. 5 illustrates the shaft of the brushless DC electric motor prior to construction of a rotor assembly;

FIG. 6A illustrates an exploded perspective view of a yoke assembly formed around the shaft of FIG. 5;

FIG. 6B illustrates a perspective view of the assembled yoke assembly prior to insertion into the motor;

FIGS. 48A and 48B illustrate a timing diagram for activation of the phases connected to the winding conductors to produce a clockwise rotation of the rotor;

FIGS. 49A and 49B illustrate a timing diagram for activation of the phases connected to the winding conductors to produce a counterclockwise rotation of the rotor;

DETAILED DESCRIPTION OF PREFERRED EMBODIMENTS

A brushless DC electric motor is disclosed herein with respect to exemplary embodiments. The embodiments are disclosed for illustration of the brushless DC electric motor and are not limiting except as defined in the appended claims.

Figure 1:
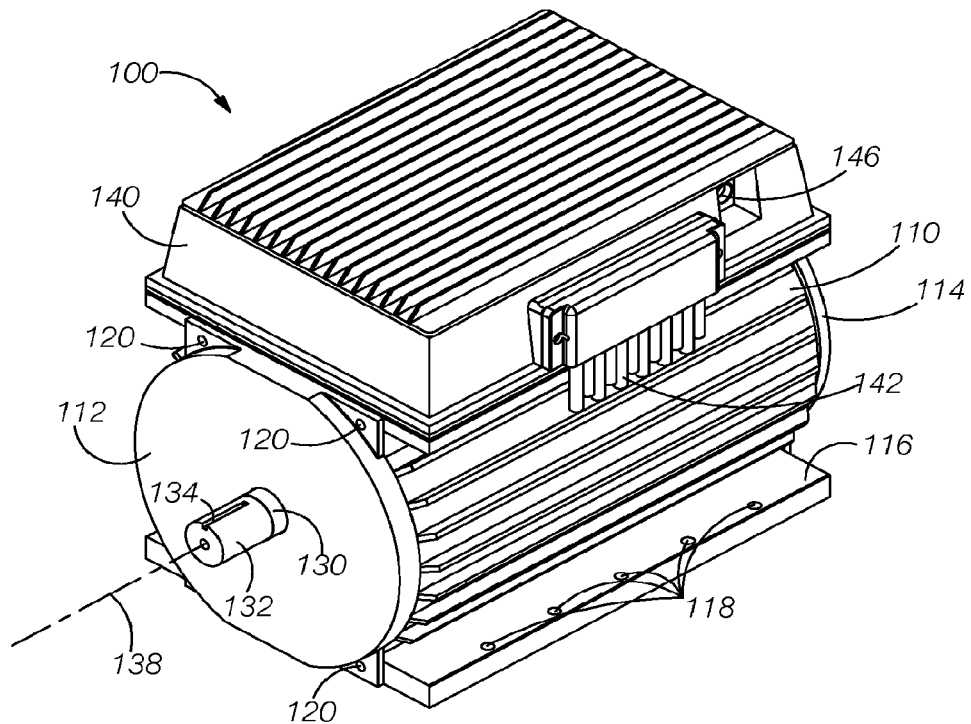
FIG. 1 illustrates a front perspective view of a brushless DC (BLDG) electric motor.
Figure 2:
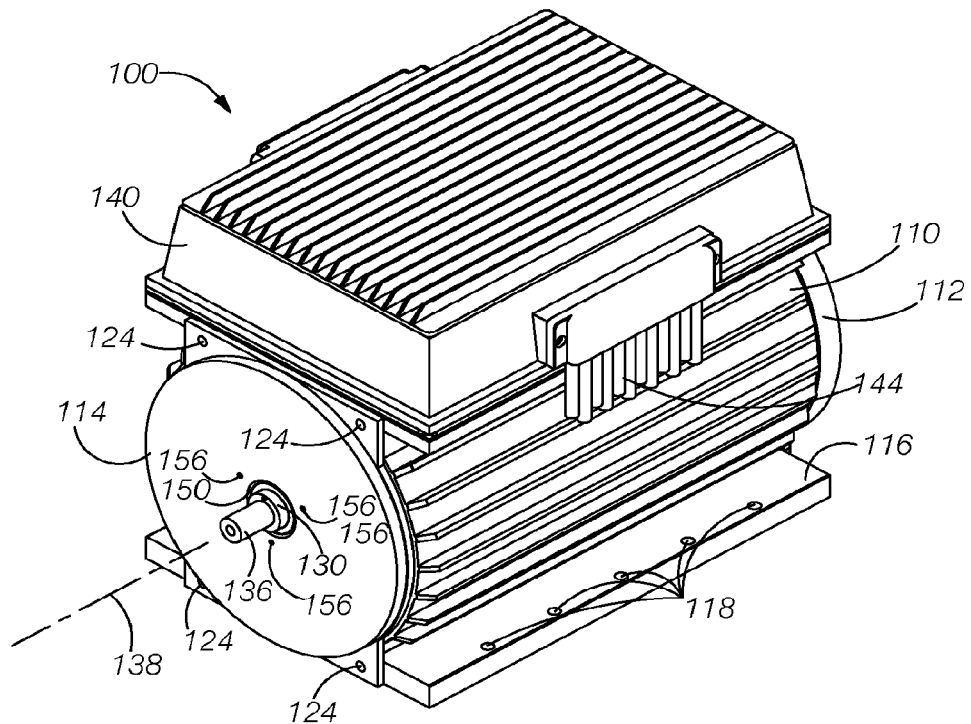
FIG. 2 illustrates a rear perspective view of the brushless DC electric motor of FIG. 1.

FIGS. 1 and 2 illustrate a front perspective view and a rear perspective view, respectively, of a brushless DC (BLDG) electric motor 100 constructed in accordance with the improvements disclosed herein. The motor includes an outer enclosure 110 having a front cover 112 and a rear cover 114. The outer enclosure further includes a mounting pedestal 116, which includes a plurality of mounting features 118 (e.g., bores) so that the motor can be secured to a watercraft (not shown).

The front cover 112 is secured to the outer enclosure 110 by a plurality of threaded fasteners (not shown) that pass through unthreaded bores 120 in the front cover and engage threaded bores 122 on the front of the enclosure (see FIG. 3). The rear cover 114 is secured to the outer enclosure by a plurality of threaded fasteners (not shown) that pass through unthreaded bores 124 in the rear cover and engage threaded bores 126 on the rear of the enclosure (see FIG. 4).

In the drawing figures, the various threaded fasteners and other engagement devices are not shown because the structures and functions of such devices are well known and to include the devices would add unnecessary detail to the drawings.

A front portion 132 of a shaft 130 extends from the front cover 112 of the outer enclosure 110. A portion of the front portion of the shaft includes a keyway 134 or other engagement feature that can be used to provide a secure interconnection from the shaft to a propulsion device (e.g., a propeller, not shown) to communicate a driving torque from the motor to the propulsion device. In the illustrated embodiment, a rear portion 136 of the shaft extends from the rear cover of the outer enclosure; however, in alternative embodiments, the rear portion of the shaft may be fully encased within the outer enclosure. In the illustrated embodiment, the rear portion of the shaft is not keyed; however, in alternative embodiments, the rear portion of the shaft may also be keyed or may have an alternative engagement device. The shaft rotates about a central rotational axis 138.

An upper portion of the enclosure 110 of the motor 100 supports an electronics enclosure 140 that encloses and protects an electronics system, which is described below. A first plurality of power supply cables 142 enter the electronics enclosure from a first side of the enclosure (the right side as viewed in FIG. 1). A second plurality of power supply cables 144 enter a second side of the electronics enclosure as shown in FIG. 2. The power supply cables are electrically connected to a plurality of batteries (not shown) as described below in connection with the description of the electronics system. A signal connector 146 is positioned on the first side of the electronics enclosure. As described below, signal connector receives motor control signals from an external source (e.g., a control panel of a watercraft, not shown).

FIGS. 3 and 4 illustrate a front perspective view and a rear perspective view respectively of the motor 100 of FIGS. 1 and 2 with the front cover 112 and the rear cover 114 removed from the outer enclosure 110 and the respective covers rotated to shown the inside features of the two covers and to show further features of the improvements disclosed herein.

As shown in FIG. 4, the rear cover 114 includes a rear central opening 150 that receives the rear portion 134 of the shaft 130. The opening is surrounded by a raised annular ring 152. A plurality of ribs 154 extend radially outward from the annular ring to the outer periphery of the rear cover. The ribs provide structural strength for the rear cover to enable the rear cover to support the shaft while having less mass than an unribbed structure of the corresponding thickness.

Three unthreaded bores 156 are positioned around the annular ring 152 of the rear cover 114. The three bores are positioned to be aligned with respective unthreaded bores 162 in a first rear shaft bearing retainer 160 and with respective threaded bores 166 in a second rear shaft bearing retainer 164, which are shown and numbered in an enlarged perspective view in FIG. 4B. The two rear shaft bearing retainers are positioned on two sides of a rear shaft bearing 170 with the first rear shaft bearing retainer nearer the rear portion 134 of the shaft 130. When the rear cover is secured to the outer enclosure as shown in FIG. 2, three threaded fasteners (not shown) pass through the unthreaded bores in the rear enclosure and through the unthreaded bores in the first rear shaft bearing retainer. The fasteners engage the threaded bores in the second rear shaft bearing retainer to secure the rear shaft bearing in a fixed relationship with respect to the central opening in the rear cover.

FIG. 5 illustrates the shaft 130 prior to construction of a rotor assembly (described below) before installing the rotor assembly into the motor 100. The rear portion 134 of the shaft includes a rear bearing step 172 in the diameter of the shaft from a smaller diameter to a larger diameter. The larger diameter of the rear bearing step is larger than the diameter of an inner bore 174 (shown in FIGS. 4B and 6) of the rear shaft bearing 170. When the rear cover 114 is secured to the outer enclosure 110, the rear shaft bearing constrains the shaft from lateral axial movement towards the rear cover.

As shown in FIG. 3, the front cover 112 includes a front central opening 180 that is surrounded by an annular ring 182. A plurality of ribs 184 extend radially outward from the annular ring. A central cylindrical portion of the annular ring is removed to provide a cylindrical recess 186 concentric to the front central opening. The cylindrical recess is sized to receive an annular wave washer 190 that is positioned on the front surface of a front shaft bearing 192. As shown in FIG. 6, the front shaft bearing has an inner bore 194. The front portion 132 of the shaft 130 includes a front bearing step 196 in diameter from a smaller diameter to a larger diameter. The larger diameter of the front bearing step is larger than the diameter of the inner bore of the front shaft bearing. Accordingly, when the front cover is secured to the outer enclosure 110 with the front portion of the shaft extending through the front central opening, lateral axial movement of the front portion of the shaft is constrained by the front bearing, which is secured between the front bearing step of the shaft and the wave washer. The wave washer within the cylindrical recess allows a small amount of lateral axial movement to accommodate changes in the position of the front portion of the shaft caused by changes in the temperature and changes in the load coupled to the shaft.

As described above, the front cover 112 functions as a front bearing plate, and the rear cover 114 functions as a respective rear bearing plate. As further described above, the shaft 130 is constrained by the front shaft bearing 192 and the rear shaft bearing 170 to remain in a substantially fixed axial position within the enclosure 110 other than a small amount of forward axial movement allowed by the wave washer 190.

FIG. 6A illustrates an exploded perspective view of a yoke assembly 200 that is formed around the shaft 130. FIG. 6B illustrates a perspective view of the assembled yoke assembly prior to insertion into the motor 100. As shown in the exploded view of FIG. 6A, the rotor shaft 130 supports a cylindrical rotor yoke 202 that is supported by a front radial support plate 204 and a rear radial support plate 206. Each of the front and rear radial support plates has an outer diameter of approximately 7.25 inches and has a thickness of approximately 0.25 inch.

Figures 7A, 7B:
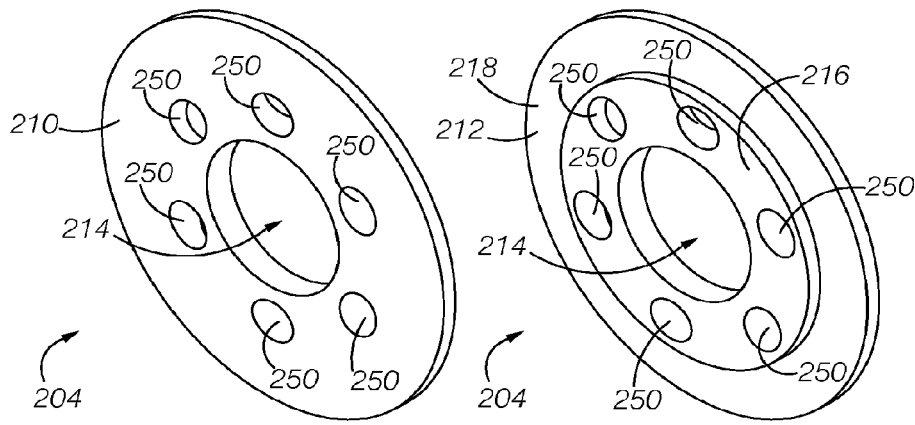
FIG. 7 illustrates an exploded perspective view of the FIGS. 7A and 7B illustrate front and rear perspective views, respectively, of the front radial support plate of FIGS. 6A and 6B.
Figures 8A, 8B:
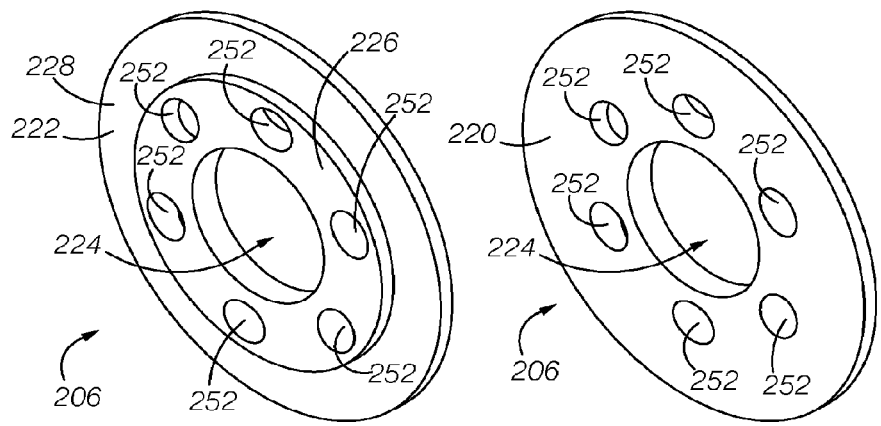
FIGS. 8A and 8B illustrate front and rear perspective views, respectively, of the rear radial support plate of FIGS. 6A and 6B.

FIGS. 7A and 7B illustrate front and rear perspective views, respectively, of the front radial support plate 204 of FIGS. 6A and 6B. The front radial support plate 204 has an outer face 210 (FIG. 8A) and an inner face 212 (FIG. 8B). The inner face is directed toward the cylindrical rotor yoke 200 as shown in FIG. 6A. A circular central bore 214 extends through the front radial support plate between the two faces. The central bore has an inner diameter of approximately 2.8 inches. As shown in FIG. 7B, the central bore of the front radial support plate is surrounded on the inner face by a raised annular ring 216 having an outer diameter of approximately 5.25 inches and having a thickness of approximately 0.25 inch such that the front radial support plate has an overall thickness through the annular ring surrounding the central bore of approximately 0.5 inch. The annular ring is surrounded by a non-raised face portion 218. The front radial support plate has a thickness through the non-raised face portion of approximately 0.25 inch.

FIGS. 8A and 8B illustrate front and rear perspective views, respectively, of the rear radial support plate 206 of FIGS. 6A and 6B. The rear radial support plate 206 has an outer face 220 FIG. 8B) and an inner face 222 (FIG. 8A). The inner face is directed toward the cylindrical rotor yoke 200 as shown in FIG. 6A. A circular central bore 224 extends through the rear radial support plate between the two faces. The central bore has an inner diameter of approximately 2.8 inches. As shown in FIG. 8A, the central bore of the rear radial support plate is surrounded on the inner face by a raised annular ring 226 having an outer diameter of approximately 5.25 inches and having a thickness of approximately 0.25 inch such that the rear radial support plate has an overall thickness through the annular ring surrounding the central bore of approximately 0.5 inch. The annular ring is surrounded by a non-raised face portion 228. The rear radial support plate has a thickness through the non-raised face portion of approximately 0.25 inch.

As shown in FIG. 5, the shaft 130 has a front radial support plate engagement surface 230 that extends for approximately 0.5 inch along the shaft from a first front engagement step 232 where the diameter of the shaft increases from approximately 2.5 inches to a diameter of approximately 2.8 inches to a second front engagement step 234 where the diameter of the shaft increases from 2.8 inches to approximately 2.85 inches, which corresponds to the diameter of a central portion 236 of the shaft. Accordingly, the central bore 210 of the front radial support plate 204 fits snugly on the front radial support plate engagement surface and is constrained by the second front engagement step. The front radial support plate is positioned on the shaft with the raised annular ring 212 and the non-raised portion 214 facing toward the central portion of the shaft.

In similar manner, the shaft 130 has a rear radial support plate engagement surface 240 formed between a first rear engagement step 242 where the diameter of the shaft increases from approximately 2.03 inches to a diameter of approximately 2.8 inches and a second rear engagement step 244 where the diameter of the shaft increases from approximately 2.8 inches to the diameter of a central portion 236 of the shaft of approximately 2.85 inches. The rear radial support plate 206 is positioned on the rear radial support plate engagement surface with the raised annular ring 222 and the non-raised portion 224 facing toward the central portion 236 of the shaft such that the front and rear annular rings face each other along the shaft. The central portion of the shaft has a length between the second front step 234 and the second rear engagement step of approximately 17.6 inches so that the front and rear annular rings are spaced apart by approximately 17.6 inches and so that the non-raised portion 214 of the front radial support plate is spaced apart from the non-raised portion of the rear radial support plate by approximately 18.1 inches.

As further illustrated in FIGS. 7A and 7B, the raised annular ring 214 of the front radial support plate 204 has a plurality of bores 250 formed at radial locations surrounding the central bore 210. As shown in FIGS. 8A and 8B, the raised annular ring 222 of the rear radial support plate 206 has a corresponding plurality of bores 252 formed at radial locations surrounding the central bore 220. In the illustrated embodiments, each support plate has six bores spaced at intervals of approximately 60 degrees. Each of the bores is centered approximately 4.15 inches from the center of the respective support plate. In the preferred embodiment, the bores penetrate the raised annular ring and the main body of the respective support plates at a slant angle of approximately 30 degrees from perpendicular so that each bore has a generally elliptical shape at the front and rear surface of the respective plate.

Figure 9:
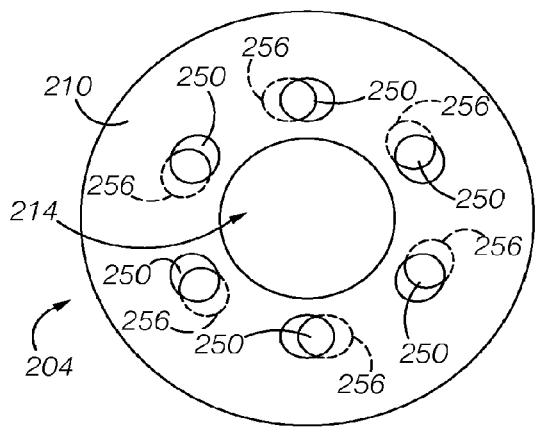
FIG. 9 illustrates a front elevational view of the front radial support plate of FIGS. 7A and 7B, with the bore exit openings on the rear side (shown in dashed lines) being offset circumferentially from the front openings because of the slant angle of the bore.

As shown in the elevational view of the front radial support plate 204 in FIG. 9, when viewed from the outer face 210, the slant angle is oriented generally tangentially to a circle through the centers of the bores 250. As shown in dashed lines, an opening 254 for the bore on the inner surface 212 is positioned relatively counterclockwise from the opening of the hole on the exposed outer surface. In the illustrated embodiment, the slanted bores have diameters of approximately 0.75 inch. The bores in the rear radial support plate 206 are slanted in a similar manner.

The outer perimeters of the respective raised annular rings 212 and 222 of the front radial support plate 204 and the rear radial support plate 206, respectively, engage an inner cylindrical surface 260 of the cylindrical yoke 202, which has an inner diameter at a front end 262 and a rear end 264 substantially equal to the outer diameters of the annular rings (e.g., approximately 5.25 inches. The yoke has a wall thickness of approximately 0.5 inches so that an outer diameter of the yoke is approximately 7.25 inches, which corresponds to the outer diameters of the radial support plates. The yoke has a length of approximately 18.1 inches, which corresponds to the distance between the facing non-raised portions 214 and 216 of the respective radial support plates when positioned on the shaft 130, as discussed above.

The yoke 202 is mounted on the shaft 130 by positioning the shaft within the yoke and then positioning the front and rear radial support plates 204, 206 on the front and rear support plate engagement surfaces 230, 240 of the shaft. The outer circumferential surfaces of the raised annular rings 212, 214 engage the inner surface of the yoke as the radial support plates are pushed against the respective second steps of the shaft. The non-raised surfaces 214, 224 of the two radial support plates are secured to the end of the yoke by screws (not shown), by welding, or by other suitable methods so that the shaft assembly comprises the solid inner shaft surrounded by the hollow cylindrical yoke. Accordingly, the completed 7.5-inch diameter shaft assembly is substantially less massive than a solid shaft having the same diameter.

In the illustrated embodiment, the shaft 130 comprises chrome stainless steel, and the two radial support plates 202, 204 and the yoke 200 comprises carbon steel. Accordingly, by providing the shaft assembly as a central shaft surrounded by the yoke, the overall shaft assembly is less costly than if the entire assembly comprised chrome stainless steel.

Figure 10:
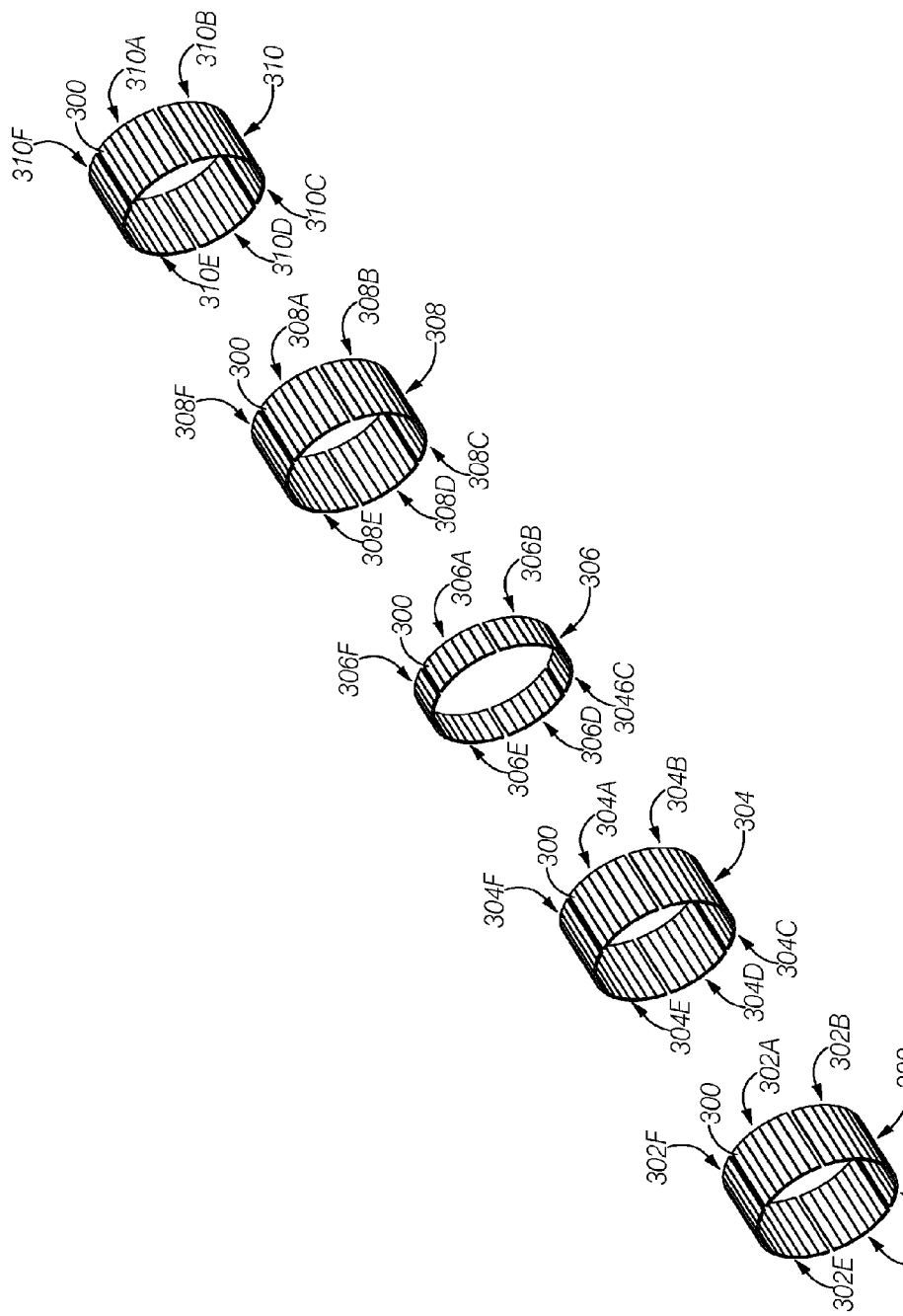
FIG. 10 illustrates an enlarged exploded perspective view of the rotor magnets of FIGS. 6A and 6B.

As shown in the exploded view of FIG. 6A and in the completed assembly of FIG. 6B, the outer surface of the cylindrical yoke 202 supports a plurality of magnets 300 configured in a first cylindrical row 302, a second cylindrical row 304, a third cylindrical row 306, a fourth cylindrical row 308 and a fifth cylindrical row 310. In the illustrated embodiment, each of the five rows of magnets comprises 42 magnets, which are radially disposed about the outer circumference of the cylindrical yoke as shown in FIG. 6B. As shown in the enlarged exploded perspective view in FIG. 10, each row of 42 magnets is further grouped as six subsets of seven magnets each. The subsets are identified in FIG. 10 as 302A-F, 304A-F, 306A-F, 308A-F and 310A-F. In the illustrated embodiment, each magnet has a width of approximately 0.5 inch and a thickness (in the radial direction toward the center of the rotor 130) of approximately 0.125 inch so that each magnet has a generally rectangular cross section. In alternative embodiments, the magnets may have at least a curved inner surface to conform to the curvature of the outer surface of the cylindrical yoke. In a further alternative, the outer surface of the cylindrical yoke may be shaped to provide a flat mounting surface for the magnets. Each magnet is secured to the outer surface of the yoke with a suitable adhesive or by a suitable fastener, such as a recessed screw (not shown).

When mounted as shown in FIG. 6B, each subset of seven magnets is spaced apart for an adjacent subset of seven magnets by less than approximately 0.25 inch. Basically, each subset of seven magnets occupy a circumferential arc of slightly less than approximately 56 degrees and are spaced apart from adjacent subsets of magnets by slightly more than approximately 4 degrees. Each magnet in the first, second, fourth and fifth sets of magnets has a length along the cylindrical surface of approximately 4 inches. Each magnet in the third set of magnets has a length along the cylindrical surface of approximately 2 inches. The sets of magnets are spaced apart by approximately 0.025 inch along the length of the cylindrical yoke.

Each magnet 300 advantageously comprises a ferrite ceramic magnet. For example, one such magnet that is suitable is a Model BZX082 Grade N42 nickel-plated neodymium block magnet, which is commercially available from K&J Magnetic Products, Inc., of Jamison, Pa. Each magnet is magnetized through its thickness to provide a north pole on one of the outer surface (away from the central rotational axis 138 of the rotor 130) and the inner surface (towards the central rotational axis of the rotor). The magnetic polarities of the magnets are selected so that the magnets in each subset have their respective poles oriented in the same direction with respect to the rotational axis of the rotor and so that the magnets in adjacent subsets have their respective poles oriented in opposite directions with respect to the rotational axis of the rotor. For example, assuming the magnets in the subset 302A are oriented with their north poles facing radially outward, the magnets in the corresponding subsets 304A, 306A, 308A and 310A in the second, third, fourth and fifth rows of magnets also have their north poles facing radially outward. The magnets in the subsets 302B, 304B, 306B, 308B and 310B have their south poles facing radially outward. The magnets in the subsets 302C, 304C, 306C and 310C have their north poles facing radially outward. The magnets in the subsets 302D, 304D, 306D and 310D have their south poles facing radially outward. The magnets in the subsets 302E, 304E, 306E, 308E and 310E have their north poles facing radially outward. The magnets in the subsets 302F, 304F, 306F, 308F and 310F have their south poles facing radially outward. Accordingly, the magnets are configured as a six-pole rotor having three pole pairs.

As shown in FIGS. 1-4, the rotor 130 is supported between the front cover (front bearing plate) 112 and the rear cover (rear bearing plate) 114 so that the rotor is centered within a stator structure 400 shown in FIGS. 3 and 4. The stator structure is shown in more detail in exploded views in FIGS. 11-41.

Figure 11A:
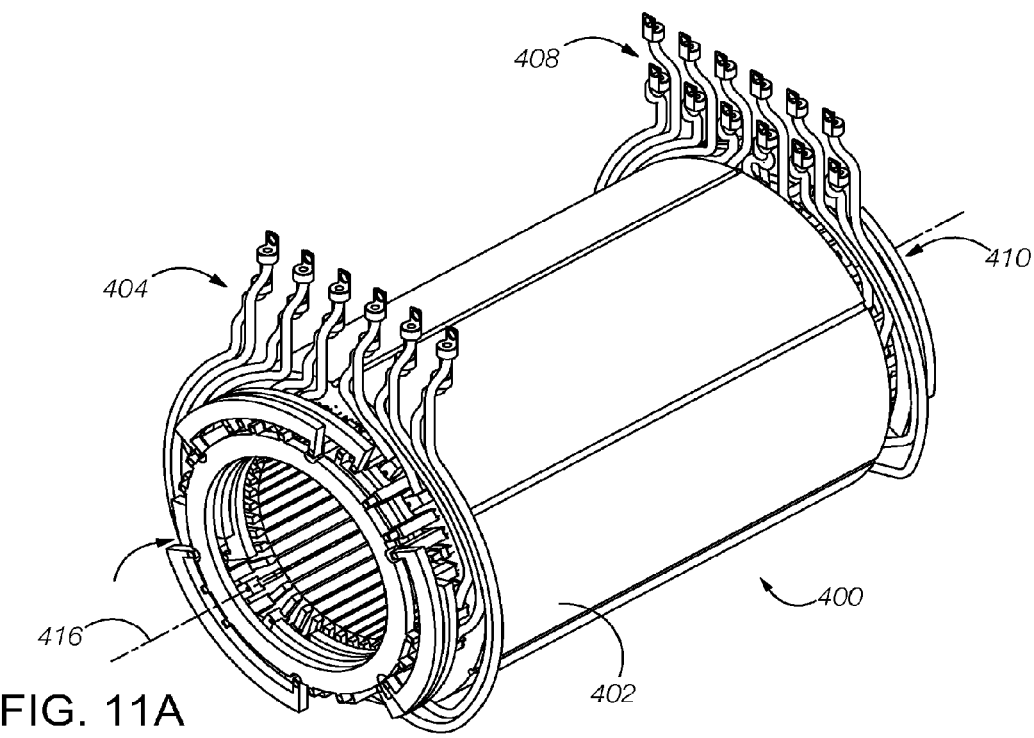
FIG. 11A illustrates a front perspective view of the stator structure of the motor as shown in FIGS. 1 and 3 but with the motor enclosure and electronics housing removed to show the stator laminate and the connections to the stator conductors.
Figure 11B:
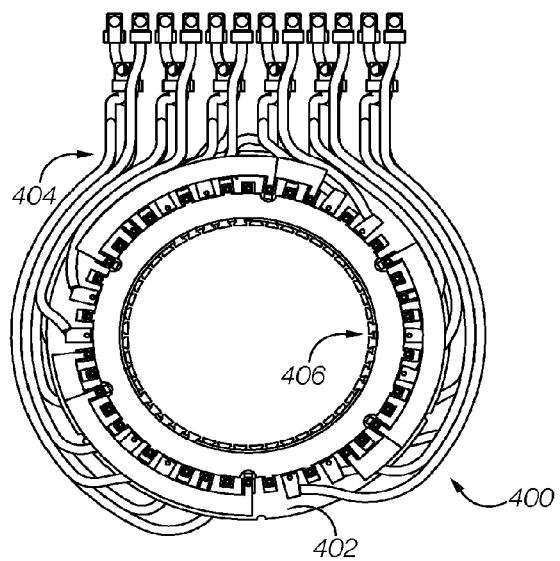
FIG. 11B illustrates a front elevational view of the stator structure of FIG. 11A.
Figure 11C:
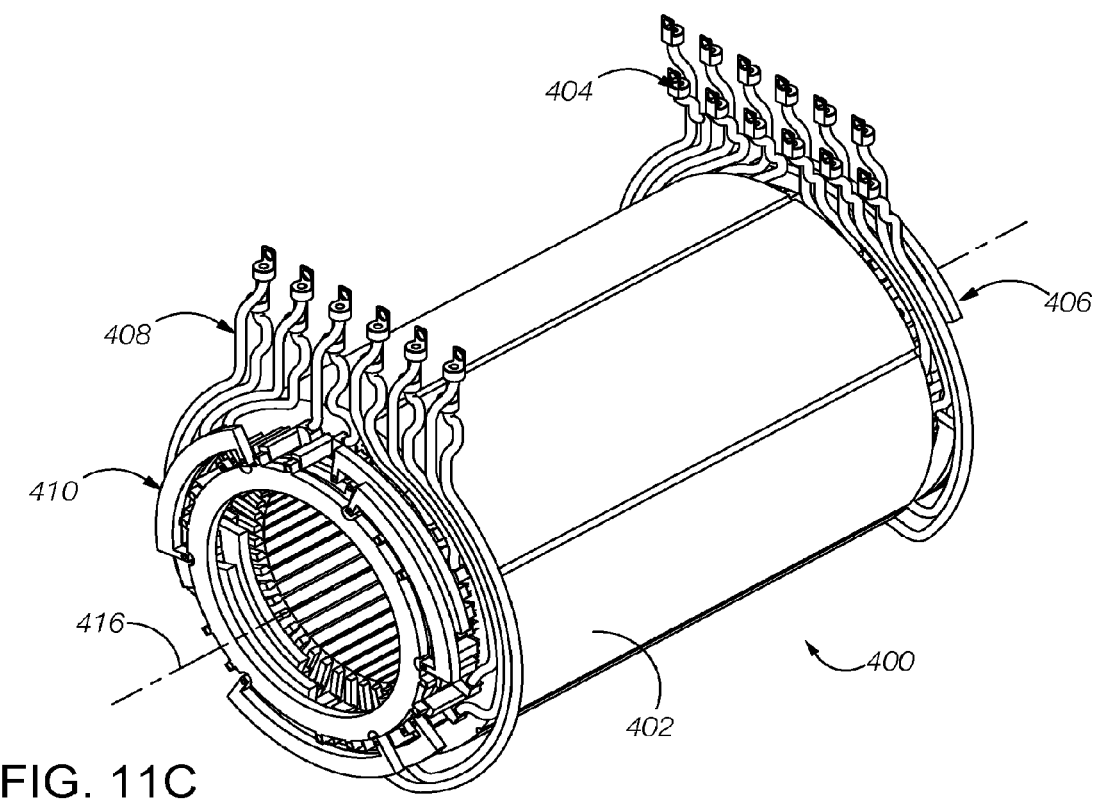
FIG. 11C illustrates a rear perspective view of the stator structure of the motor as shown in FIGS. 2 and 4 but with the motor enclosure and electronics housing removed to show the stator laminate and the connections to the stator conductors.
Figure 11D:
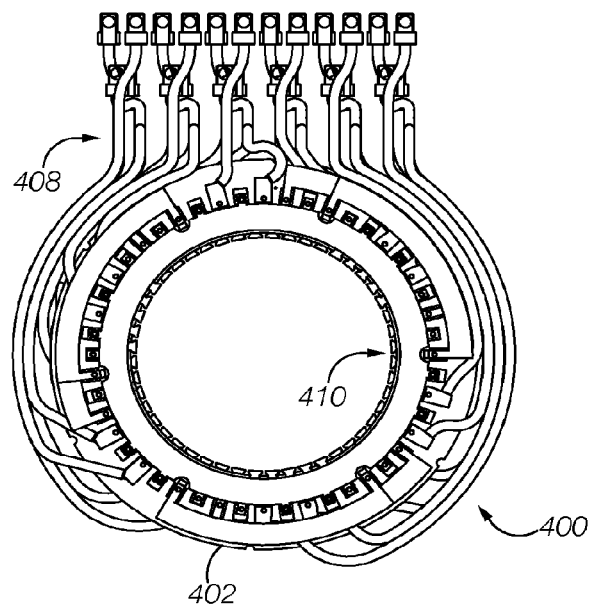
FIG. 11D illustrates a rear elevational view of the stator structure of FIG. 11C.

FIG. 11A illustrates a front perspective view of the stator structure 400; and FIG. 11B illustrates a front elevational view of the stator structure. FIG. 11C illustrates a rear perspective view of the stator structure; and FIG. 11D illustrates a rear elevational view of the stator structure. In FIGS. 11A-11D, the outer enclosure 110, the front cover 112, the rear cover 114 and the rotor 130 and associated components are removed to show the structure more clearly. The stator structure includes a generally cylindrical stator support structure 402, a front set of supply wires 404, a front set of interconnection jumpers 406, a rear set of supply wires 408 and a rear set of interconnection jumpers 410.

Figures 12A, 12B:
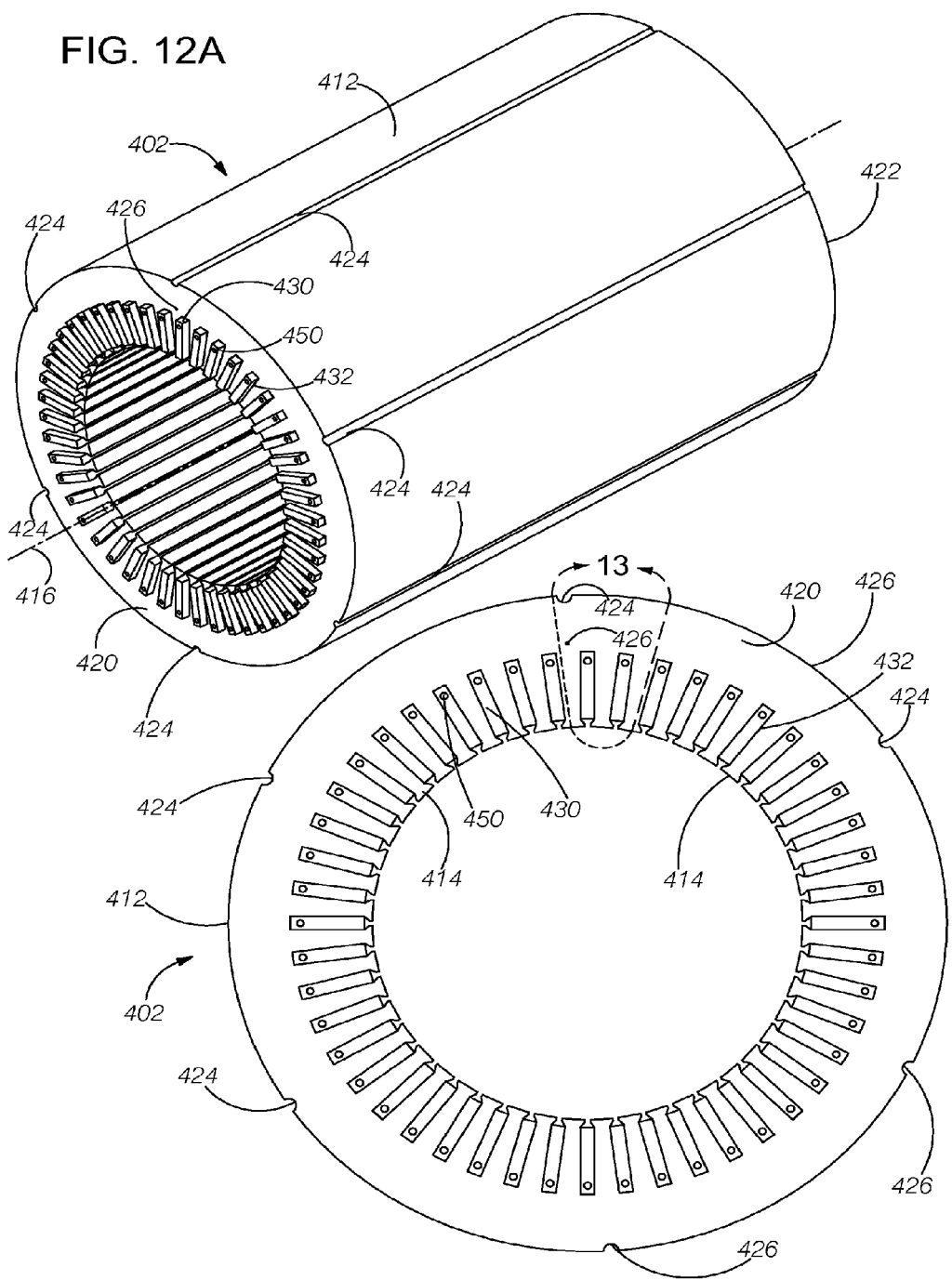
FIG. 12A illustrates a front perspective view of a stator laminate and stator winding conductors of FIG. 11A with the supply wires and the interconnection jumpers removed.
FIG. 12B illustrates a front elevational view of the stator laminate and stator winding conductors of FIG. 12A.

FIG. 12A illustrates a front perspective view of a stator laminate 402 with the front and rear sets of supply wires 404, 408 and the front and rear sets of interconnection jumpers 408, 410 removed to show the stator laminate and the stator winding conductors (described below) more clearly. FIG. 12B illustrates a front elevational view of the stator element with the supply wires and interconnection jumpers removed. The stator laminate forms a generally cylindrical support structure having an outer cylindrical surface 412 and an inner cylindrical surface 414 (see FIGS. 12B and 13). The inner and outer surfaces are concentric with a central axis 416, which will be aligned with the central rotational axis 138 of the shaft 130 when the yoke assembly 200 is installed in the stator structure 400. The rear perspective view and the rear elevational view of the stator laminate and the stator winding conductors are respective mirror images of the views shown in FIGS. 12A and 12B, respectively, and are not shown as separate figures.

In FIG. 12A, the stator laminate 402 is shown as a solid body; however, in a preferred embodiment, the stator laminate comprises a plurality of thin layers (laminations) of low carbon steel alloyed with small amounts of carbon to increase the electrical resistivity, which helps to reduce the eddy currents in the laminates. For example, the laminations may advantageously comprise commercially available 24 gauge (0.0250 inch thick) M-19 silicon steel (electrical steel) coated with a thin layer of an ASTM Type C-5 inorganic-based surface insulation. Preferably, each layer is formed to have the cross section shown in FIG. 12B. The laminations are mechanically interconnected with a suitable adhesive in a conventional manner. In the illustrated embodiment, when the stator laminate is completed, the outer surface has a diameter of approximately 12.7 inches, and the inner surface has a diameter of approximately 7.6 inches. In the illustrated embodiment, the stator laminate has a length between a front end 420 and a rear end 422 of approximately 18 inches, which corresponds to approximately 720 laminations. The number of laminations will depend in part on the insulation thickness and the thickness of the adhesive that interconnects adjacent layers. In the illustrated embodiment, the stator laminate includes a plurality (e.g., six) of longitudinal grooves 424 in the outer surface. The grooves are advantageously used to engage corresponding ridges (not shown) in the inner cylindrical surface (not shown) of the enclosure housing 110 so that the stator laminate is maintained in a fixed angular position within the enclosure housing after insertion therein. In the illustrated embodiment, the stator laminate further includes an indexing hole 426, which extends longitudinally from the front end to the rear end of the laminate. The indexing hole provides a visual indication of the "top" of the stator laminate and is advantageously used to position the stator laminate in a consistent angular position within the enclosure housing. The indexing hole is also advantageously used to consistently identify the conductors when attaching the power supply wiring 404, 408 and the interconnection jumpers 406, 410, as described in detail below.

As further shown in FIGS. 12A and 12B and in the enlarged view of FIG. 13, the stator laminate 402 supports a plurality of stator winding conductors (hereinafter "conductors") 430 that extend longitudinally through respective radial slots 432 formed along the inner surface 414. In the illustrated embodiment, the stator laminate supports 48 conductors in respective 48 slots spaced apart by approximately 7.5 degrees about the central axis 416. Each conductor has a length of approximate 18.5 inches, which is longer than the length of the laminate by approximately 0.5 inch such that each end of each conductor extends approximately 0.25 inch beyond the respective end of the stator laminate. Preferably, the conductors comprise copper or other suitable conductive material wrapped with or coated with a suitable insulating material.

Figure 13:
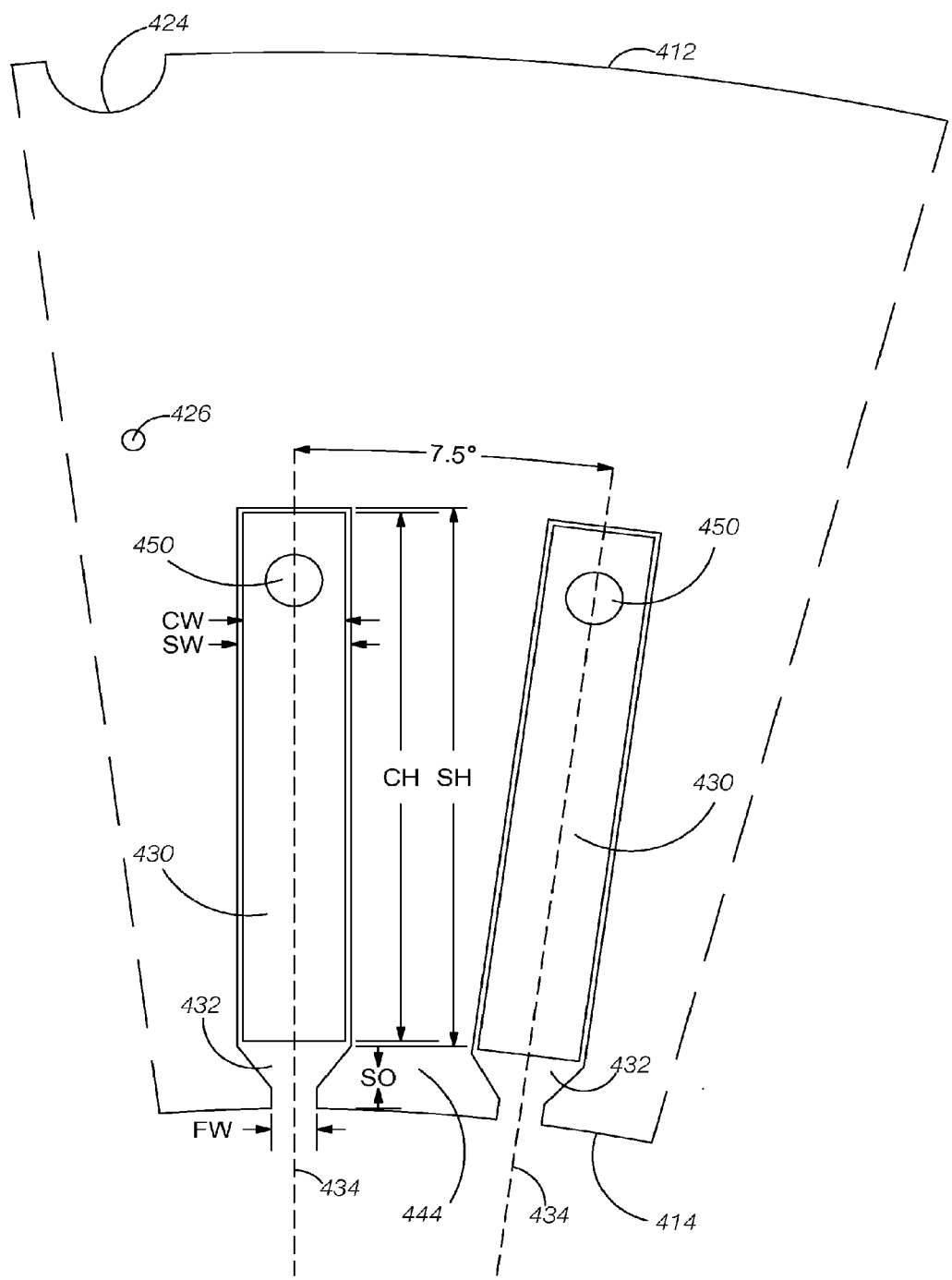
FIG. 13 illustrates an enlarged elevational view of a portion of the stator laminate and of two of the conductors taken within the area—13—in FIG. 12B.

As shown in an enlarged elevational end view of two of the conductors 430 in two of the slots 432 in FIG. 13, each conductor has a generally rectangular cross section with a width (CW) at a top and bottom of approximately 0.25 inch and a height (CH) along each of two sides of approximately 1.3 inches. The height of each conductor is oriented along a respective radial line 434 from the central axis 416 (FIG. 12A) of the stator laminate. The top of each conductor is positioned further from the central axis along the radial line; and the bottom is positioned closer to the central axis along the radial line.

In the illustrated embodiment, each slot 432 has first rectangular portion that has a major width (SW) that is slightly larger than the width of the conductor and has a major height (SH) that is slightly larger than the height of the conductor so that the conductor can be inserted into the rectangular portion of the slot and fit snugly therein. (The differences in the widths and heights of the conductors and the slots are exaggerated in FIG. 13 for illustration only.) The top of the rectangular portion of the slot is offset from the outer cylindrical surface 412 of the stator laminate 402 by approximately 1.1 inches such that the outer portion of the laminate forms a solid annular ring around the slots. The rectangular portion of the slot is offset from the inner cylindrical surface 414 of the stator laminate 402 by an offset distance (SO), which is approximately 0.15 inch in the illustrated embodiment. The slot extends to the inner cylindrical surface of the laminate by a first transition portion 440 that has an initial width corresponding to the major width (SW) of the slot and that tapers to a final width (FW) that is approximately 0.1 inch. The height of the transition portion is approximately 0.1 inch. The slot then extends to the inner cylindrical surface of the laminate by a second transition portion 442 that has the final width (FW) and that extends for approximately 0.05 inch. As illustrated in FIGS. 12B and 13, the laminate remaining between adjacent slots forms a generally T-shaped structure 444, wherein the innermost surface of the "T" is curved in accordance with the curvature of the inner cylindrical surface.

As further illustrated in FIG. 13, the 48 slots 432 are spaced apart angularly by substantially equal angular offsets. In particular, the radial lines 434 through the cross-sectional centers of the slots, and thus through the cross-sectional centers of the conductors 430, are approximately 7.5 degrees apart.

As shown in FIG. 13, front end of each conductor 430 has a threaded bore 450 formed near the top. In the illustrated embodiment, the threaded bore is positioned approximately 0.175 inch from the top of the conductor and is thus positioned 5.075 inches from the center of the laminate. In the illustrated embodiment, the bore has an initial diameter of approximately 0.125 inches and is tapped with a #8 thread. The rear end of each conductor has a corresponding threaded bore located a corresponding distance from the top of the conductor. Preferably, each conductor is symmetrical such that either end of the conductor can be positioned in the laminate as the front end of the conductor.

As indicated above, when positioned in the stator laminate 402 as shown in FIGS. 11A, 11B, 12A, 12B and 13, each conductor 430 extends from each end of the respective slot 432 by approximately 0.025 inch. The threaded bores 450 in the conductors form a circular pattern with a radius of approximately 5.075 inches from the central axis 416 of the laminate. The threaded bores are spaced apart angularly by approximately 7.5 degrees.

Figure 14:
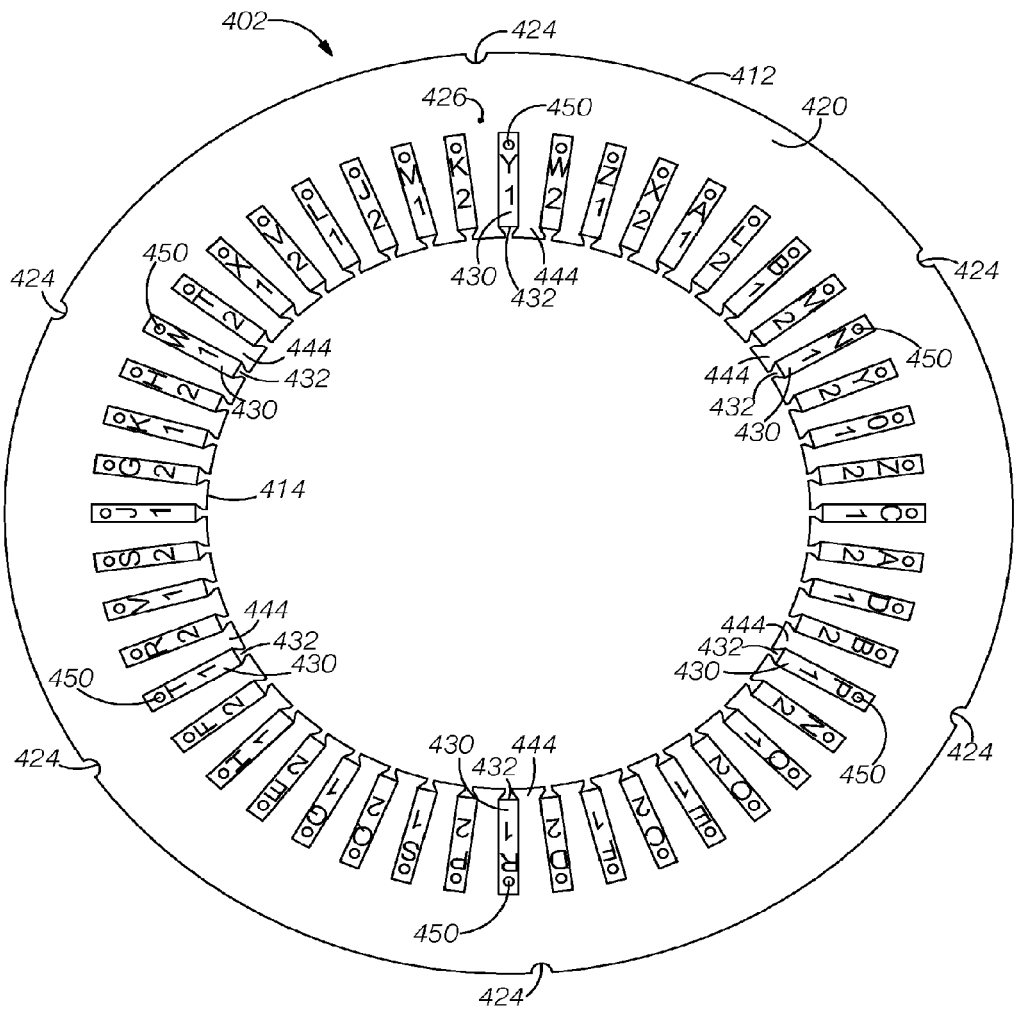
FIG. 14 illustrates a front elevational view of the stator laminate and stator winding conductors corresponding to the view of FIG. 12B with the ends of the stator winding conductors annotated with the phase windings associated with the conductors.
Figure 15:
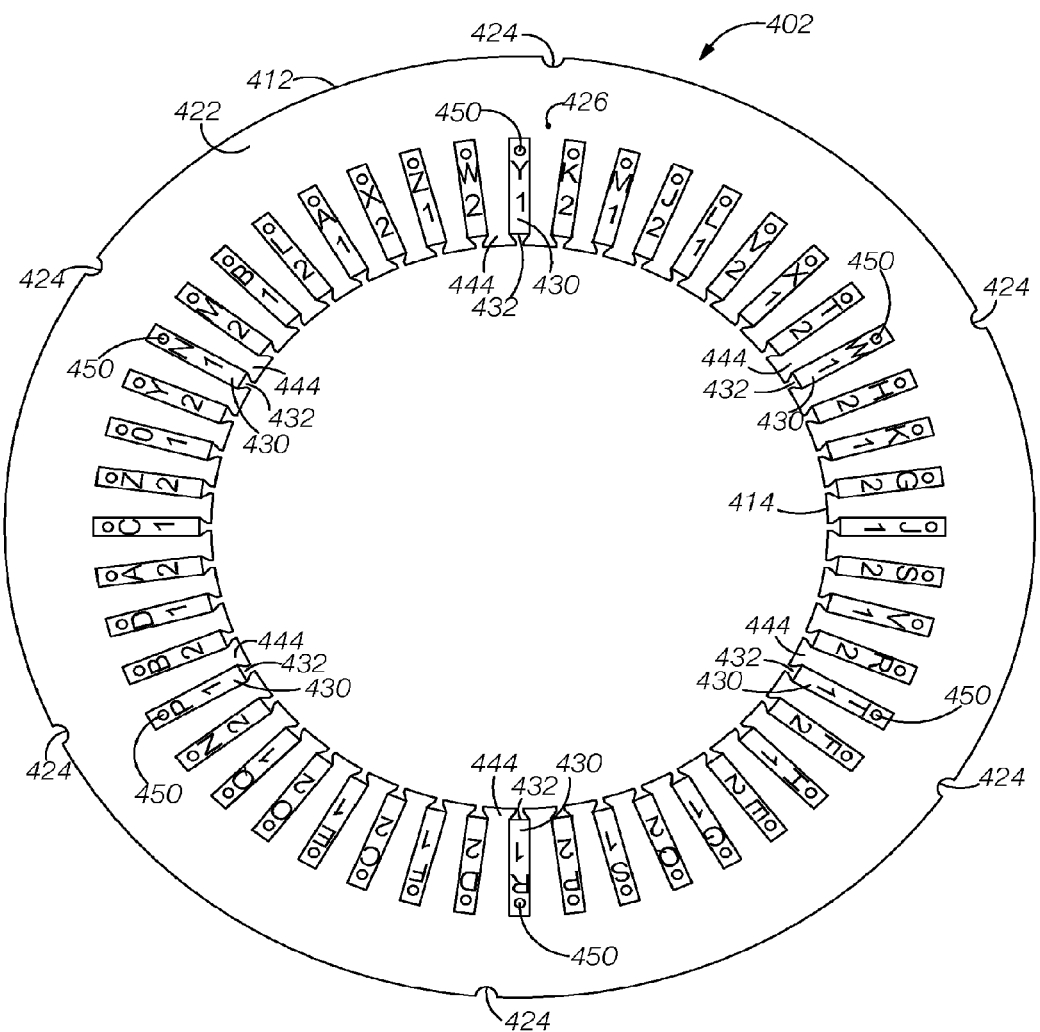
FIG. 15 illustrates a rear elevational view of the stator laminate and stator winding conductors, which is a mirror image of the view of FIG. 14, and the ends of the stator winding conductors are annotated accordingly.

For convenience, the conductors 430 are identified as illustrated in the front elevation view of FIG. 14 and the rear elevation view of FIG. 15. In the front elevation view of FIG. 14, the first conductor to the right of the indexing hole 426 of the lamination 402 is identified as Y1 to indicate that the conductor is the first of two conductors associated with phase "Y. The second conductor to the right of the indexing hole is identified as W2. The third conductor to the right of the index hole is identified Z1. The fourth conductor to the right of the indexing hole is identified as X2. The fifth conductor to the right of the indexing hole is identified as the conductor A1 to indicate that the conductor is the first of two conductors associated with phase "A." The remaining 43 conductors are identified in sequence in the clockwise direction as: L2; B1; M2; N1; Y2; O1; Z2; C1; A2; D1; B2; P1; N2; Q1; O2; E1; C2; F1; D2; R1; P2; S1; Q2; G1; E2; H1; F2; T1; R2; V1; S2; J1; G2; K1; H2; W1; T2; X1; V2; L1; J2; M1; and K2. The conductor K2 is immediately to the left of the indexing hole. Note that "I" and "U" are not used to label the conductors to avoid confusion with "1" and "V" in other labels.

As illustrated in FIG. 15, the conductors 430 are labeled in the same sequence on the rear elevational view except that the conductor Y1 is the first conductor to the left of the index hole of the lamination 402. The sequence on the rear end proceeds counterclockwise with the last conductor to the right of the indexing hole being the conductor K2.

Figure 16:
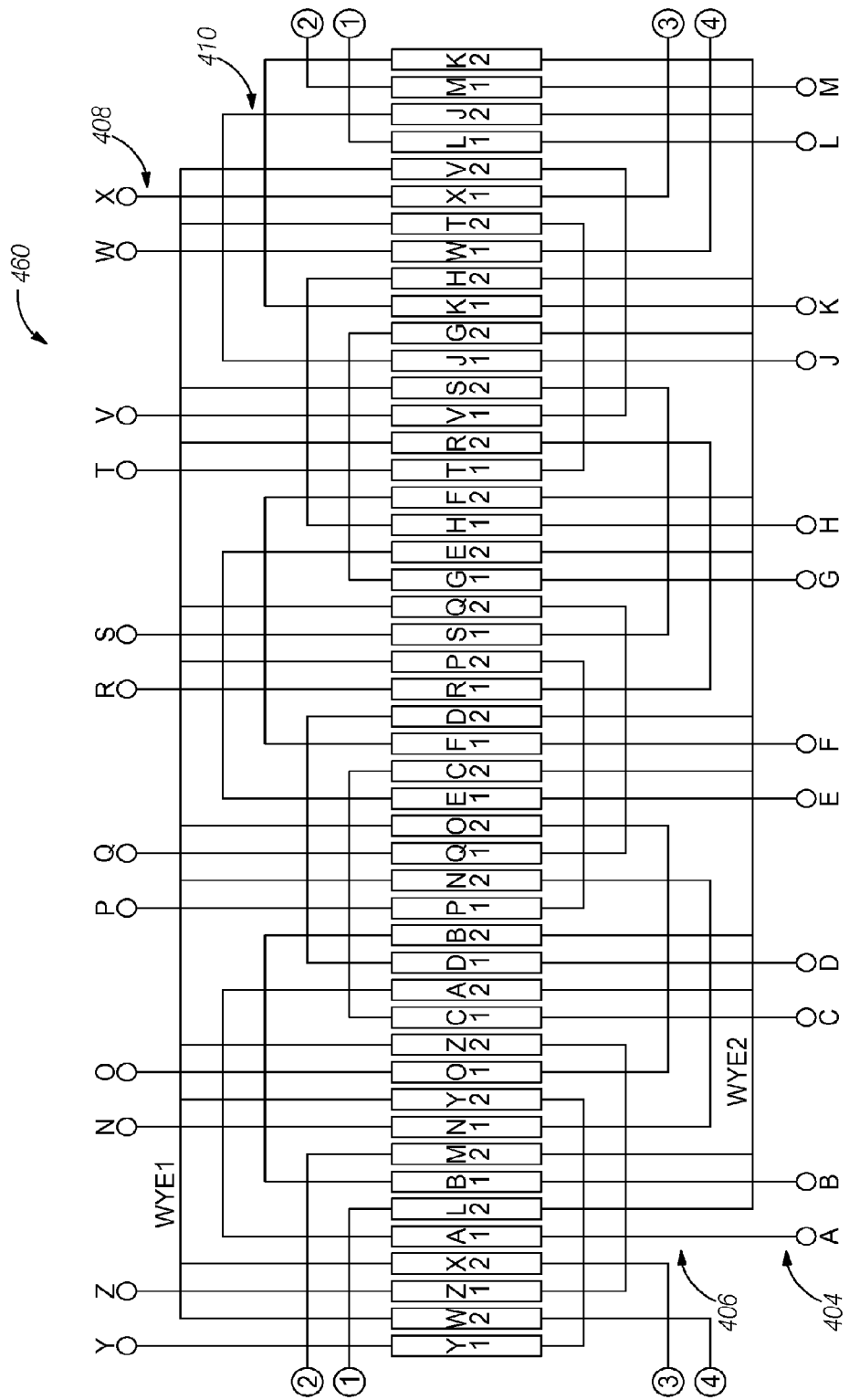
FIG. 16 illustrates a schematic plan view of the stator winding conductors of FIGS. 14 and 15, further showing the power supply connections and the interconnections between the windings to form a wye-circuit configuration.

The conductors 430 are connected to the front power supply wiring 404, the rear power supply wiring 408, the front interconnection jumpers 406 and the rear interconnection jumpers 410 in the manner described below to produce the interconnection circuit 460 shown in FIG. 16, which illustrates the conductors, power supply wiring and interconnections in a plan view pattern that corresponds to the 48 conductors being "unwrapped" from the stator laminate 402 and laid flat. The first conductor at the left is the conductor Y1 corresponding to the position of the conductor Y1 immediately to the right of the indexing hole 426 at the top center in the front elevational view of FIG. 14. The conductors W2, Z1, X2 and A1 are to the right of the conductor Y1, as previously identified in FIG. 14. The other 43 conductors are positioned sequentially to the right in the same order as the conductors are positioned in the clockwise direction in FIG. 14, with the last conductor K2 corresponding to the conductor to the immediate left of the conductor Y1 in FIG. 14. Accordingly, it should be understood that left-to-right in FIG. 16 corresponds to clockwise in FIG. 143. In FIG. 16, the lower end of each conductor corresponds to the front end of each conductor in FIG. 14, and the upper end of each conductor corresponds to the rear end of each conductor in FIG. 15. It should be further understood that any conductor could be identified as the conductor A1 and the naming sequence could begin at the location of the so-identified conductor.

As shown in FIG. 16, the front (lower) end of each of the conductors A1, B1, C1, D1, E1, F1, G1, H1, J1, K1, L1 and M1 is connected to a respective terminal identified with the corresponding letter. Similarly, the rear (upper) end of each of the conductors N1, O1, P1, Q1, R1, S1, T1, V1, W1, X1, Y1 and Z1 is connected to a respective terminal identified with the corresponding letter.

The rear (upper) end of the conductor A1 is connected to the rear (upper) end of the conductor A2. The rear (upper) end of each conductor B1, C1, D1, E1, F1, G1, H1, J1, K1, L1 and M1, respectively, is connected to the rear (upper) end of the conductor B2, C2, D2, E2, F2, G2, H2, J2, K2, L2 and M2, respectively. The front (lower) ends of the conductors A2, B2, C2, D2, E2, F2, G2, H2, J2, K2, L2 and M2 are connected together to form a common node identified as "WYE 1" in FIG. 16. Note that in FIG. 16, the numbers within the circles at the left and right sides of the drawings indicate that the lines connected to respectively numbered circles are interconnected.

As further shown in FIG. 16, the front (lower) end of the conductor N1 is connected to the front (lower) end of the conductor N2. The front (lower) end of each conductor O1, P1, Q1, R1, S1, T1, V1, W1, X1, Y1 and Z1, respectively, is connected to the front (lower) end of the conductor O2, P2, Q2, R2, S2, T2, V2, W2, X2, Y2 and Z2, respectively. The rear (upper) ends of the conductors N2, O2, P2, Q2, R2, S2, T2, U2, V2, W2, X2 and Y2 are connected together to form a common node identified as "WYE 2" in FIG. 15.

Figure 17:
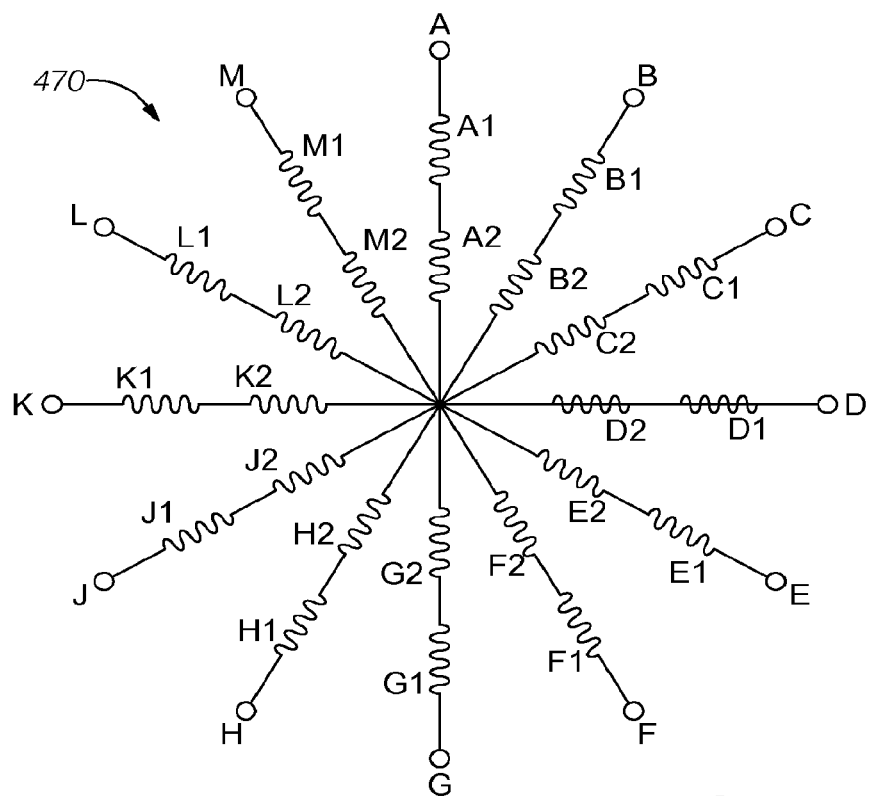
FIG. 17 illustrates the wye-circuit resulting from the supply connections to the conductors A1, B1, C1, D1, E1, F1, G1, H1, J1, K1, L1 and M1 on the front end of the stator structure, the interconnections of the conductors A1, A2; B1, B2; C1, C2; D1, D2; E1, E2; F1, F2; G1, G2; H1, H2; J1, J2; K1, K2; L1,L2; and M1, M2 on the rear side of the stator structure; and the interconnections of the conductors A2, B2, C2, D2, E2, F2, G2, H2, J2, K2, L2 and M2 to the common wye node on the front end of the stator structure as shown in FIG. 11A.
Figure 18:
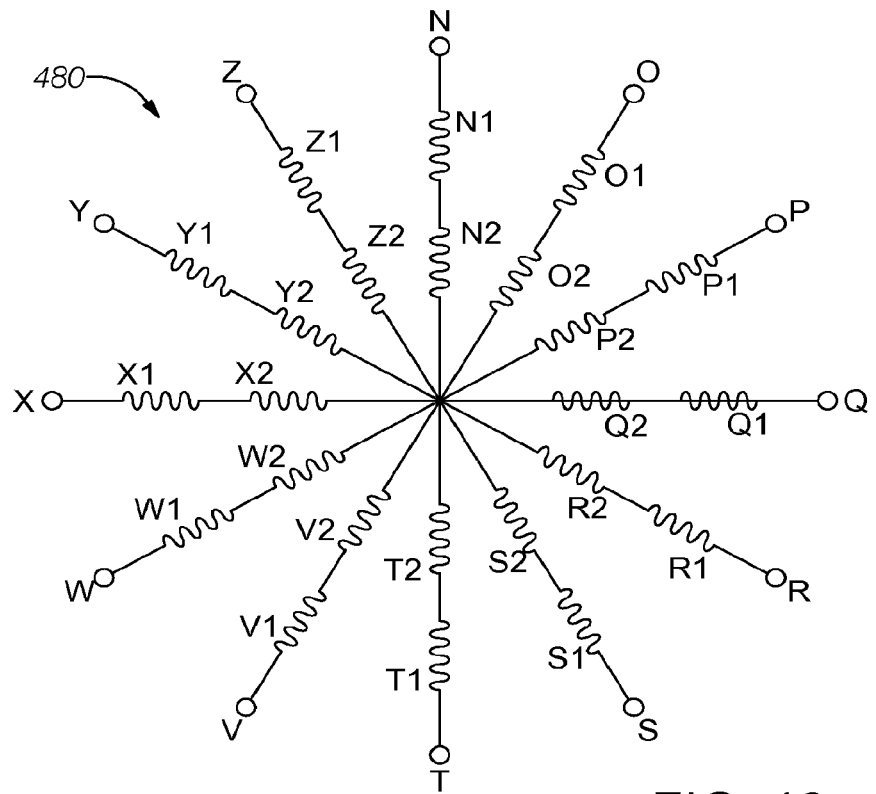
FIG. 18 illustrates the wye-circuit resulting from the supply connections to the conductors N1, O1, P1, Q1, R1, S1, T1, V1, W1, X1, Y1 and Z1 on the rear end of the stator structure, the interconnections of the conductors N1, N2; O1, O2; P1, P2; Q1, Q2; R1, R2; S1, S2; T1, T2; V1, V2; W1, W2; X1, X2; Y1,Y2; and Z1, Z2 on the front side of the stator structure; and the interconnections of the conductors N2, O2, P2, Q2, R2, S2, T2, V2, W2, X2, Y2 and Z2 to the common wye node on the rear end of the stator structure as shown in FIG. 11C.

When connected as illustrated in FIG. 16, the conductors 430 form two 12-phase wye-connected sets of coils illustrated in FIGS. 17 and 18, respectively. In particular, FIG. 17 illustrates a first set 470 of wye-connected conductors A1-A2, B1-B2, C1-O2, D1-D2, E1-E2, F1-F2, G1-G2, H1-H2, J1-J2, K1-K2, L1-L2 and M1-M2 connected between the terminals A, B, C, D, E, F, G, H, J, K, L and M and the first node WYE-1. FIG. 18 illustrates a second set 480 of wye-connected conductors N1-N2, O1-O2, P1-P2, Q1-Q2, R1-R2, S1-S2, T1-T2, V1-V2, W1-W2, X1-X2, Y1-Y2 and Z1-Z2 connected between the terminals N, O, P, Q, R, S, T, V, W, X, Y and Z and the second node WYE-2. As illustrated by the structure described below, the two sets of wye-connected conductors form two mirrored stators that drive a common rotor (e.g., the rotor 130).

As illustrated in FIG. 16, the 24 conductors are arranged in a pattern. The pattern is continuous, and there is no specific beginning and ending location. Accordingly, the pattern can be described starting at any conductor. For convenience, the conductor Y1 at the left in FIG. 16 is used in the following discussion. Starting with the conductor Y1, each group of 8 conductors comprises a subgroup of 4 conductors associated with the second set of conductors (e.g., Y1, W2, Z1, X2) followed by subgroup of 4 conductors associated with the first set of conductors (e.g., A1, L2, B1, M2). Furthermore, the conductors are arranged so that each first conductor (e.g., Y1, Z1, A1, B1) is spaced apart from a next first conductor by an intervening second conductor (e.g., W2, X2, L2, M2). Note further that the intervening second conductors within a group are electrically connected to respective first conductors in an adjacent group. For example, the conductor L2 between the conductor A1 and the conductor B1 is electrically connected to the conductor L1 in the group of eight conductors to the left of the group in which A1 and B1 are located. Because of the flattened representation in FIG. 16, the group in which the conductor L1 is positioned is at the far right in FIG. 16. In the particular interconnection pattern shown in FIG. 16, each respective second conductor is spaced apart from the respective first conductor by 8 intervening conductors. For example, counting from the left in FIG. 16, the first conductor A1 is in position 5, and the respective second conductor A2 is in position 14. The conductors L2, B1, M2, N1, Y2, O1, Z2, C1 are the 8 intervening conductors. Accordingly, in the actual stator, the conductors in each pair of conductors are spaced apart by 67.5 degrees (e.g., 9×7.5 degrees). As described below, the selected spacing between interconnected conductors enables the conductors to be connected with similar interconnection jumpers. As also described below, the selected spacing assures that when the current flowing in the first conductor in a pair contributes to a magnetic pole in a first direction the current flowing in the second conductor contributes to an adjacent magnetic pole in the opposite direction.

Because of the number of phases (48), the conductors 430 of the stator structure 400 are interconnected by a unique layered bus system illustrated in FIGS. 19-47. Because of the complexity of the layered bus system, the structure is illustrated as a sequence of construction steps so that each layer can be easily visualized.

Figure 19:
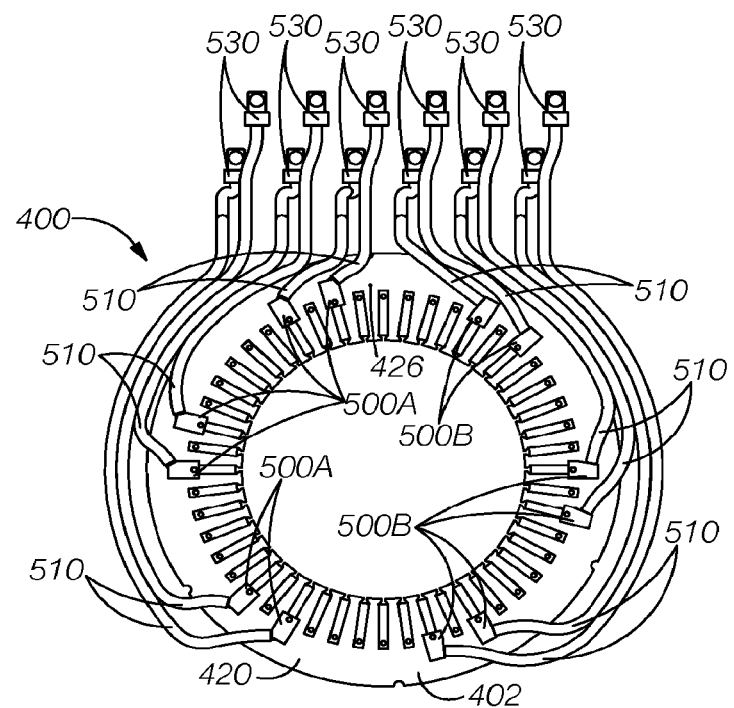
FIG. 19 illustrates a front elevational view of the stator laminate and the conductors after the attachment of the engagement connectors and the power supply wires to the conductors A1, B1, C1, D1, E1, F1, G1, H1, J1, K1, L1 and M1 on the front end of the stator structure.
Figure 20:
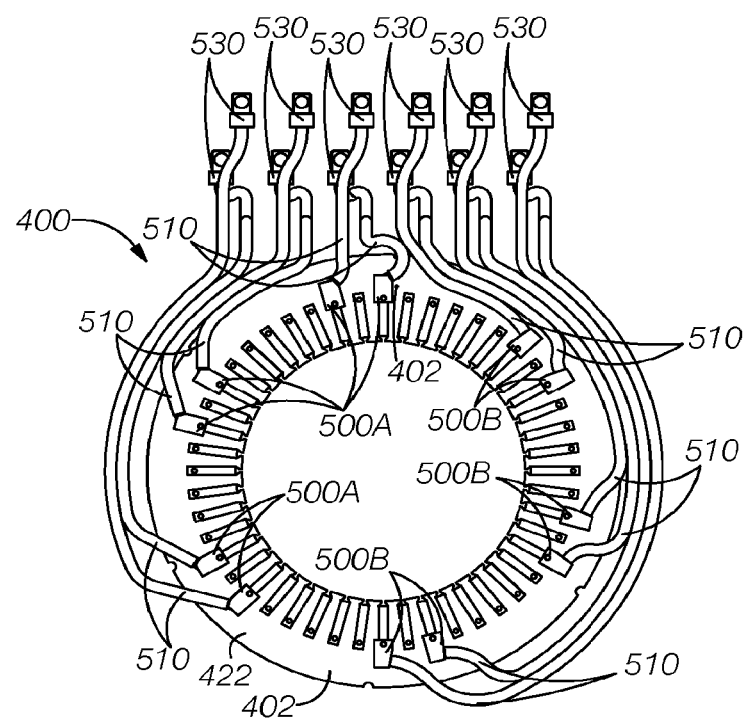
FIG. 20 illustrates a rear elevational view of the stator laminate and the conductors after the attachment of the engagement connectors and the power supply wires to the conductors N1, O1, P1, Q1, R1, S1, T1, V1, W1, X1, Y1 and Z1 on the rear end of the stator structure.

FIG. 19 illustrates a first step of attaching a plurality of connectors 500 to the respective front ends of selected conductors 430. In particular, a respective engagement connector is attached to the respective front end of each of the conductors A1, B1, C1, D1, E1, F1, G1, H1, J1, K1, L1 and M1. Similarly, as shown in FIG. 20, a respective engagement connector is attached to the respective rear end of each of the conductors N1, O1, P1, Q1, R1, S1, T1, V1, W1, X1, Y1 and Z1.

Figure 21A:
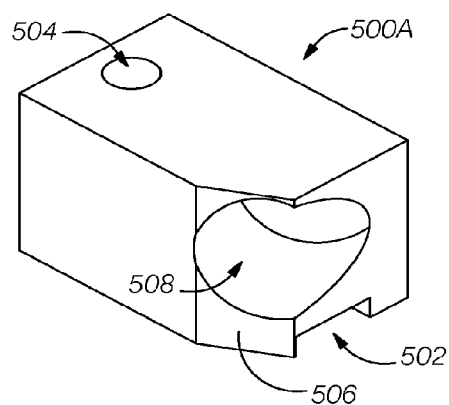
FIGS. 21A and 21B illustrate two forms of engagement connectors to connect the ends of the conductors to the power supply wiring.
Figure 21B:
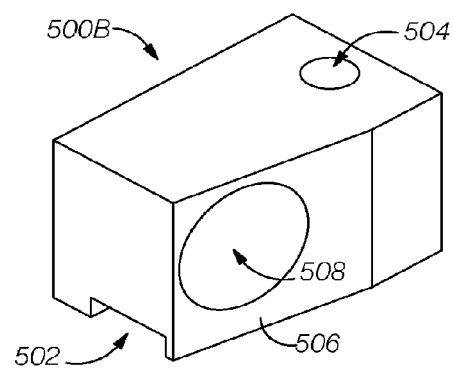
Figure 24:
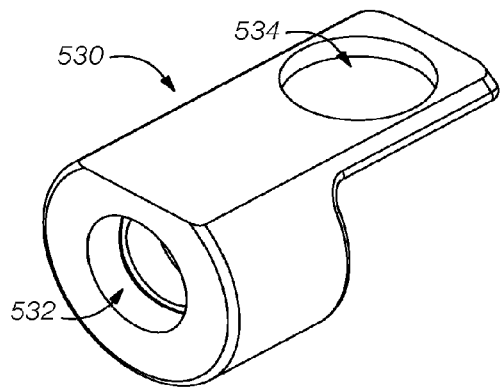
FIG. 24 illustrates a perspective view of a power supply wire interconnection terminal for connecting the power supply wire to a driver output terminal on the electronics support board of FIGS. 22 and 23.

FIGS. 21A and 21B illustrate perspective views of two embodiments of the engagement connectors 500 including a first embodiment 500A (FIG. 21A) and a second embodiment 500B (FIG. 21B). Each embodiment is formed as a generally box-like structure having a length of approximately 0.8 inch, a width of approximately 0.5 inch and a height of approximately 0.5 inch. Each embodiment includes a respective groove 502 on the bottom of the connector oriented along the length of the connector. The groove is sized to match the width of the conductor 430 so that the groove engages the end of the conductor when the engagement connector is positioned on the end of the conductor. In the illustrated embodiments, the groove has a width of approximately 0.25 inch and a depth of approximately 0.0625 inch. A through bore 504 passes from the top to the bottom of the each connector. The lower end of the through bore is aligned with the bottom groove. A fastener (e.g., a screw, not shown) passes through the through bore and engages the threaded bore 450 of the conductor to secure the engagement connector to the end of the conductor. The connector further includes a chamfer 506 formed between an end away from the through bore and one of the long sides of the connector. A wire receiving bore 508 is formed perpendicular to the surface of the chamfer. The wire receiving bore is sized to receive a stripped lower end of an insulated power supply wire 510 (see FIGS. 19 and 20). The lower end of the power supply wire is secured in the engagement connector by a screw (not shown), by crimping, by soldering, by welding, or by other suitable securing methods to provide a strong electrical and mechanical connection between the engagement connector and the power supply wire. The embodiment of FIG. 21A and the embodiment of FIG. 21B are similar except that the chamfered surface of the embodiment of FIG. 21A is formed at an angle of 60 degrees from the end surface and the chamfered surface of the embodiment of FIG. 21B is formed at an angle of 80 degrees from the end surface and is directed to the opposite long side of the connector.

Figure 22:
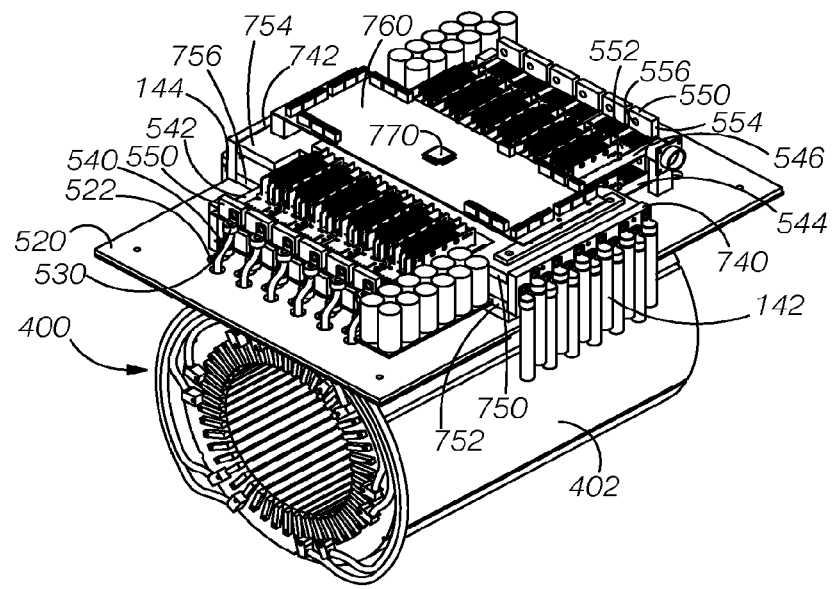
FIG. 22 illustrates a front perspective view of the stator laminate and conductors, showing the connectors and power supply wires added as in FIG. 19, and further showing the routing of the front power supply wires to the electronics support board.
Figure 23:
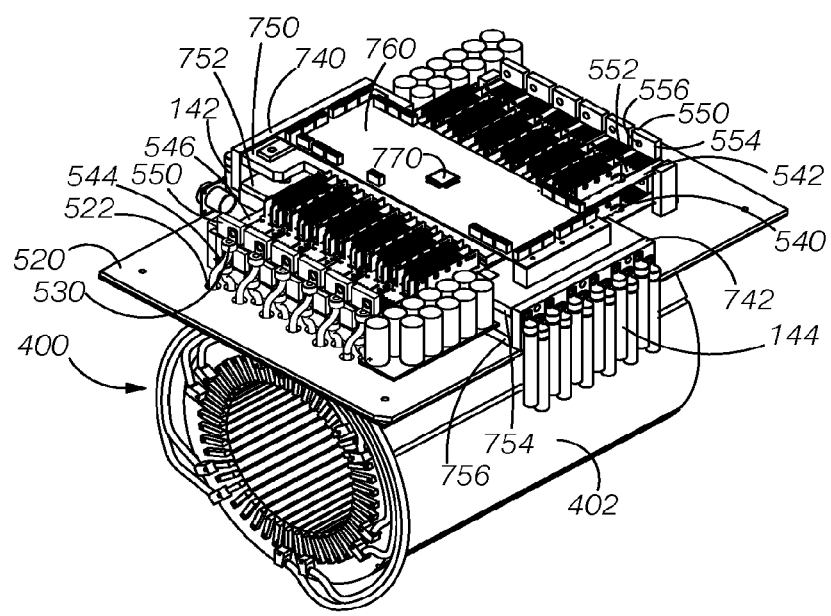
FIG. 23 illustrates a rear perspective view of the stator laminate and conductors, showing the connectors and power supply wires added as in FIG. 20, and further showing the routing of the rear power supply wires to the electronics support board.

As further shown in the perspective views of FIGS. 22 and 23, the power supply wires 510 extend from the respective engagement connectors 500 around the outer perimeter of the stator structure 400 and extend upward through a plurality of bores 522 in an electronics support board 520. A respective stripped upper end of each of the power supply wires is terminated in an interconnection terminal 530. As shown in the perspective view of FIG. 24, the interconnection terminal has a lower bore 532 sized to receive the wire. The upper end of the power supply wire is secured in the bore of the interconnection terminal by a screw (not shown), by crimping, by soldering, by welding, or by other suitable securing methods to provide a strong electrical and mechanical connection between the interconnection terminal and the power supply wire. The interconnection terminal includes a through bore 534 that passes through the interconnection terminal along an axis that is generally perpendicular to an axis passing through the lower bore of the interconnection terminal.

As further shown in FIGS. 22 and 23, the electronics support board 520 supports four motor driver circuit boards comprising a lower front driver board 540, an upper front driver board 542, a lower rear driver board 544 and an upper rear driver board 546. Each of the four driver boards supports six driver output terminals 550. As shown in FIG. 22 for one of the driver output terminals on the upper rear driver board and as shown in FIG. 23 for one of the driver output terminals on the upper front driver board, each driver output terminal includes a horizontal portion 552 that is electrically and mechanically secured to the respective driver board and a vertical portion 554 that includes a threaded bore 556. Each interconnection terminal 530 is connected to a respective one of the output terminals by passing a threaded fastener (e.g., a screw, not shown) through the through bore 534 in the interconnection terminal. Alternatively, the interconnection terminal can be secured to the output terminal by a rivet, by soldering, by welding, or by other suitable methods.

It should be understood that the interconnection terminal 530 for each particular power supply wire 510 is connected to a specific one of the output terminals 550 so that the power supply wire connects the respective drive circuitry (described below) for each of the conductors to the corresponding conductor 422. In the illustrated embodiment, the output terminals of the lower front driver board 540 are connected to the conductors A1, C1, E1, G1, J1 and L1. The output terminals of the upper front driver board 542 are connected to the conductors B1, D1, F1, H1, K1 and M1. The output terminals of the lower rear driver board 544 are connected to the conductors Y1, N1, P1, R1, T1 and W1. The output terminals of the upper rear driver board 546 are connected to the conductors Z1, O1, Q1, S1, V1 and X1.

Figure 25:
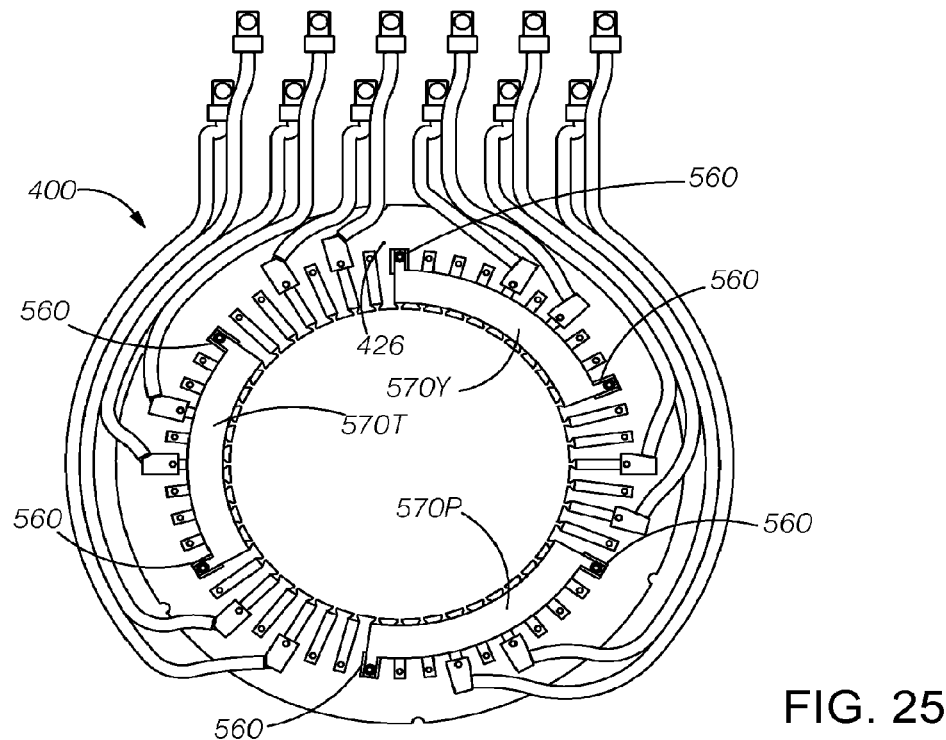
FIG. 25 illustrates a front perspective view of the stator laminate and conductors of FIG. 19, further showing the addition of a first layer of three inside interconnection jumpers between the front ends of respective pairs of selected conductors using a short spacer and an inside interconnection jumper.
Figure 26:
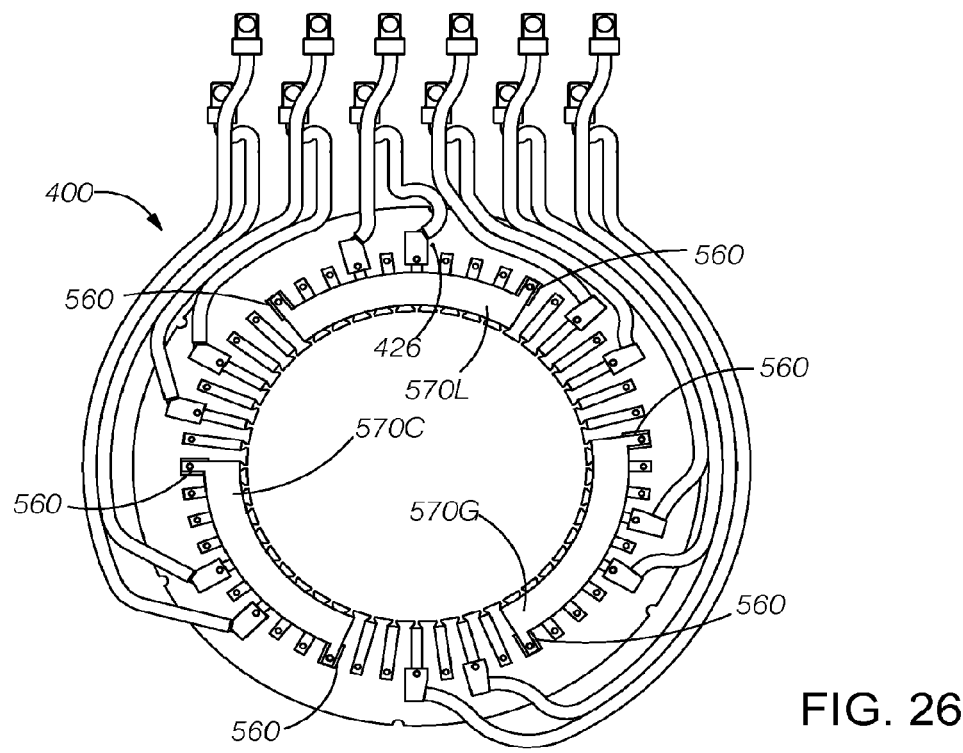
FIG. 26 illustrates a rear perspective view of the stator laminate and conductors of FIG. 20, further showing the addition of a first layer of three inside interconnection jumpers between the rear ends of respective pairs of selected conductors using short spacers and an inside interconnection jumper.
Figure 27:
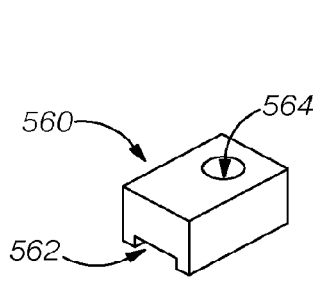
FIG. 27 illustrates a perspective view of a short spacer used to separate the interconnection jumpers of FIGS. 25 and 26 from the conductors that are spanned by the interconnection jumpers.

In the next step shown in FIGS. 25 and 26, a respective short spacer 560 is positioned on the front end of each of the conductors Y1 and Y2, the conductors P1 and P2, and the conductors T1 and T2, and on the rear end of each of the conductors L1 and L2, the conductors C1 and C2, and the conductors G1 and G2. As shown in the perspective views in FIG. 27, the short spacer has a length of approximately 0.6 inch, a width of approximately 0.4 inch and a thickness of approximately 0.31 inch. Each short spacer has a lower groove 562 centered on the bottom surface and extending lengthwise along the bottom surface. The groove has a width of approximately 0.25 inch corresponding to the width of the conductors 430. The groove has a depth of approximately 0.06 inch so that the spacer has a depth of approximately 0.25 inch from the recessed surface of the groove to the top of the spacer. A through bore 564 having a diameter of approximately 0.18 inch extends through the spacer in alignment with the lower groove. Each short spacer is positioned on the end of the respective conductor with the groove engaging the end of the conductor and with the through bore aligned with the threaded bore 450 in the end of the conductor. The bore in the short spacer is located nearer to one end of the spacer so that when the short spacer is positioned on the conductor with the bores in alignment, an extended portion of the short spacer extends radially inward from the through bore. In the illustrated embodiment, the short spacer has a length of 0.6 inch, and the bore is positioned approximately 0.19 inch from one end. The thickness of the short spacer of approximately 0.25 inch from the recessed surface of the groove to the top of the short spacer causes the upper surface of the short spacer to be offset from the end of the conductor by approximately 0.25 inch. The offset allows a jumper (described below) to span between the ends of two conductors without contacting any intervening conductors.

Figure 28:
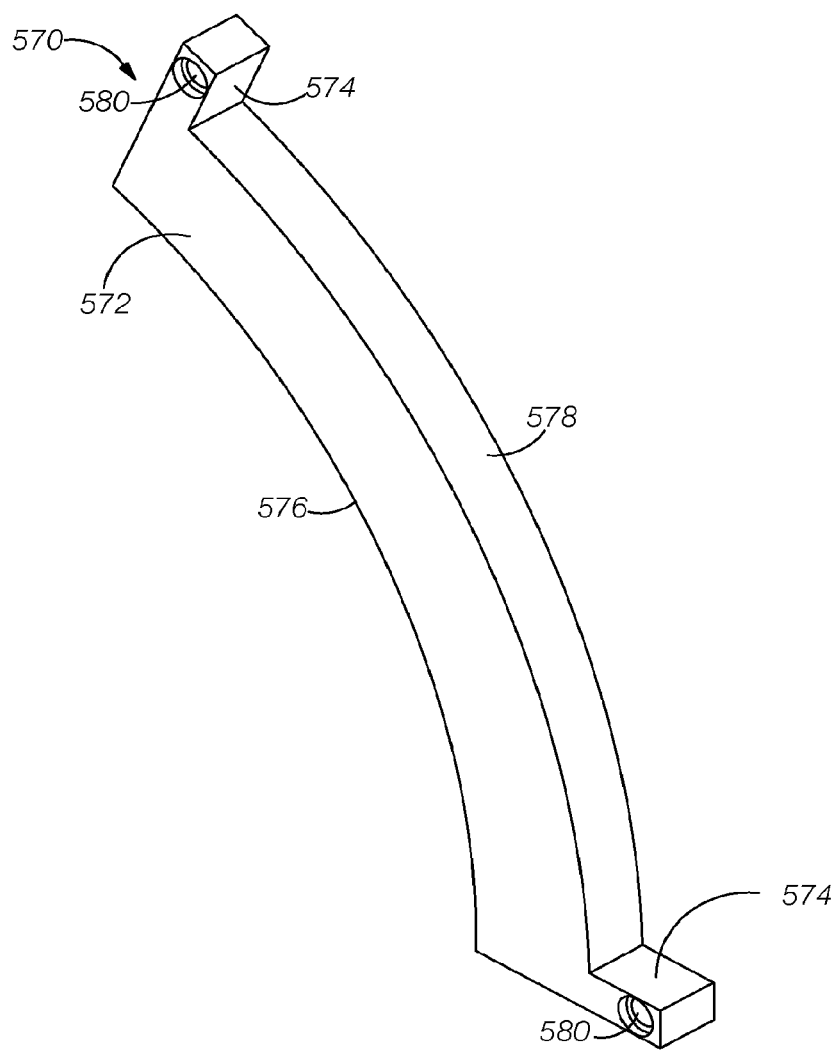
FIG. 28 illustrates a perspective view of an inside interconnection jumper used to form the first layer of inside interconnection jumpers shown in FIGS. 25 and 26.

As illustrated in FIG. 28, an inside jumper 570 has an arcuate main body 572 and has two end tabs 574, which extend radially outward from the main body portion. In the illustrated embodiment, the first front inside jumper has a thickness of approximately 0.375 inch. The inside jumper has a concave inner surface 576 with an inner radius of approximately 3.925 inches and a convex outer surface 578 with an outer radius of approximately 4.75 inches. Both radii are measured with respect to a common radial center so that the inside jumper has a width (measured along a radial line from the common radial center) between the inner surface and the outer surface of approximately 0.825 inch. The inside jumper has an angular length with respect to the common radial center of approximately 69 degrees. Each of the tabs extends approximately 0.5 inch from the outer radius. A countersunk through bore 580, having a minimum diameter of approximately 0.144 inch and having a countersink diameter of approximately 0.24 inch and countersink depth of approximately 0.2 inch, is formed in each tab at a distance of approximately 0.325 inch from the outer radius so that the center of each through bore is approximately 5.075 inches from the common radial center. The two through bores are spaced apart by an arcuate distance of approximately 67.5 degrees.

As shown in FIG. 25, a first front inside jumper 570Y is positioned with one of the end tabs 574 resting on the short spacer 560 on the front end of the conductor Y1 (the first conductor to the right of the indexing hole 426) and with the other end tab resting on the short jumper on the front end of the conductor Y2 (see FIG. 14 for the conductor identifications). The first front inside jumper is positioned so that the concave inner surface 576 is directed inwardly toward the center of the stator structure 400 and the concave outer surface is directed outwardly away from center of the stator structure. The bores 580 in the end tabs are aligned with the through bores 564 in the short spacers and thus with the threaded bores 450 in the ends of the conductors Y1 and Y2. A respective fastener (e.g., a screw, not shown) extends through the through bore of each tab and underlying short spacer and engages the threaded bore 450 of the conductor to secure the first front inside jumper to the ends of the conductors Y1 and Y2 to thereby electrically interconnect the front ends of the two conductors. The head of the fastener is recessed within the countersink of the through bore of the jumper. It should be understood that the 67.5-degree angular spacing between the through bores in the end tabs of the first front inside jumper is selected to cause the first front inside jumper to precisely span the 67.5-degree angular distance between the conductor Y1 and the conductor Y2.

As further illustrated in FIG. 25, a second front inside jumper 570P spans the angular distance between the conductors P1 and P2 with the end tabs of the jumper resting on the respective short spacers on the front ends of the two conductors, with the bores aligned and with the jumper secured with fasteners to complete the electrical connection between front ends of the two conductors, as discussed above with respect to the first front insider jumper 570Y. A third front inside jumper 570T spans the angular distance between the conductors T1 and T2 with the end tabs of the jumper resting on the respective short spacers on the front ends of the two conductors, with the bores aligned and with the jumper secured to complete the electrical connection between front ends of the two conductors.

As illustrated in FIG. 26, a first rear inside jumper 570L spans the angular distance between the rear ends of the conductors L1 (the fourth conductor to the right of the indexing hole 426 in FIG. 26) and L2 (see FIG. 15 for the conductor identifications). The end tabs of the jumper rest on the respective short spacers 460. The bores are aligned and the jumper is secured as discussed above to electrically connect the rear ends of the conductors L1 and L2. A second rear inside jumper 570C spans the angular distance between the rear ends of the conductors C1 and C2, and the end tabs of the jumper rest on the respective short spacers with the bores aligned and the jumper secured as discussed above to electrically connect the rear ends of the conductors C1 and C2. A third rear inside jumper 570G spans the angular distance between the rear ends of the conductors G1 and G2, and the end tabs of the jumper rest on the respective short spacers with the bores aligned and the jumper secured as discussed above to electrically connect the rear ends of the conductors G1 and G2.

Figure 31:
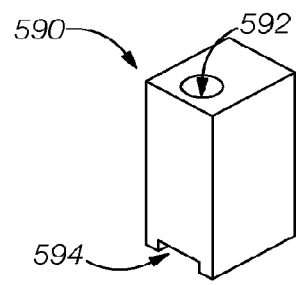
FIG. 31 illustrates a perspective view of a medium spacer used to separate the second layers of inside interconnection jumpers of FIGS. 28 and 29 from the respective underlying first layers of inside interconnection jumpers.
Figure 29:
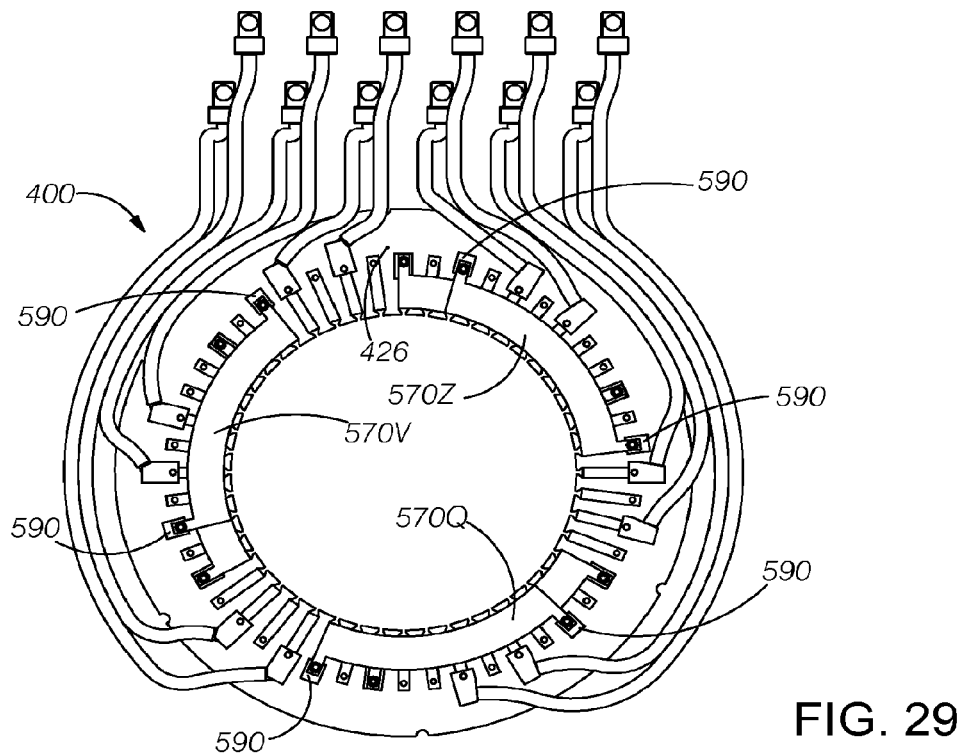
FIG. 29 illustrates a front perspective view of the stator laminate and conductors of FIG. 25, further showing the addition of a second layer of three inside interconnection jumpers between the front ends of respective pairs of selected conductors using medium spacers.
Figure 30:
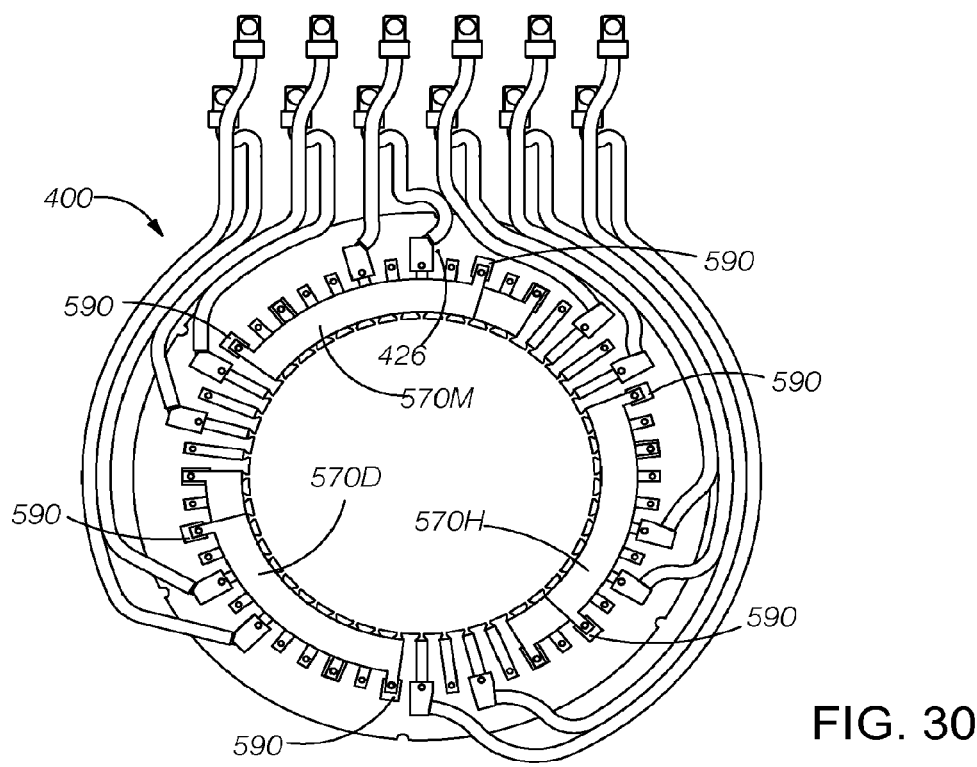
FIG. 30 illustrates a rear perspective view of the stator laminate and conductors of FIG. 26, further showing the addition of a second layer of three inside interconnection jumpers between the rear ends of respective pairs of selected conductors using medium spacers.

As illustrated in FIGS. 29 and 30, a respective next layer of interconnections is formed on each of front side and the rear side of the stator structure 400 by positioning a medium spacer 590 on the respective front end of each of six conductors shown in FIG. 29 and by positioning a medium spacer on the respective rear end of six conductors shown in FIG. 30. The medium spacer shown in FIG. 31 is similar to the short spacer; however, the height of the medium spacer is 0.935 inch and the length of the medium spacer is approximately 0.5 inch. A through bore 592 has a diameter of approximately 0.18 inch and is positioned approximately 0.14 inch from one end of the spacer. A groove 594 has a width of approximately 0.25 inch and has depth of approximately 0.06 inch. Accordingly, the medium spacer has a thickness of approximately 0.875 inch from the recessed surface of the groove to the top of the spacer. The medium spacer provides additional clearance to allow the jumpers attached in this step to pass over the underlying first layer of inside interconnection jumpers.

As shown in FIG. 29, the medium spacers 590 are positioned on the front ends of the conductors Z1 and Z2, the conductors Q1 and Q2, and the conductors V1 and V2. As shown in FIG. 30, the medium spacers are positioned on the rear ends of the conductors M1 and M2, the conductors H1 and H2, and the conductors D1 and D2. In each case, the respective grooves 594 of the medium spacers are positioned on the respective ends of the conductors with the respective bores of the spacers aligned with the respective threaded bores 450 of the conductors. As illustrated the extended portion of each medium spacer (away from the through bore) is directed radially outward so that the vertical side of the medium jumper closest to the through bore is spaced apart from the underlying inside jumper resting on the short spacer, which was positioned as described above with respect to FIGS. 25 and 26.

As further shown in FIG. 29, the end tabs of a fourth front inside jumper 570Z are positioned on the medium spacers 590 on the front ends of the conductors Z1 and Z2 with the bores of the end tabs aligned with the bores of the medium jumpers and with the threaded bores of the underlying conductors. The jumper is secured to the conductors by threaded fasteners (e.g., screws, not shown) as discussed above to electrically interconnect the front ends of the conductors Z1 and Z2. A fifth front inside jumper 570Q electrically interconnects the front ends of the conductors Q1 and Q2. A sixth front inside jumper 570V electrically interconnects the front ends of the conductors V1 and V2.

As further shown in FIG. 30, the end tabs of a fourth rear inside jumper 570M are positioned on the medium spacers 590 on the rear ends of the conductors M1 and M2 with the bores of the end tabs aligned with the bores of the medium jumpers and with the threaded bores of the underlying conductors. The jumper is secured to the conductors by threaded fasteners (e.g., screws, not shown) as discussed above to electrically interconnect the rear ends of the conductors M1 and M2. A fifth rear inside jumper 570H electrically interconnects the rear ends of the conductors H1 and H2. A sixth rear inside jumper 570D electrically interconnects the rear ends of the conductors D1 and D2.

Figure 32:
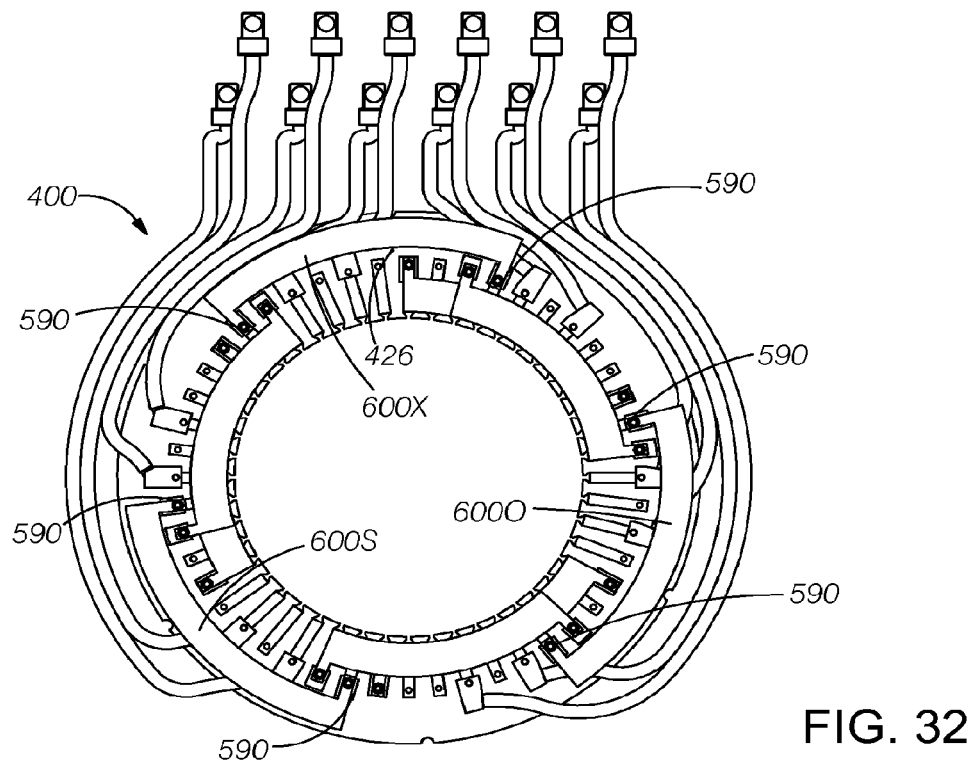
FIG. 32 illustrates a front perspective view of the stator laminate and conductors of FIG. 29, further showing the addition of a first layer of three outside interconnection jumpers between the front ends of respective pairs of selected conductors using medium spacers.
Figure 33:
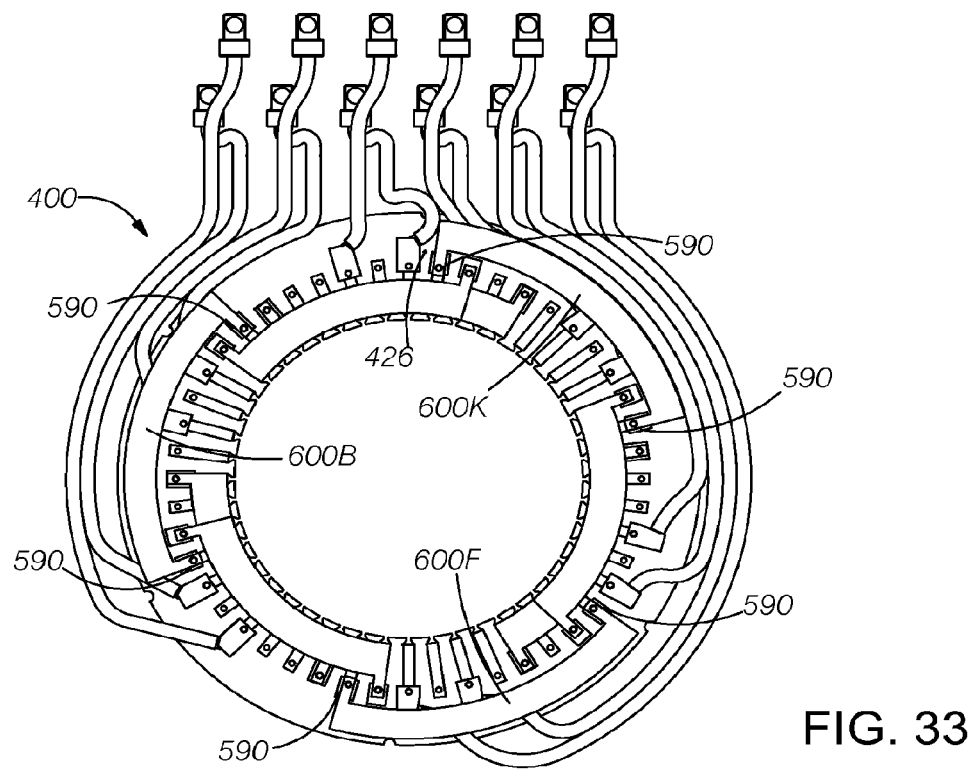
FIG. 33 illustrates a rear perspective view of the stator laminate and conductors of FIG. 30, further showing the addition of a first layer of three outside interconnection jumpers between the rear ends of respective pairs of selected conductors using medium spacers.

The medium spacers 590 are also used to provide additional interconnections for the stator structure 400 as illustrated in FIGS. 32 and 33. In particular, additional medium spacers are positioned on the front ends of six additional conductors in FIG. 32 and on the rear ends of six additional conductors in FIG. 33. In particular, the medium spacers are positioned on front ends of the conductors X1 and X2, the conductors O1 and O2, and the conductors S1 and S2 as shown in FIG. 32. The medium spacers are positioned on the rear ends of the conductors B1 and B2, the conductors F1 and F2, and the conductors K1 and K2 as shown in FIG. 33.

Figures 34, 37:
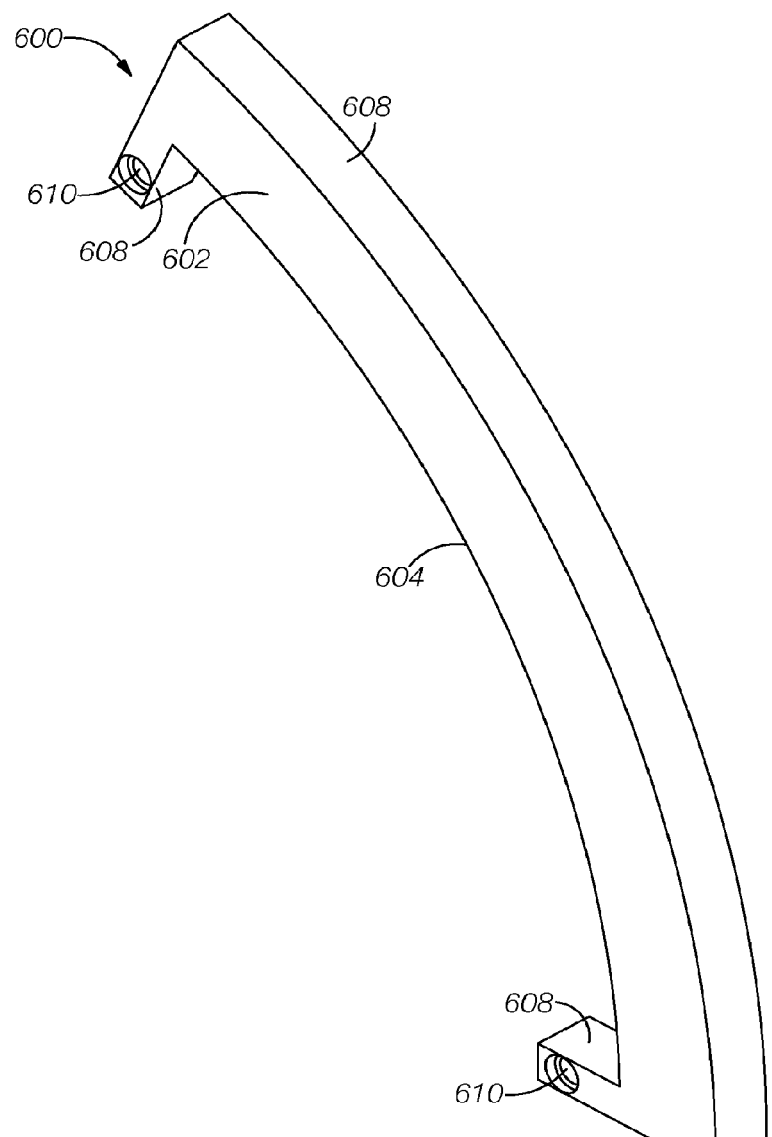
FIG. 34 illustrates a perspective view of an outside interconnection jumper used to form the first layer of outside interconnection jumpers shown in FIGS. 25 and 26.
FIG. 37 illustrates a perspective view of a long spacer used to separate the second layers of inside interconnection jumpers of FIGS. 35 and 36 from the respective underlying first layers of outside interconnection jumpers.

Because the additional medium spacers 590 are positioned to provide interconnections on the same interconnection layer with the inside jumpers 570Z, 570Q, 570V on the front of the stator structure and the inside jumpers 570M, 570H and 570D on the rear of the stator structure, an outside jumper 600 is used to provide the additional interconnections with interfering with the interconnections shown in FIGS. 29 and 30. As illustrated in FIG. 34, the outside jumper also comprises an arcuate main body 602 between a concave inner surface 604 and a convex outer surface 606. The outside jumper has a thickness corresponding to the thickness corresponding to the thickness of the inner jumper described above. The inner surface of the outside jumper has a radius from a common center of approximately 5.6 inches, and the outer surface has a radius from the common center of approximately 6.2 inches. Accordingly, the main body has a width, measured radially of approximately 0.7 inch. The main body has an arcuate length of approximately 70 degrees. Respective end tabs 608 extend radially inward from the inner concave inner surface near the two ends of the arcuate main body. Each tab has a width of approximately 0.25 inch and has a length of approximately 0.6 inch. A countersunk through bore 610 is formed in each tab at a distance of approximately 5.075 inches from the common center of the two surfaces. Each through bore has a minimum diameter of approximately 0.144 inch and has a countersink diameter of approximately 0.24 inch. The countersink depth is approximately 0.2 inch. The two bores are spaced apart by an arcuate distance of approximately 67.5 degrees in similar manner to the angular spacing of the two bores 580 in the tabs 574 of the inside jumper 570.

As illustrated in FIG. 32, a first front outside jumper 600X is positioned on the medium spacers 590 on the front ends of the conductors X1 and X2, the bores are aligned and the first outside jumper is secured with fasteners (not shown) as described above to electrically interconnect the front ends of the conductors X1 and X2. In like manner, a second front outside jumper 600O is positioned and secured to electrically interconnect front ends of the conductors O1 and O2. A third front outside jumper 600S is positioned and secured to electrically interconnect the front ends of the conductors S1 and S2.

As illustrated in FIG. 33, a first rear outside jumper 600B is positioned and secured to electrically interconnect the rear ends of the conductors B1 and B2. A second rear outside jumper 600F is positioned and secured to electrically interconnect the rear ends of the conductors F1 and F2. A third rear outside jumper is 600K is positioned and secured to electrically interconnect the rear ends of the conductors K1 and K2.

As illustrated in FIGS. 32 and 33, the respective first layers of outside jumpers 600O, 600S, 600S and 600B, 600F, 600K span over the underlying engagement connectors and power supply wiring. Accordingly, the medium spacers are used to provide clearance between the jumpers and the underlying connectors and wiring.

Figure 35:
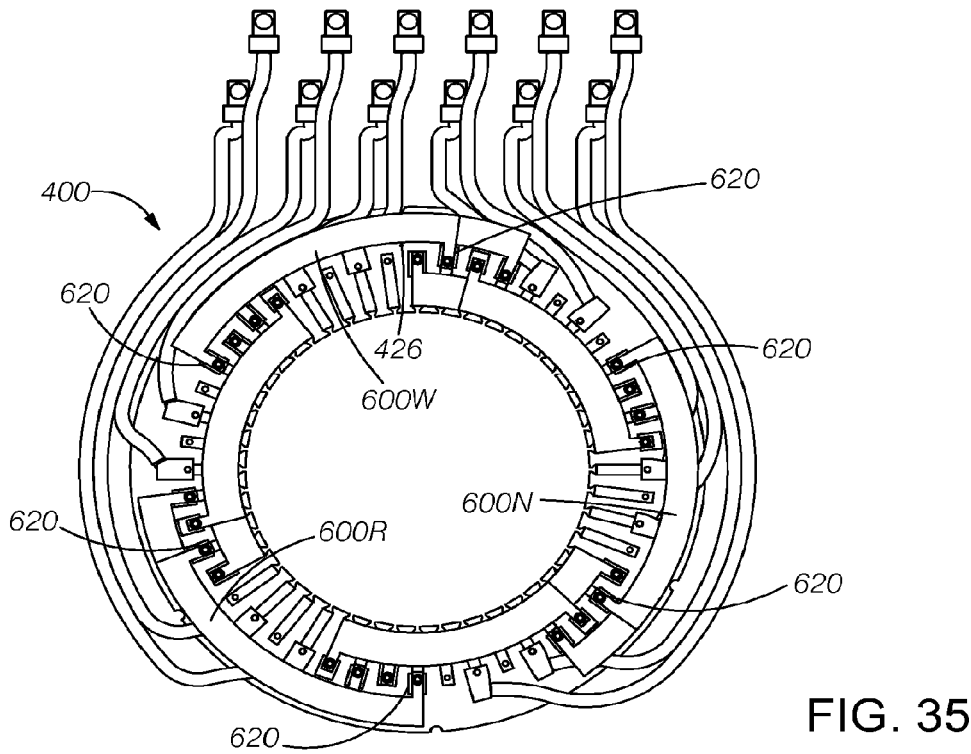
FIG. 35 illustrates a front perspective view of the stator laminate and conductors of FIG. 32, further showing the addition of a second layer of three outside interconnection jumpers between the front ends of respective pairs of selected conductors using medium spacers.
Figure 36:
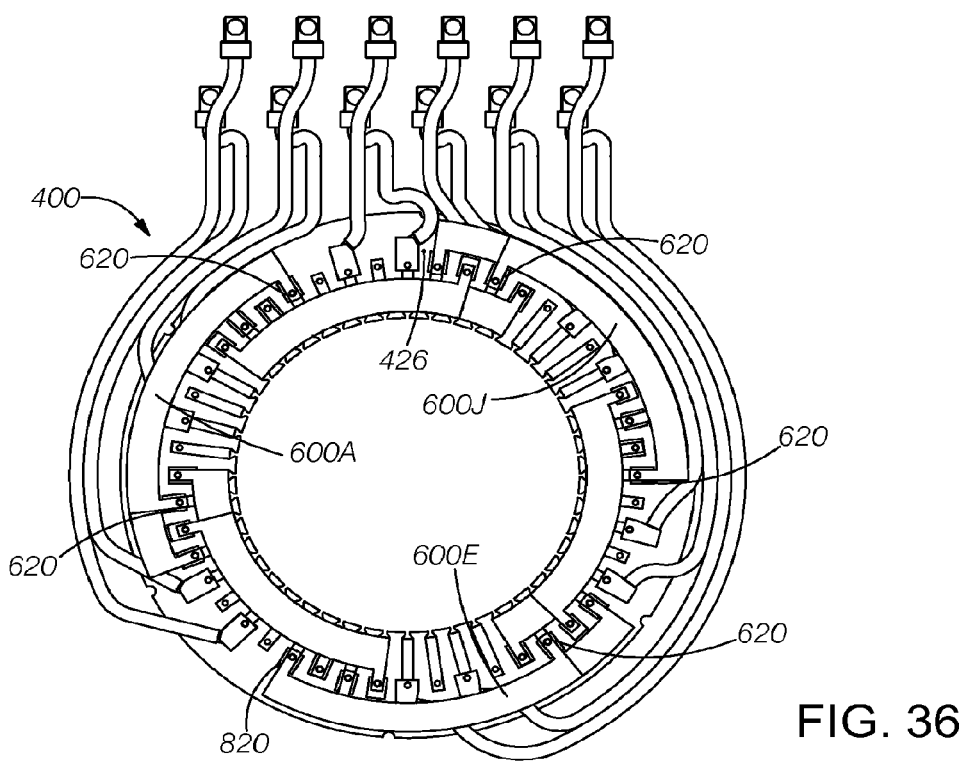
FIG. 36 illustrates a rear perspective view of the stator laminate and conductors of FIG. 33, further showing the addition of a second layer of three outside interconnection jumpers between the rear ends of respective pairs of selected conductors using long spacers.

As illustrated in FIGS. 35 and 36, a respective next layer of interconnections is formed on each of front end and the rear end of the stator structure 400 by positioning a long spacer 620 on the respective front end of each of six conductors shown in FIG. 35 and by positioning a long spacer on the respective rear end of each of six conductors shown in FIG. 36. The long spacer shown in FIG. 37 is similar to the medium spacer; however, the height of the long spacer is 1.56 inches. The length of the long spacer is approximately 0.5 inch. A through bore 622 has a diameter of approximately 0.18 inch and is positioned approximately 0.14 inch from one end of the spacer. A groove 624 has a width of approximately 0.25 inch and has depth of approximately 0.06 inch. Accordingly, the long spacer has a thickness of approximately 1.5 inches from the recessed surface of the groove to the top of the spacer. The thickness is sufficient to space the respective second layers of outside interconnection jumpers apart from the underlying respective first layers of outside interconnection jumpers.

As shown in FIG. 35, the long spacers 620 are positioned on the front ends of the conductors N1 and N2, the conductors R1 and R2, and the conductors W1 and W2. As shown in FIG. 35, the long spacers are positioned on the rear ends of the conductors A1 and A2, the conductors E1 and E2, and the conductors J1 and J2. In each case, the respective grooves 624 of the long spacers are positioned on the respective ends of the conductors with the respective bores of the spacers aligned with the respective threaded bores 450 of the conductors. As illustrated the extended portion of each long spacer (away from the through bore) is directed radially outward so that the vertical side of the long jumper closest to the through bore is spaced apart from the underlying inside jumper resting on a medium or short spacer, which was positioned as described above with respect to FIGS. 25 and 26 or FIGS. 29 and 30.

After positioning the long spacers, a fourth front outside jumper 600N is positioned on the longer spacers 620 on the conductors N1 and N2 as shown in FIG. 35. The bores of the jumper, the spacers and the conductors are aligned, and the jumpers are secured with fasteners (not shown) to electrically interconnect the front ends of the conductors N1 and N2. Similarly, a fifth front outside jumper 600R is positioned and secured to electrically interconnect the front ends of the conductors R1 and R2. A sixth front outside jumper 600W is positioned and secured to electrically interconnect the front ends of the conductors W1 and W2.

As shown in FIG. 36, a fourth rear outside jumper 600A is positioned and secured to electrically interconnect the rear ends of the conductors A1 and A2. A fifth front outside jumper 600E is positioned and secured to electrically interconnect the rear ends of the conductors E1 and E2. A sixth front outside jumper 600J is positioned and secured to electrically interconnect the rear ends of the conductors J1 and J2.

Figure 38:
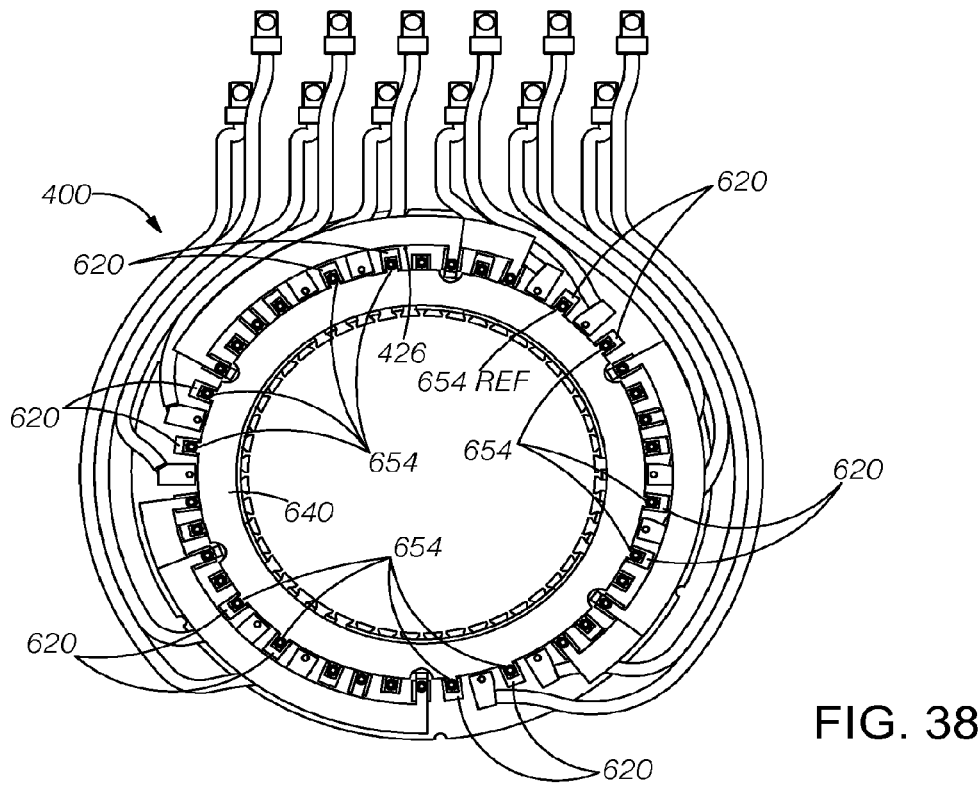
FIG. 38 illustrates a front perspective view of the stator laminate and conductors of FIG. 35, further showing the addition of an annular wye-interconnection ring positioned over the second layer of inside interconnection jumpers and connected to the respective frontends of 12 selected conductors using medium spacers.
Figure 39:
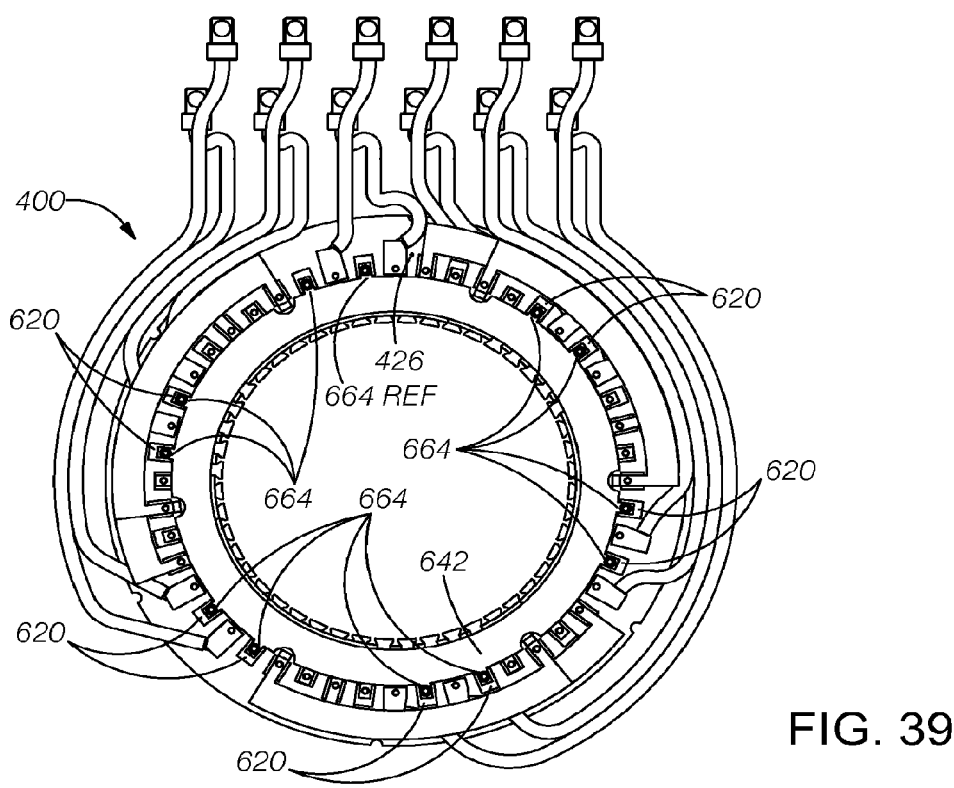
FIG. 39 illustrates a rear perspective view of the stator laminate and conductors of FIG. 36, further showing the addition of an annular wye-interconnection ring positioned over the second layer of inside interconnection jumpers and connected to the respective rear ends of 12 selected conductors using medium spacers.

As shown in FIGS. 38 and 39, a final set of connections utilizes the long spacers 620 to electrically interconnect the remaining ends of the conductors not connected in the previous steps. As shown in FIG. 38, 12 long spacers are positioned on the front ends of the conductors A2, B2, C2, D2, E2, F2, G2, H2, J2, K2, L2 and M2. As shown in FIG. 39, 12 long spacers are positioned on the rear ends of the conductors N2, O2, P2, Q2, R2, S2, T2, V2, W2, X2, Y2 and Z2.

Figure 40:
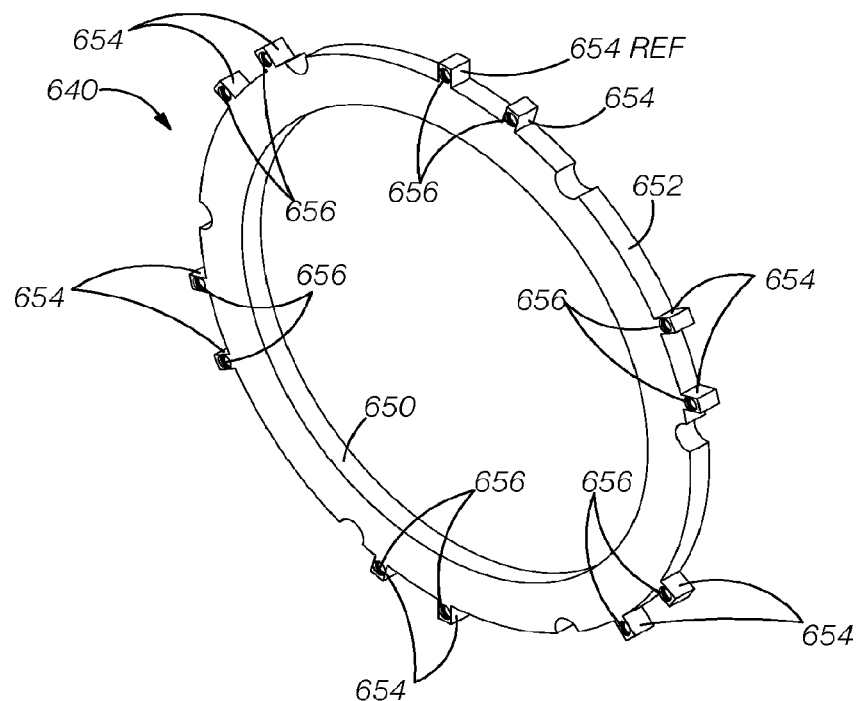
FIG. 40 illustrates an enlarged front perspective view of the annular wye interconnection ring used in completing the connections in FIG. 38.

The 12 long spacers 620 on the front end of the stator structure 400 support a front annular interconnection ring 640, referred to herein as a wye-connector, which is illustrated in FIG. 40. The 12 long spacers on the rear end of the stator structure support a rear annular interconnection ring (wye-connector) 642, which is illustrated in FIG. 41.

As shown in FIG. 40, the front wye-connector 640 has a thickness corresponding to the thicknesses of the inside jumper and the outside jumper described above. An inner surface 650 of the wye-connector has an inner radius of approximately 4.05 inches. An outer surface 652 has an outer radius of approximately 4.9 inches so that the width of the annular ring, measured radially between the inner surface and the outer surface, is approximately 0.85 inch. The annular ring has 12 tabs 654 extending radially outward from the outer surface. Each tab has a length, measured radially, of approximately 0.35 inch, and has a width of approximately 0.25 inch. Each tab has a respective through bore 656, which is centered at a radial distance of approximately 5.075 inches from the center of the annular ring, which corresponds to the distance of the threaded bores 450 in the ends of the conductors 430 from the center of the stator structure 400. Each through bore has a minimum diameter of 0.144 inch, and is countersunk to a depth of approximately 0.2 inch with a bore having a diameter of approximately 0.24 inch. The tabs comprise six sets of two tabs per set, which the two tabs in each set spaced 15 degrees apart and with the sets of tabs spaced 60 degrees apart.

In the illustrated embodiment, the front wye-connector 640 further includes six semicircular notches 658 formed in the outer surface 652. In particular, each notch has a radius of approximately 0.5 inch. Using one of the tabs 654 (identified as 654 REF) as a reference (e.g., the tab shown at the top of the wye-connector in FIG. 40), a first notch is positioned with a radial line through its center approximately 30 degrees clockwise from a radial line through the center of the bore 856 in the reference notch. The next (second) notch is positioned approximately 52.5 degrees in the clockwise direction from the first notch. The next (third) notch is positioned approximately 67.5 degrees clockwise from the second notch. The next (fourth) notch is positioned approximately 52.5 degrees clockwise from the third notch. The next (fifth) notch is positioned approximately 67.5 degrees clockwise from the fourth notch. The last (sixth) notch is positioned approximately 52.5 degrees clockwise from the fifth notch.

Figure 41:
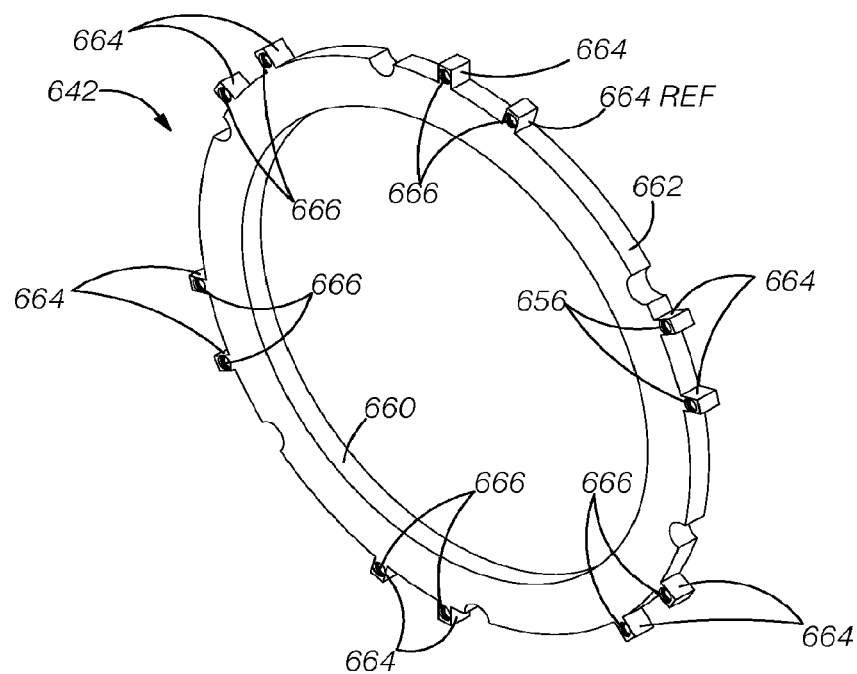
FIG. 41 illustrates an enlarged rear perspective view of the annular wye interconnection ring used in completing the connections in FIG. 39.

As shown in FIG. 41, the rear wye-connector 642 is substantially similar to the front wye-connector 640. The rear wye-connector has an inner surface 660, an outer surface 662, a plurality of tabs 664 with respective countersunk bores 666, and a plurality of notches 668 in the outer surface. In contrast to notches of the front wye-connector, the notches of the rear wye-connector are positioned at mirrored angular positions with respect to the notches of the front wye-connector. Using a reference tab 664 REF as before, the first notch in the rear wye-connector is positioned approximately 30 degrees to the left (counterclockwise) from the reference tab. The positions of the remaining five notches are positioned at corresponding angles with respect to the first notch and each additional notch except that the angles are measured in the counterclockwise direction such that the rear wye-connector is a mirror of the front wye-connector.

As illustrated in FIGS. 38 and 39, the respective wye connectors 640, 642 have inner and outer diameters substantially similar to the inner and outer diameters of the underlying second layers of inside jumpers. Accordingly, the long spacer 620 provides clearance between the wye-connectors and the underlying inside jumpers.

As shown in FIG. 38, the front wye-connector 640 is positioned on the front side of the stator structure 400 with the reference tab 654 REF positioned on the long spacer 620 positioned on the front end of the conductor J2 (the third conductor to the left (counterclockwise) of the indexing hole 426 of the stator structure). Accordingly, the next tab clockwise (15 degrees from the reference tab) is positioned on the front end of the conductor K2. Furthermore, the first notch 658 is positioned proximate to the front end of the conductor W2 (the first conductor to the right (clockwise) of top center. As described above, the front end of the conductor W2 is connected to the outside jumper 600W via a long spacer. The first notch provides clearance around the short inward extension of the tab on the outside jumper, which is in the same interconnection plane as the wye-connector.

As further shown in FIG. 38, the next two tabs 654 clockwise from the first two tabs are connected to the long spacers 620 on the front ends of the conductors L2 and M2, and the next notch 658 provides clearance for the tab on the outside jumper 600N connected to the front end of the connector N1. The next two tabs are connected to the long spacers on the front ends of the conductors A2 and B2, and the next notch provides clearance for the tab on the outside jumper 600N connected to the front end of the connector N2. The next two tabs are connected to the front ends of the conductors C2 and D2, and the next notch provides clearance for the tab on the outside jumper 600R connected to the front end of the conductor R1. The next two tabs are connected to the front ends of the conductors E2 and F2, and the next notch provides clearance for the tab on the outside jumper 600R connected to the front end of the conductor R2. The next (last) two tabs are connected to the front ends of the conductors G2 and H2, and the next notch provides clearance for the tab on the outside jumper 600W connected to the front end of the conductor W1.

As shown in FIG. 39, the rear wye-connector 642 is positioned on the rear side of the stator structure 400 with the reference tab 664 REF positioned on the long spacer 620 positioned on the rear end of the conductor V2 (the fifth conductor to the right (clockwise) of the indexing hole 426 of the stator structure). Accordingly, the next tab clockwise (15 degrees from the reference tab) is positioned on the rear end of the conductor T2. Furthermore, the first notch 668 is positioned proximate to the rear end of the conductor J2 (the third conductor to the right (clockwise) of top center. As described above, the front end of the conductor J2 is connected to the outside jumper 600J via a long spacer. The first notch provides clearance around the short inward extension of the tab on the outside jumper, which is in the same interconnection plane as the wye-connector.

As further shown in FIG. 39, the next two tabs 664 counterclockwise from the first two tabs are connected to the long spacers 620 on the rear ends of the conductors W2 and X2, and the next notch 668 provides clearance for the tab on the outside jumper 600A connected to the rear end of the connector A1. The next two tabs are connected to the long spacers on the rear ends of the conductors Y2 and Z2, and the next notch provides clearance for the tab on the outside jumper 600A connected to the rear end of the connector A2. The next two tabs are connected to the rear ends of the conductors N2 and O2, and the next notch provides clearance for the tab on the outside jumper 600E connected to the rear end of the conductor E1. The next two tabs are connected to the rear ends of the conductors P2 and Q2, and the next notch provides clearance for the tab on the outside jumper 600E connected to the rear end of the conductor E2. The next (last) two tabs are connected to the rear ends of the conductors R2 and S2, and the next notch provides clearance for the tab on the outside jumper 600J connected to the rear end of the conductor J1.

Figure 42:
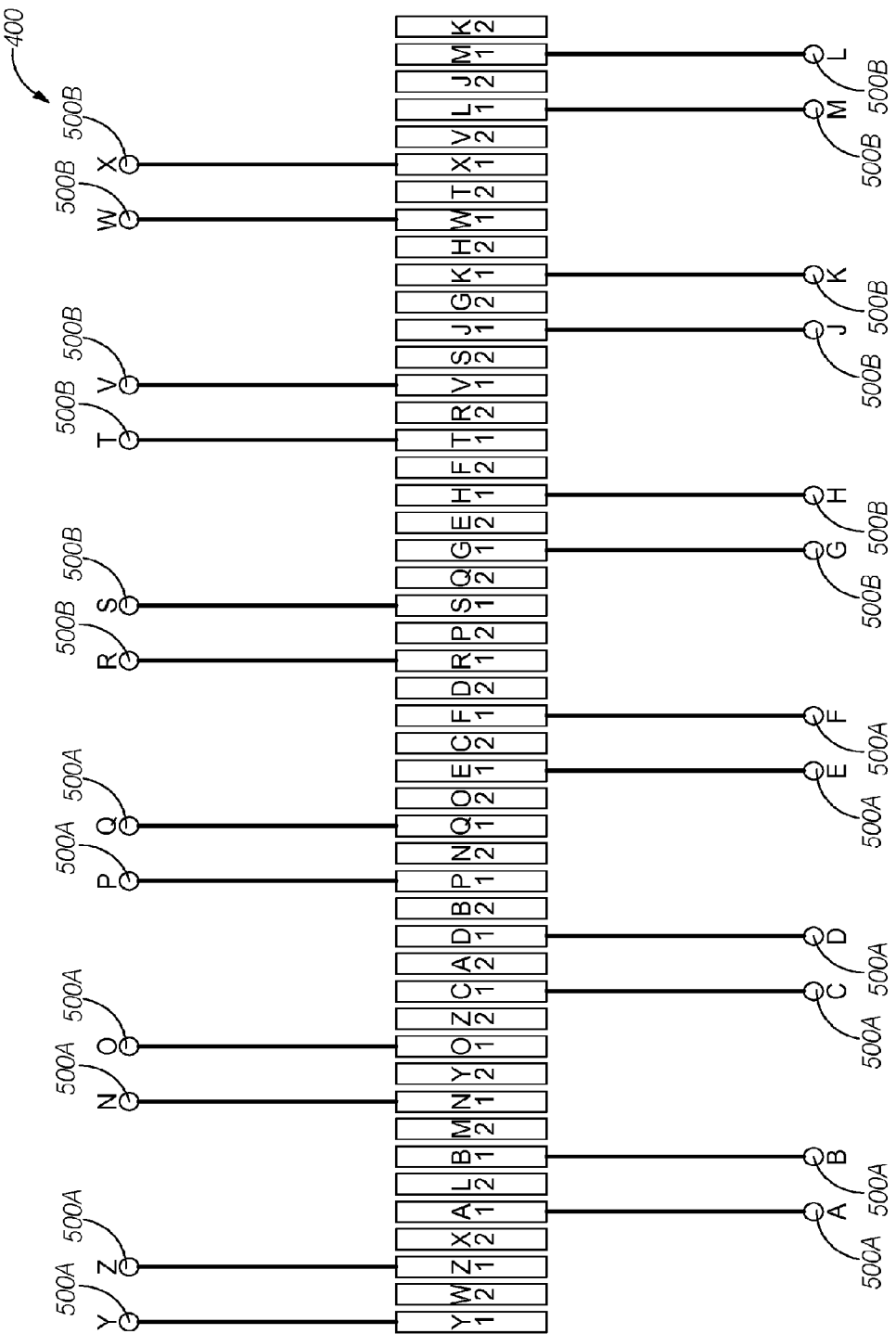
FIG. 42 illustrates the flat interconnection pattern of FIG. 16 with all of the interconnections removed except the engagement connectors on the ends of the connectors.

The foregoing sequence of interconnections is illustrated schematically in FIGS. 42-47, wherein FIG. 42 illustrates the flat interconnection pattern 400 of FIG. 16, with all of the interconnections removed except the engagement connectors 500A, 500B on the ends of the connectors 432. Like elements are numbered accordingly in FIG. 42. The power supply wires 510 are not shown in FIG. 42.

Figure 43:
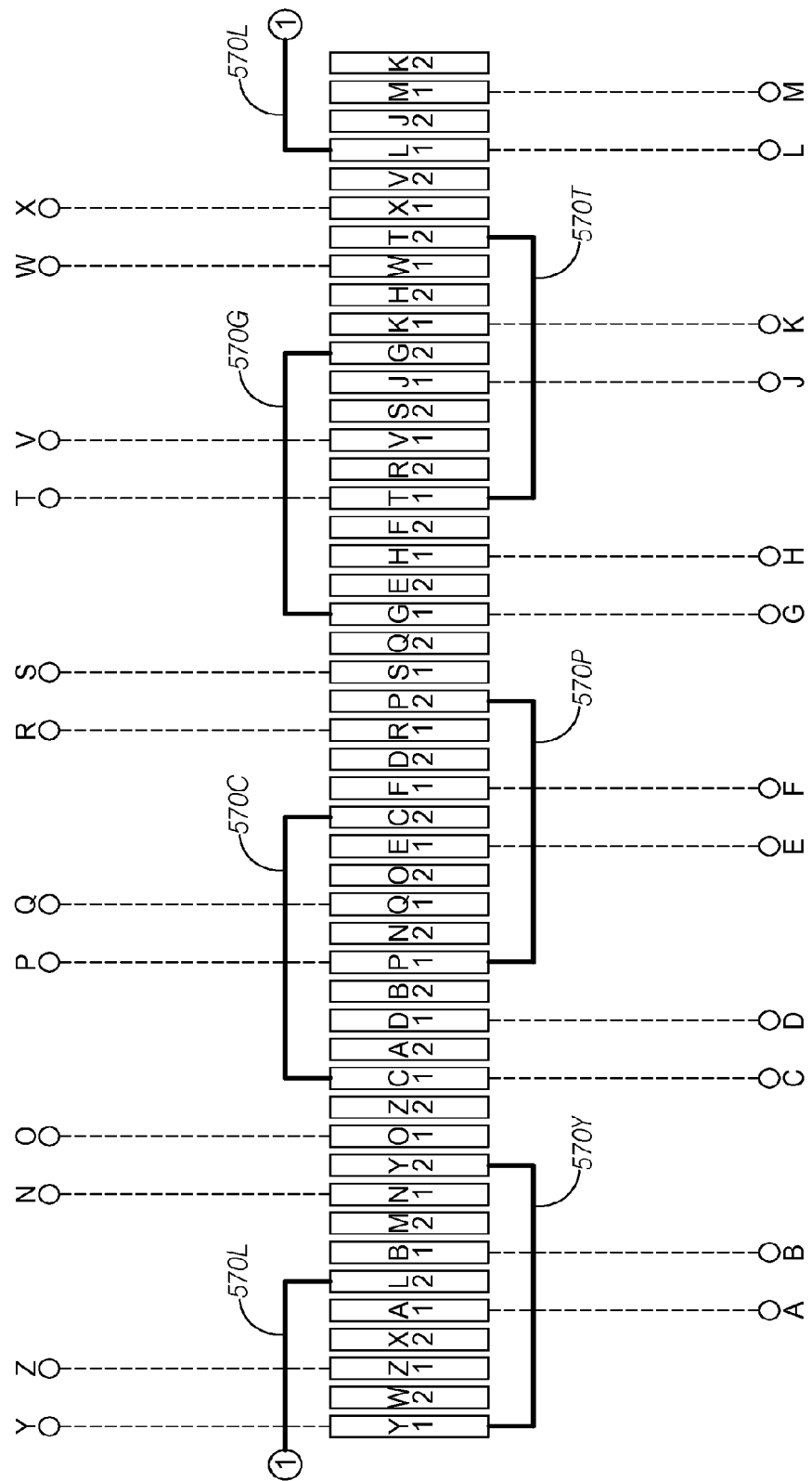
FIG. 43 illustrates the inside jumper interconnections added in FIGS. 25 and 26 in solid lines, with the connections shown in FIG. 42 now shown in dashed lines.

FIG. 43 illustrates the inside jumper interconnections 500 added in FIGS. 25 and 26, which are shown in solid lines. The connections previously added in FIG. 42 are shown in dashed lines. Only the added interconnections are labeled in FIG. 43.

Figure 44:
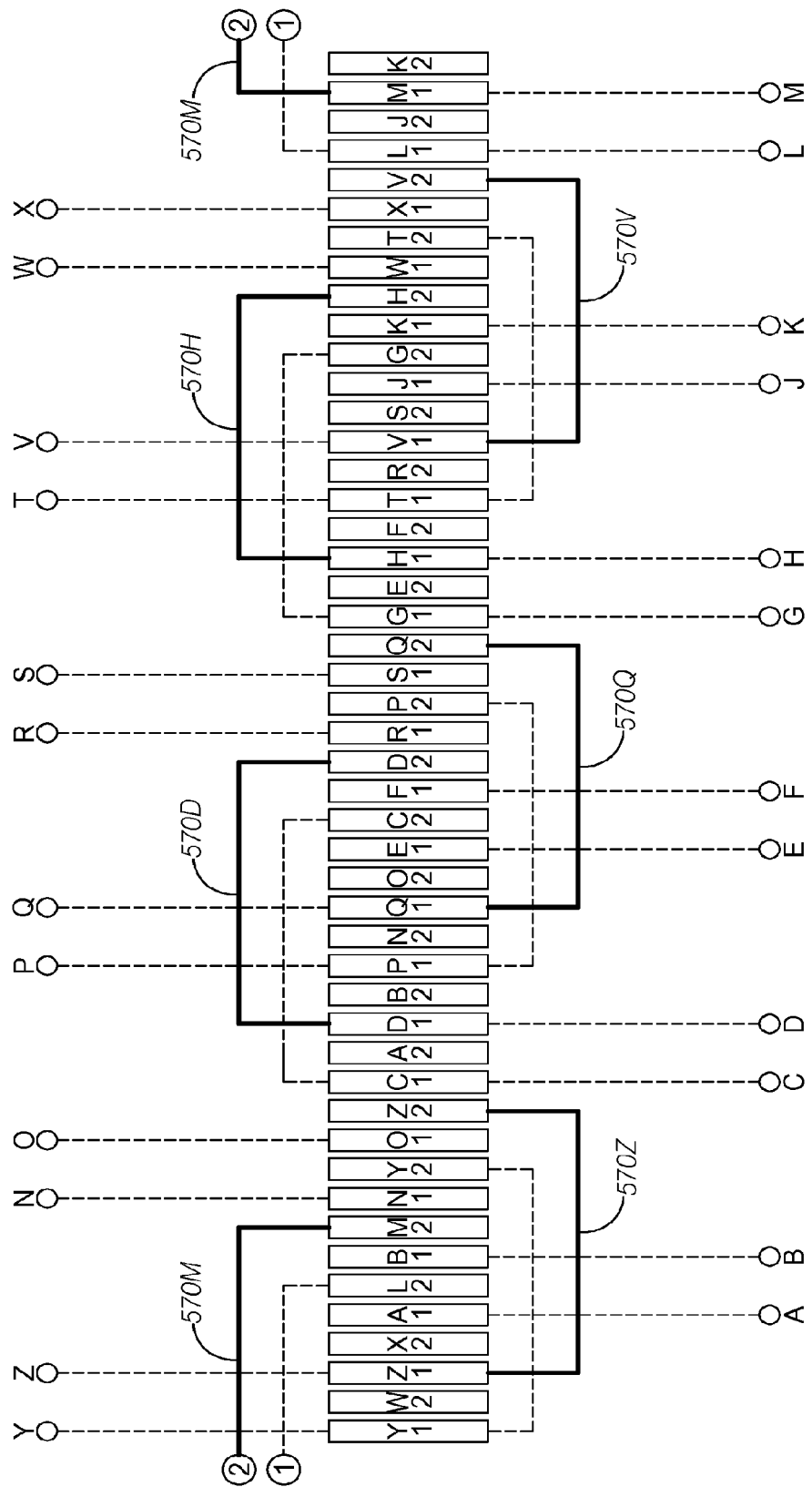
FIG. 44 illustrates the inside jumper interconnections added in FIGS. 29 and 30 in solid lines, with the connections shown in FIGS. 42 and 43 now shown in dashed lines.

FIG. 44 illustrates the inside jumper interconnections on the medium spacers added in FIGS. 29 and 30. Only the added interconnections shown in solid lines and labeled. The connections added in FIGS. 42 and 43 are shown in dashed lines.

Figure 45:
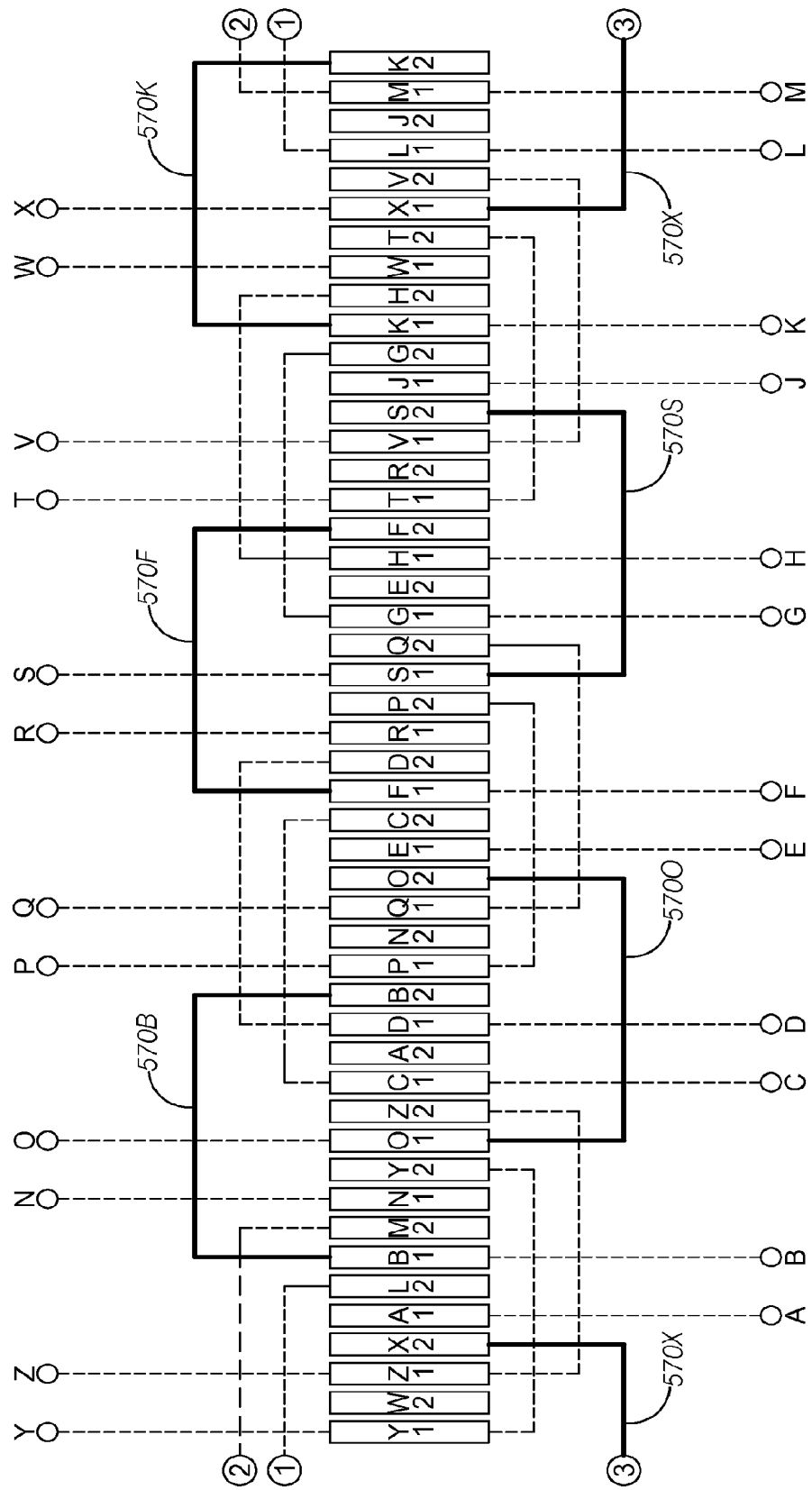
FIG. 45 illustrates the outside jumper interconnections added in FIGS. 32 and 33 in solid lines, with the connections shown in FIGS. 42-44 now shown in dashed lines.

FIG. 45 illustrates the outside jumper interconnections added in FIGS. 32 and 33 with only the added interconnections shown in solid lines and labeled. The connections added in FIGS. 42, 43 and 44 are shown in dashed lines.

Figure 46:
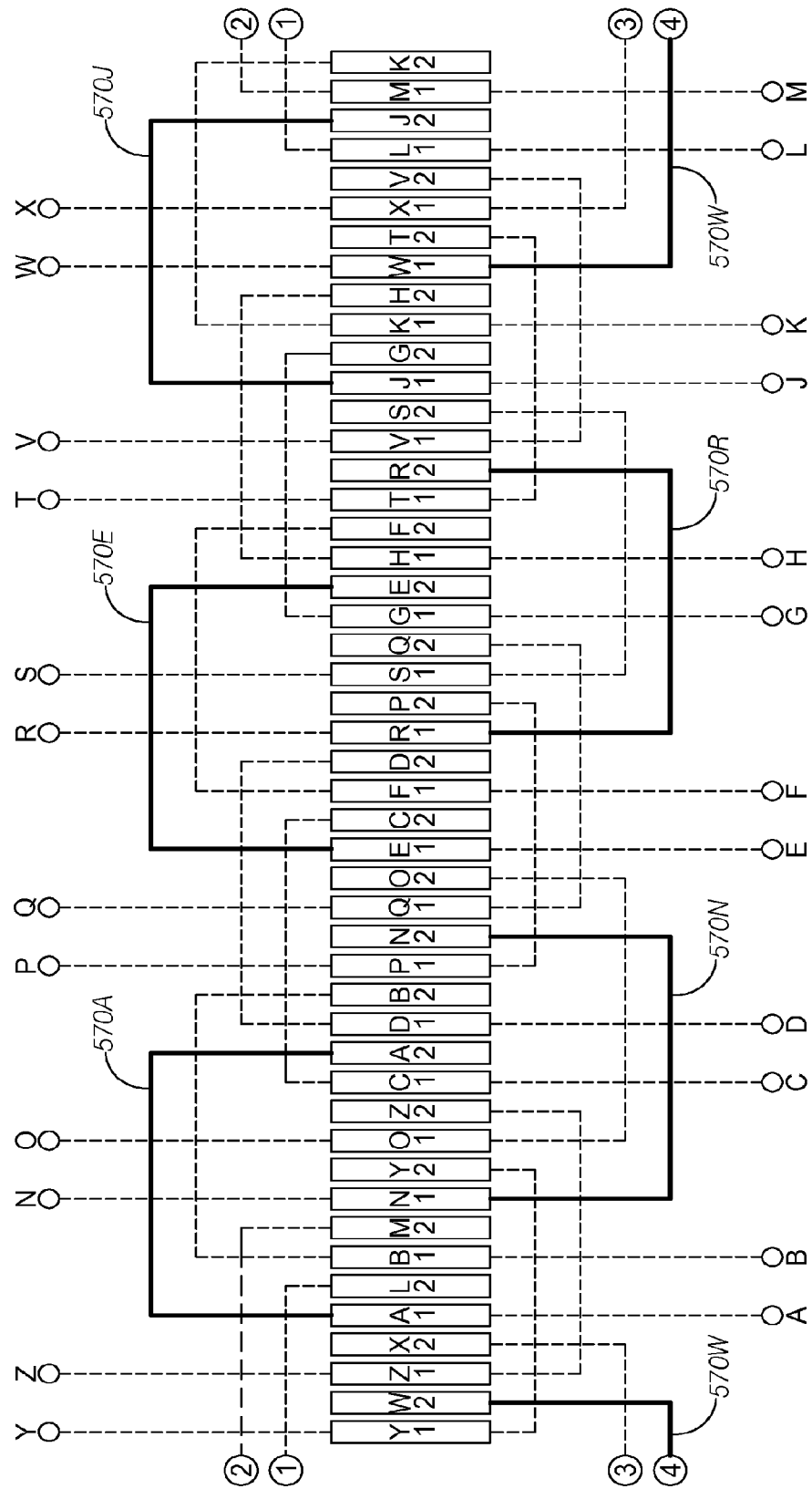
FIG. 46 illustrates the outside jumper interconnections added in FIGS. 35 and 36 in solid lines, with the connections shown in FIGS. 42-45 now shown in dashed lines.

FIG. 46 illustrates the outside interconnections added in FIGS. 35 and 36 with only the added interconnections shown in solid lines and labeled. The connections added in FIGS. 42, 43, 44 and 45 are shown in dashed lines.

Figure 47:
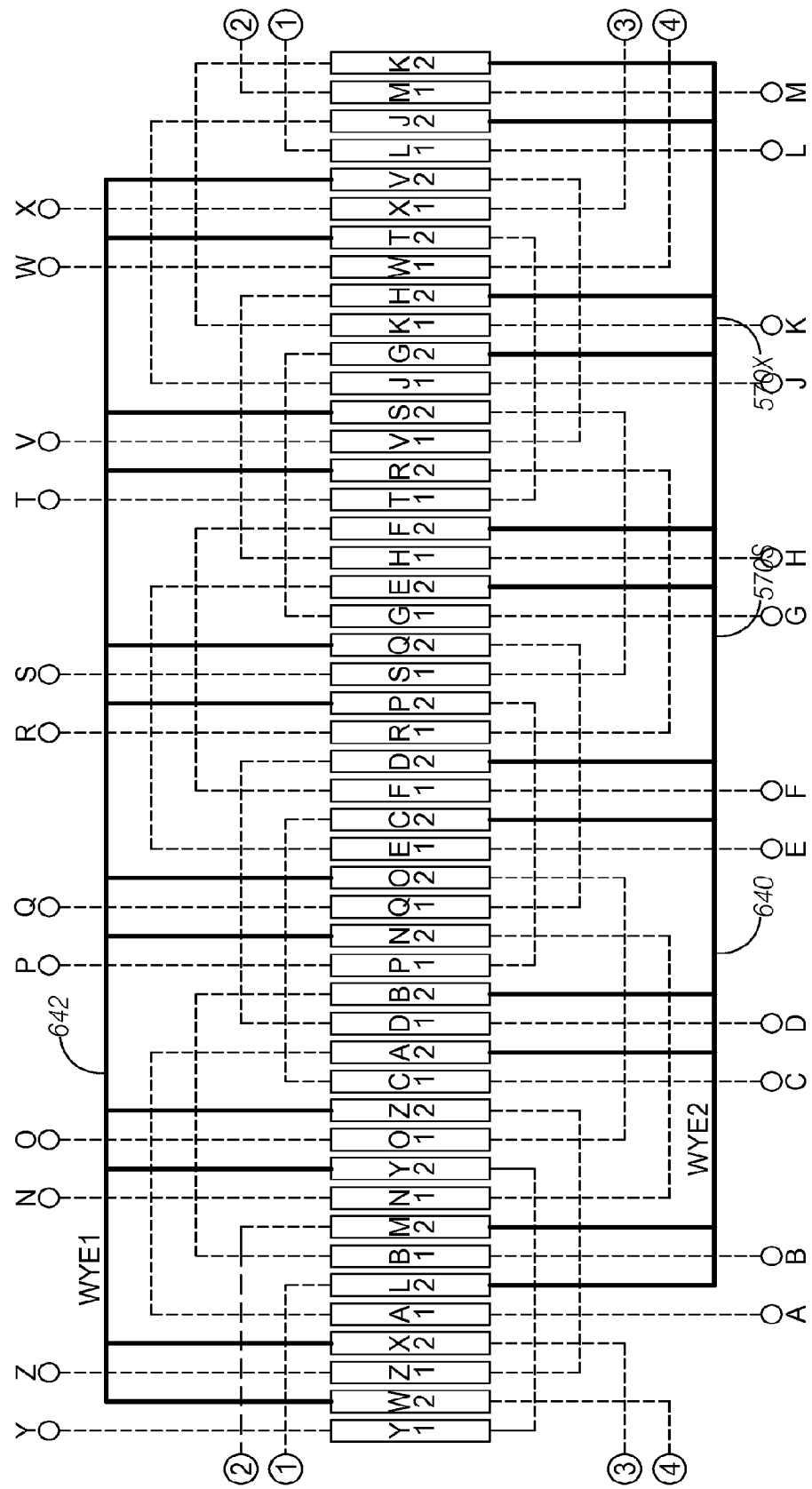
FIG. 47 illustrates the connections to the wye-connector added in FIGS. 32 and 33 in solid lines, with the connections shown in FIGS. 42-46 now shown in dashed lines.

FIG. 47 illustrates the interconnections added by the two wye-connectors 640 and 642 in FIGS. 38 and 39. Only the connections to the wyes are shown in solid lines and labeled. The connections added in FIGS. 42-45 are shown in dashed lines.

As indicated above, the interconnections shown in FIGS. 16-47 provide a brushless DC motor 100 having 24 phases configured as two mirrored 12-phase, wye-connected stator windings with the phases of the two windings interleaved to provide the effect of a 24-phase winding. By providing 24 phases, the amount of current required to provide a high horsepower, low voltage motor is divided among the conductors in the stator and among the power supply wires coupled to the conductors so that the current can be handled by conventional sized wiring and power control components.

It should be understood that as used herein "mirrored" refers to the corresponding power supply connections and corresponding interconnection jumpers being provided for the two sets of 12-phase wye-connected windings on the front and rear ends of the stator structure as shown for the completed layers on connections and interconnections. It should be further understood that the connections and interconnections shown in FIG. 36 that appear at a certain angular location clockwise from the indexing hole 426 in FIG. 35 have corresponding connections or interconnections that appear counterclockwise from the indexing hole; however, the corresponding connections are rotated by 30 degrees (four connectors) clockwise from the precise mirror location. For example, as shown in FIGS. 38 and 39, the first wye-connector 640 (FIG. 38) has the respective reference tab 654 REF positioned on the sixth conductor clockwise of the indexing hole, and the second wye-connector 642 has the reference tab 664 REF positioned on the second conductor counterclockwise of the indexing hole. It can be seen that second conductor position counterclockwise is four conductor positions clockwise from the sixth conductor position counterclockwise in accordance with the offset from the "true" mirror position.

It should be further understood that both sets of wye-connected phases are connected at both ends of the stator structure 400. In particular, the first set of phases comprises the conductors A1, A2, B1, B2, C1, C2, D1, D2, E1, E2, F1, F2, G1, G2, H1, H2, J1, J2, K1, K2, L1, L2, M1 and M2, the 24 connectors 500A, 500B (FIG. 19), and the first wye-connector 640 on first end (FIG. 38); and further comprises the interconnection jumpers 570C, 570G, 570L (FIG. 26), the interconnection jumpers 570D, 570H, 570M (FIG. 30), the interconnection jumpers 600B, 600F, 600K (FIG. 33) and the interconnection jumpers 600A, 600E, 600J (FIG. 36) on the second end. Similarly, the second set of phases comprises the conductors N1, N2, O1, O2, P1, P2, Q1, Q2, R1, R2, S1, S2, T1, T2, V1, V2, W1, W2, X1, X2, Y1, Y2, Z1 and Z2, the 24 connectors 500A, 500B (FIG. 20), and the second wye-connector 642 (FIG. 39) on second end; and further comprises the interconnection jumpers 570P, 570T, 570Y (FIG. 25), the interconnection jumpers 570Q, 570V, 570Z (FIG. 29), the interconnection jumpers 600O, 600S, 600X (FIG. 32) and the interconnection jumpers 600N, 600R and 600W (FIG. 35) on the second end. Again, it can be seen that each component at the second end of the stator structure corresponds to a like component on the first end of the stator structure.

The operation of the motor 100 can be understood by referring to the timing diagrams illustrated in FIGS. 48A, 48B, 49A and 49B in combination with a flat conductor diagram in FIGS. 50A-50I and FIGS. 51A-51I. FIGS. 48A and 48B illustrate the timing of the 24 phases when the motor is operated to run in the clockwise direction (looking at the motor from the front). FIGS. 49A and 49B illustrates the timing of the 24 phases when the motor is operated to run in the counterclockwise direction. FIGS. 50A-50I illustrate the superposition of the permanent magnet poles of the rotor 130 over the flat stator diagram of FIG. 16 to illustrate the movement of the rotor as the 24 phases of the stator are activated in the sequences shown in the timing diagram of FIGS. 48A and 48B to move the rotor shaft 130 in the clockwise direction. FIGS. 51A-51I illustrate the superposition of the permanent magnet poles of the rotor 130 over the flat stator diagram of FIG. 16 to illustrate the movement of the rotor as the 24 phases of the stator are activated in the sequences shown in the timing diagram of FIGS. 49A and 49B to move the rotor shaft 130 in the counterclockwise direction.

Figure 50A:
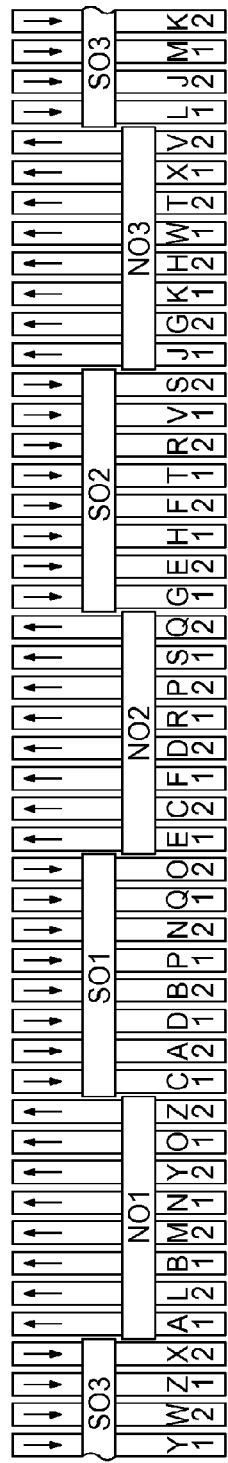
FIGS. 50A-50I pictorially illustrate the movement of the poles of the rotor with respect to the stator conductors as the directions of the currents flowing through the conductors are changed in accordance with the clockwise timing diagram of FIGS. 48A and 48B.

In FIG. 50A, the rotor 130 is shown in a flattened representation with a first permanent magnet north pole (NO1) positioned proximate the conductors A1, L2, B1, M2, N1, Y2, O1 and Z2. A first permanent magnet south pole (SO1) (next adjacent to the first permanent magnet north pole in the clockwise direction (to the right in FIG. 50A)) is positioned proximate the conductors C1, A2, D1, B2, P1, N2, Q1 and O2. A second permanent magnet north pole (NO2) is positioned proximate the conductors E1, C2, F1, D2, R1, P2, S1 and Q2. A second permanent magnet south pole (SO2) is positioned proximate the conductors G1, E2, H1, F2, T1, R2, V1 and S2. A third permanent magnet north pole (NO3) is positioned proximate the conductors J1, G2, K1, H2, W1, T2, X1 and V2. A third permanent magnet south pole (SO3) is positioned proximate the conductors L1, J2, M1, K2, Y1, W2, Z1 and X2.

When the permanent magnets of the rotor 130 are in the positions shown in FIG. 50A, the voltages applied to the terminals of the conductors are controlled at a time T0 in the clockwise timing diagram of FIGS. 48A and 48B such that the voltages applied to the terminals A and B are high (H in the timing diagrams) such that currents flow into the terminals A and B and then through the conductors A1 and B1 from the respective front ends (lower ends of the conductors A1 and B1 in FIG. 50A) to the respective rear ends (upper ends of the conductors A1 and B1 in FIG. 50A).

As further shown at the time T0 in the clockwise timing diagram of FIGS. 48A and 48B, the voltages applied to the terminals N and O are low (L in the timing diagrams) such that currents flow from the respective rear ends of the conductors N1 and O1 toward the terminals N and O. Accordingly, the currents flow from the front ends to the rear ends of the conductors N1 and O1 thus flow in the same direction as the currents flowing in the conductors A1 and B1.

As further shown at the time T0 in the clockwise timing diagram of FIGS. 48A and 48B, the voltages applied to the terminals L and M are low (L). Accordingly, the currents flow from the respective front ends of the conductors L1 and L2 to the terminals L and M. Accordingly, the currents flow from the respective rear ends to the respective front ends of the conductors L1 and M1. Since the respective rear ends of the conductors L1 and M1 are connected to the respective rear ends of the conductors L2 and M2, as described above, the currents flow from the respective front ends to the respective rear ends of the conductors L2 and M2. Accordingly, the currents flowing in the conductors L2 and M2 are flowing in the same direction as the currents through the conductors A1, B1, N1 and O1.

As further shown at the time T0 in the clockwise timing diagram of FIGS. 48A and 48B, the voltages applied to the terminals Y and Z are high (H). Accordingly, the currents flow from the terminals Y and Z, and then flow through the conductors Y1 and Z1 from the respective rear ends to the respective front ends of the conductors Y1 and Z1. Since the respective front ends of the conductors Y1 and Z1 are connected to the respective front ends of the conductors Y2 and Z2, the currents flow from the respective front ends to the respective rear ends of the conductors Y2 and Z2. Accordingly, the currents flowing in the conductors Y2 and Z2 are flowing in the same directions as the currents through the conductors A1, B1, N1, O1, L2 and M2.

As shown in the foregoing paragraphs, the currents flowing in the eight conductors A1, L2, B1, M2, N1, Y2, O1 and Z2 proximate to the first permanent magnet north pole are flowing from the respective front ends to the respective rear ends of the eight conductors. The orientations of the of the eight conductors are such that the combined effect of the current flows creates a field corresponding to a south pole to draw the first permanent magnet north pole (NO1) to the illustrated position proximate the eight conductors.

As further shown in the clockwise timing diagram of FIGS. 48A and 48B at the time T0, the voltages applied to the terminals C and D are low (L) and the voltages applied to the terminals P and Q are high (H) to cause the currents to flow from the respective rear ends to the respective front ends of the conductors C1, D1, P1 and Q1. As discussed above, the currents flow through the conductors A1 and B1 from the respective front ends to the respective rear ends of the conductors. Thus, the currents flow through the respective interconnected conductors A2 and B2 from the respective rear ends to the respective front ends. Similarly, the currents flow through the conductors N1 and O1 from the respective front ends to the respective rear ends. Thus, the currents flow through the respective interconnected conductors N2 and O2 from the respective rear ends to the respective front ends. Accordingly the currents flowing in the eight conductors C1, A2, D1, B2, P1, N2, Q1 and O2 proximate to the first permanent magnet south pole are flowing from the respective rear ends to the respective front ends of the eight conductors. The orientations of the eight conductors are such that the combined effect of the current flows creates a field corresponding to a north pole to draw the first permanent magnet south pole (SO1) to the illustrated position proximate the eight conductors.

The same analysis applied to the conductors E1, C2, F1, D2, R1, P2, S1 and Q2 proximate to the second permanent magnet north pole (NO2) and the conductors J1, G2, K1, H2, W1, T2, X1 and V2 proximate to the third permanent magnet north pole (NO3) shows that all of the conductors have currents flowing from the respective front ends to the respective rear ends at the time T0. Similarly, the conductors G1, E2, H1, F2, T1, R2, V1 and S2 proximate to the second permanent magnet south pole SO2 and the conductors L1, J2, M1, K2, Y1, W2, Z1 and X2 positioned proximate to the third permanent magnet south pole (SO3) all have currents flowing from the respective rear ends to the respective front ends at the time T0.

Figure 50B:
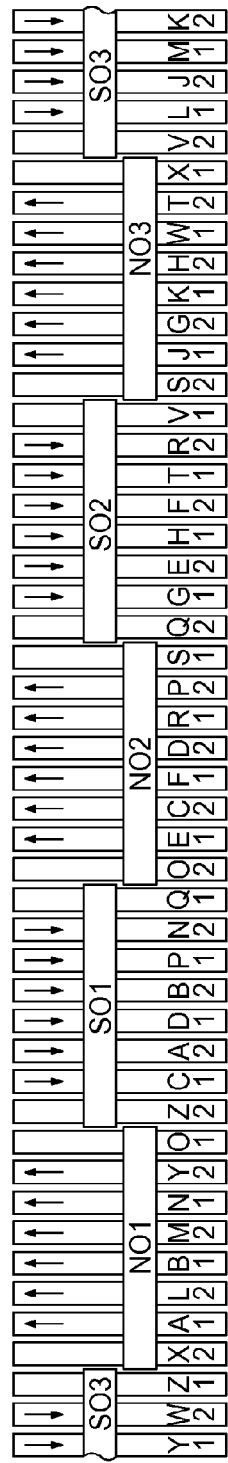
Figure 50C:
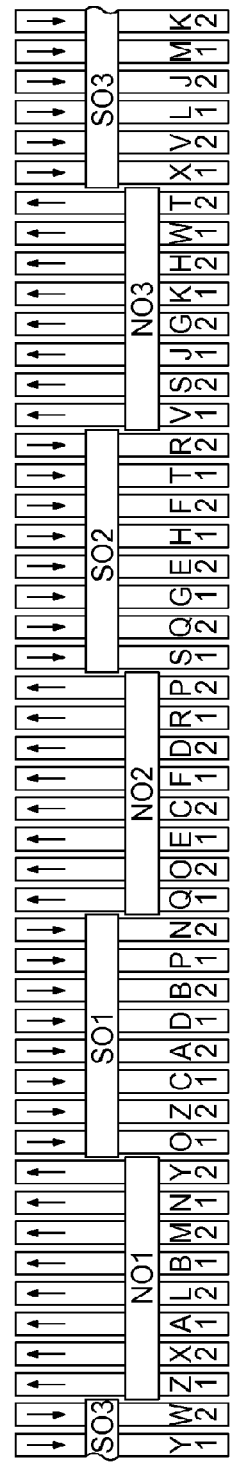

At a time T1 in the clockwise timing diagram of FIGS. 48A and 48B, the voltages applied to the terminals O, Q, S, V, X and Z are switched off (0 in the timing diagram) so that the six terminals O, Q, S, V, X and Z are neither sources nor sinks for current through the respective conductors connected to the terminals. In particular, the six terminals are switched off for approximately the amount of time required for the rotor to rotate through an angle of 7.5 degrees (or 1/48 of a revolution of the rotor) at the current rotational speed of the motor. Thus, as shown in FIG. 50B, the angular momentum of the rotor causes each permanent magnet is moved to the next adjacent conductor in the clockwise direction, corresponding to a movement to the left in FIG. 50B. It should be understood that the view in FIGS. 50A-50I and 51A-51I is from the rotational axis of the rotor looking outward towards the stator structure, wherein the rotor poles are between the viewpoint and the stator conductors. Accordingly, movement of the rotor poles to the left in FIGS. 50A-50I corresponds to rotation of the rotor poles clockwise when viewed from the front of the motor. Similarly, movement of the rotor poles to the right in FIGS. 51A-51I corresponds to rotation of the rotor poles counterclockwise. As indicated above, the pole identifiers are based on the pole of the magnet adjacent to the identified conductors at each particular time associated with the position diagram.

At a time T2 in the clockwise timing diagram of FIGS. 48A and 48B, the voltages applied to the terminals O, Q, S, V, X and Z are switched on, but the respective voltages applied to each of the six terminals are opposite the voltages that were previously applied during the time T0. In particular, the terminals O, S and Z are high (H) at the time T2, and the terminals Q, V and Z are low (L) at the time T2. This has the effect of moving each of the rotor magnets an additional 7.5 degrees to the left (clockwise) to the respective positions shown in FIG. 50C during the interval defined by the time T2. Thus, for example, the first permanent magnet north pole (NO1) is now positioned proximate to the conductors Z1, X2, A1, L2, B1, M2, N1 and Y2; and the first permanent magnet south pole (SO1) is now positioned proximate to the conductors O1, Z2, C1, A2, D1, B2, P1 and N2.

Figure 50D:
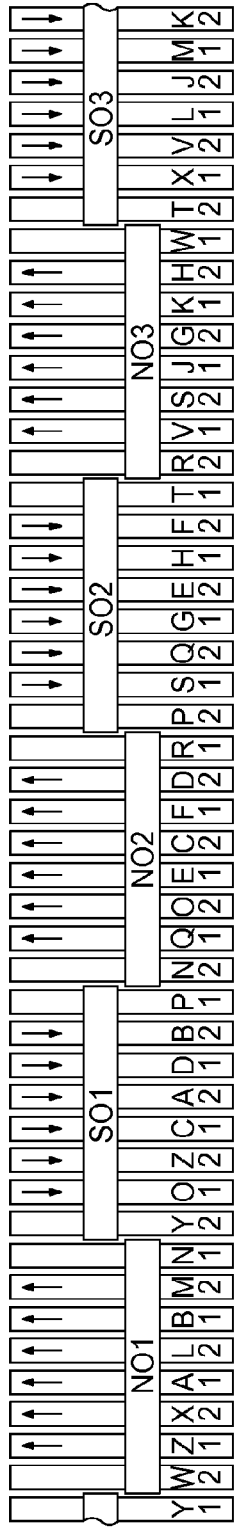
Figure 50E:
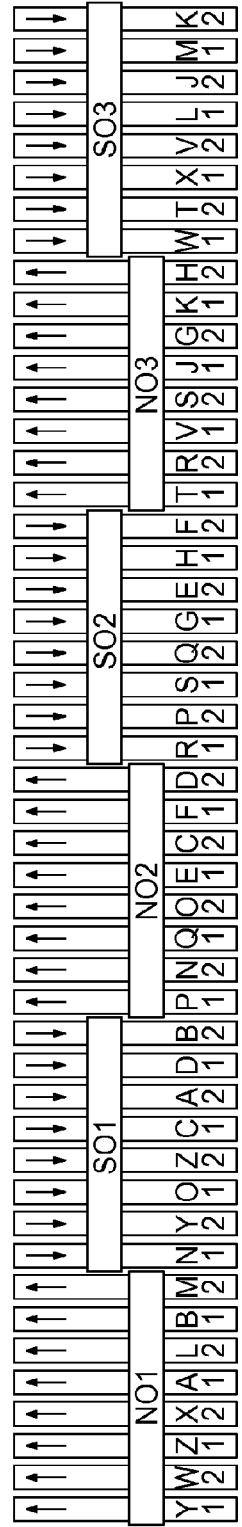

At a time T3 in the clockwise timing diagram of FIGS. 48A and 48B, the voltages applied to the terminals N, P, R, T, W and Y are switched off for the amount of time required for the rotor to rotate through an angle of 7.5 degrees, which moves the permanent magnets an additional 7.5 degrees to the left (clockwise) as shown in FIG. 50D.

At a time T4, the voltages applied to the terminals N, P, R, T, W and Y are switched on, with the respective voltages applied to the terminals at the time T4 being the opposite of the respective voltages applied to the terminals at the time T2. In particular, voltages applied to the terminals N, R and W are high (H) at the time T4, and the voltages applied to the terminals P, T and Y are low (L) at the time T4. This has the effect of moving each of the rotor magnets an additional 7.5 degrees to the left (clockwise) to the respective positions shown in FIG. 50E during the interval defined by the time T4. Thus, for example, the first permanent magnet north pole (NO1) is now positioned proximate to the conductors Y1, W2, Z1, X2, A1, L2, B1 and M2; and the first permanent magnet south pole (SO1) is now positioned proximate to the conductors N1, Y2, O1, Z2, C1, A2, D1 and B2.

Figure 50F:
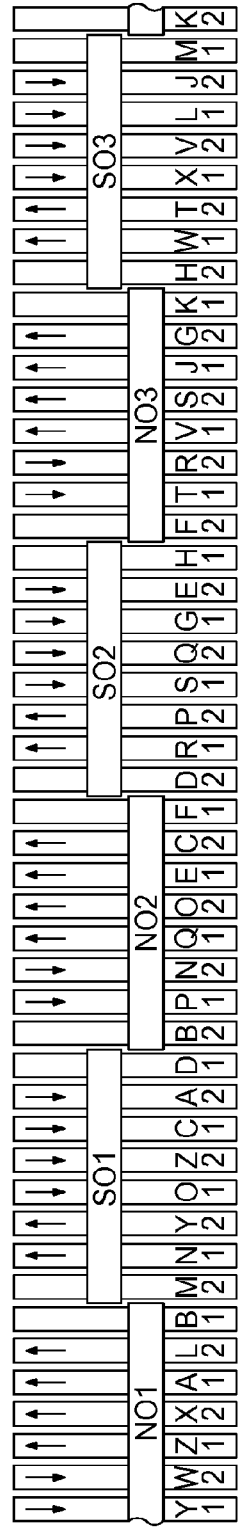
Figure 50G:
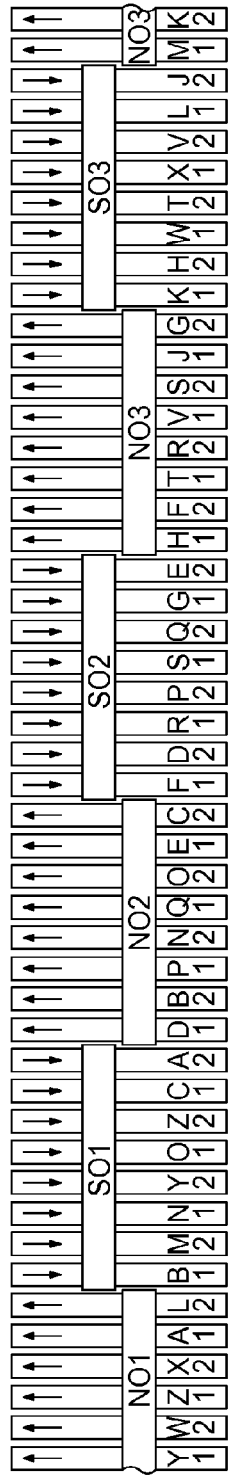

At a time T5 in the clockwise timing diagram of FIGS. 48A and 48B, the voltages applied to the terminals B, D, F, H, K and M are switched off for the amount of time required for the rotor to rotate through an angle of 7.5 degrees which moves the permanent magnets an additional 7.5 degrees to the left (clockwise) as shown in FIG. 50F.

At a time T6, the voltages applied to the terminals B, D, F, H, K and M are switched on, with the respective voltages applied to the terminals at the time T6 being the opposite of the respective voltages applied to the terminals at the time T4. In particular, voltages applied to the terminals B, F and K are low (L) at the time T6, and the voltages applied to the terminals D, H and M are high (H) at the time T6. This has the effect of moving each of the rotor magnets 7.5 degrees to the left (clockwise) to the respective positions shown in FIG. 50G during the interval defined by the time T6. Thus, for example, the first permanent magnet north pole (NO1) is now positioned proximate to the conductors M1, K2, Y1, W2, Z1, X2, A1 and L2; and the first permanent magnet south pole (SO1) is now positioned proximate to the conductors B1, M2, N1, Y2, O1, Z2, C1 and A2.

Figure 50H:
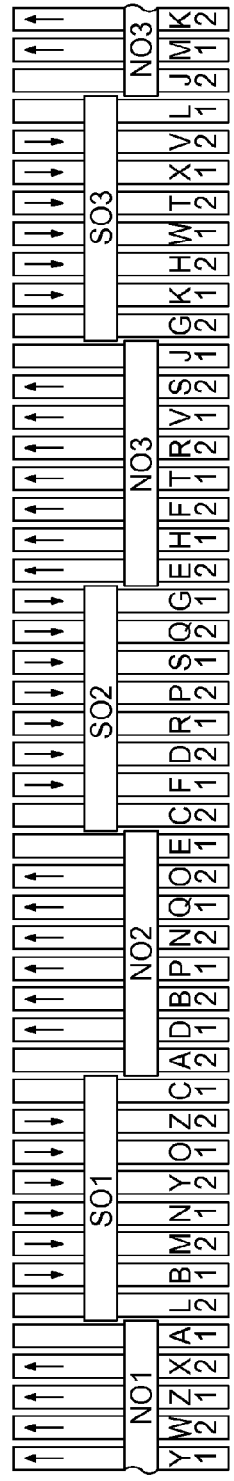
Figure 50I:
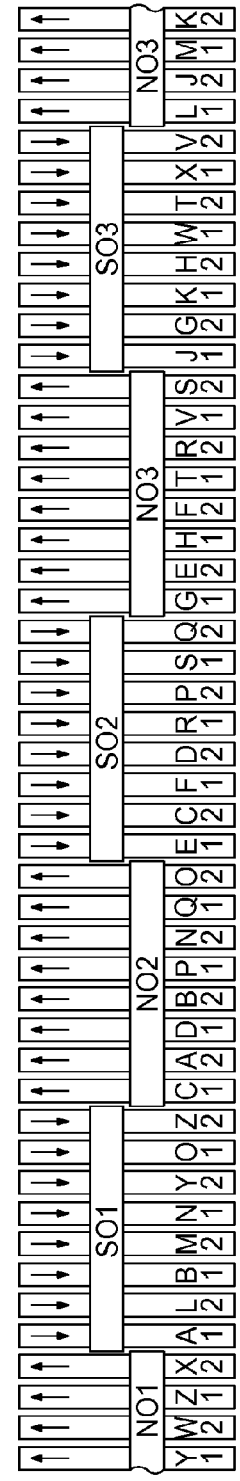

At a time T7 in the clockwise timing diagram of FIGS. 48A and 48B, the voltages applied to the terminals A, C, E, G, J and L are switched off for the amount of time required for the rotor to rotate through an angle of 7.5 degrees which moves the permanent magnets an additional 7.5 degrees to the left (clockwise) as shown in FIG. 50H.

At a time T8, the voltages applied to the terminals A, C, E, G, J and L are switched on, with the respective voltages applied to the terminals at the time T8 being the opposite of the respective voltages applied to the terminals at the time T6. In particular, voltages applied to the terminals A, E and J are low (L) at the time T8, and the voltages applied to the terminals C, G and L are high (H) at the time T8. This has the effect of moving each of the rotor magnets 7.5 degrees to the left (clockwise) to the respective positions shown in FIG. 50I during the interval defined by the time T8. Thus, for example, the first permanent magnet north pole (NO1) is now positioned proximate to the conductors L1, J2, M1, K2, Y1, W2, Z1 and X2; and the first permanent magnet south pole (SO1) is now positioned proximate to the conductors A1, L2, B1, M2, N1, Y2, O1 and Z2. It can be seen that as the rotor rotated through 60 degrees (8×7.5 degrees) from the time T0 to the time T8, the first permanent magnet south pole (SO1) has rotated to the position originally occupied by the first permanent magnet north pole (NO1) at the time T0; however, the currents through each of the conductors A1, L2, B1, M2, N1, Y2, O1 and Z2 proximate to the first permanent magnet south pole (SO1) at the time T8 now have currents flowing from the respective rear ends to the respective front ends of the conductors to now provide a magnetic north pole that attracts the permanent magnet south pole.

The clockwise timing diagram of FIGS. 48A and 48B further shows the voltages applied to each of the 24 terminals during the times T9 through T47 corresponding to the remaining 300 degrees of rotation of the rotor 130 with respect to the stator structure 400. The switching of the voltage levels and thus the currents flowing through a respective set of six conductors for every 15 degrees of rotation of the rotor creates a rotating magnetic field that the permanent magnets of the rotor follow. The rate at which the voltages are switched determines the rotational velocity of the rotor in the clockwise direction.

The clockwise timing diagram of FIGS. 48A and 48B include hatching to show the relative movement of the first permanent magnet north pole (NO1) with respect to the stator windings. As illustrated in FIGS. 48A and 48B, as the time increases from T0 through T47, the shaded entries move upward in the timing diagrams, which corresponds to the leftward movement of the first permanent magnet north pole (NO1) in FIGS. 50A-50I.

Figure 51A:
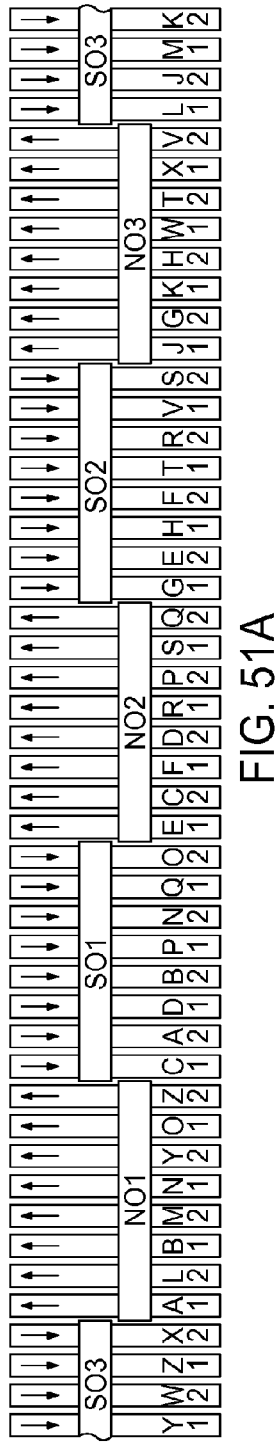
FIGS. 51A-51I pictorially illustrate the movement of the poles of the rotor assembly with respect to the stator conductors as the directions of the currents flowing through the conductors are changed in accordance with the counterclockwise timing diagram of FIGS. 49A and 49B.
Figure 51B:
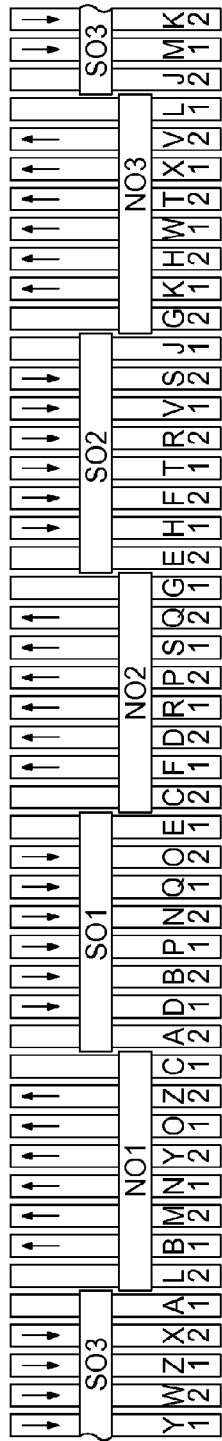
Figure 51C:
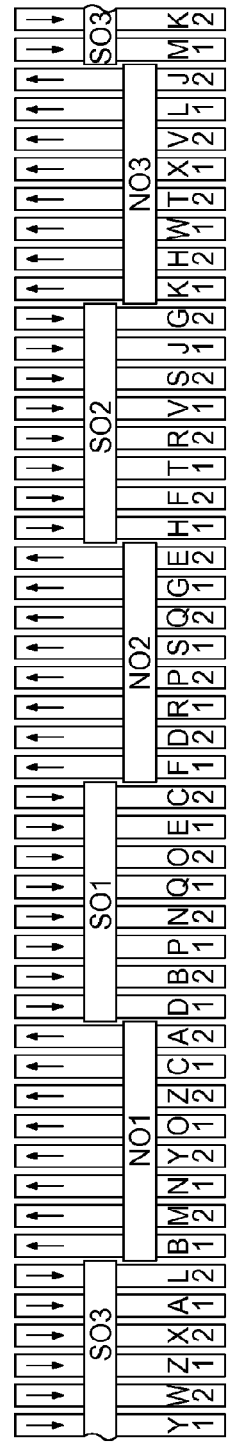
Figure 51D:
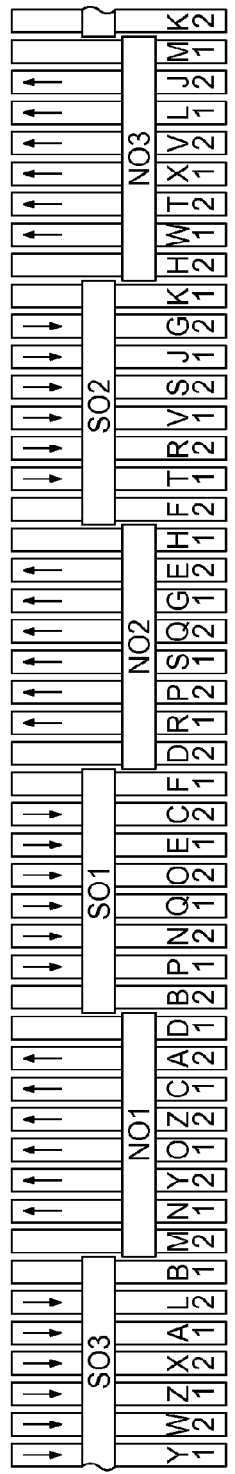
Figure 51E:
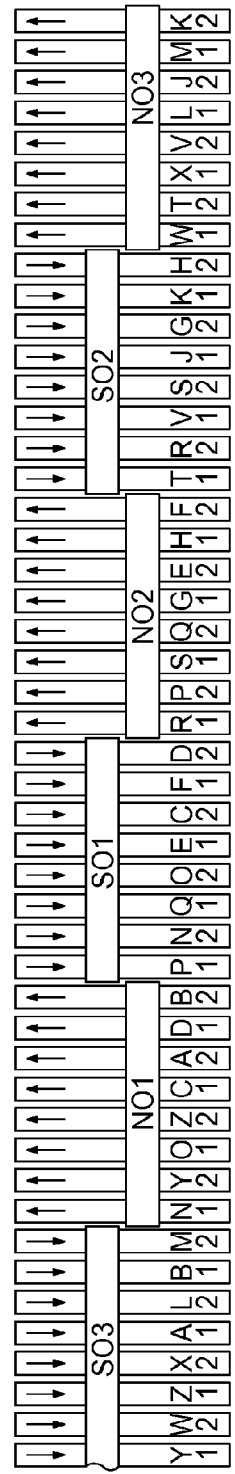
Figure 51F:
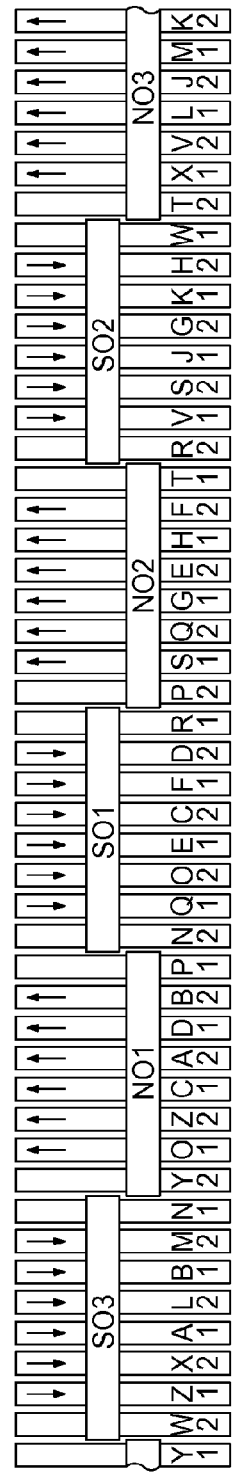
Figure 51G:
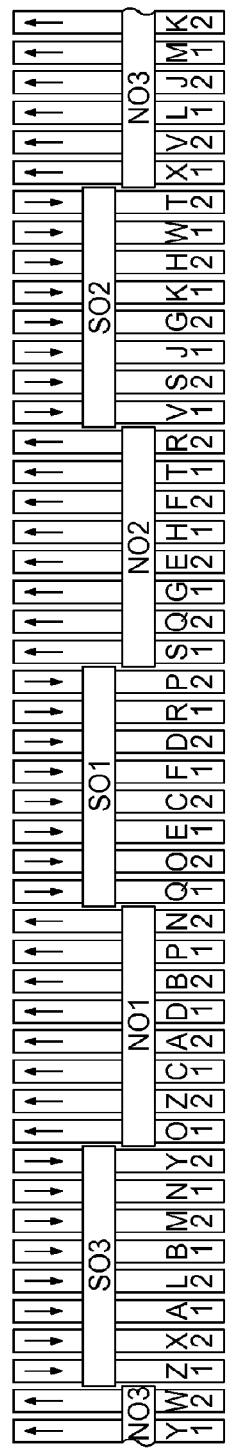
Figure 51H:
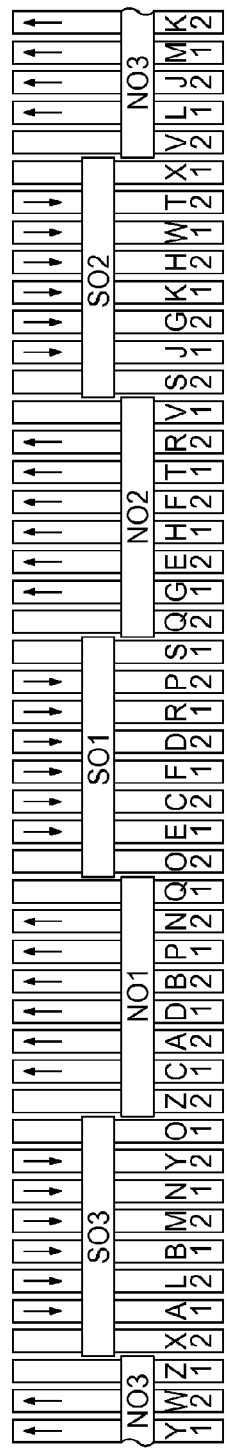
Figure 51I:
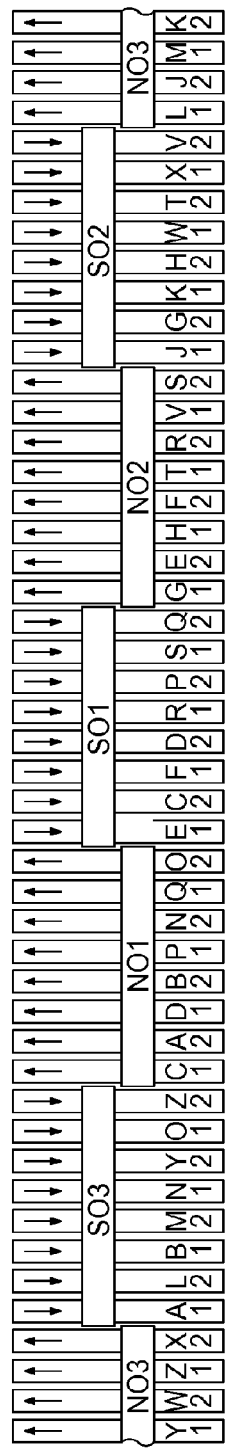

The counterclockwise timing diagram of FIGS. 49A and 49B shows the voltages applied to the 24 terminals during each of the 48 7.5-degree rotational segments. The operation of the magnetic fields generated by the stator structure 400 and the effect on the rotation of the rotor 130 can be understood in view of the foregoing detailed description of the clockwise rotation. The counterclockwise rotation shown in FIGS. 51A-51I is basically caused by switching the four groups of six conductors in a sequence opposite the sequence described above. In particular, starting at an initial condition at the time T0 in FIGS. 49A and 49B that corresponds to the initial condition at the time T0 in FIGS. 48A and 48B and with the rotor poles starting in the positions shown in FIG. 51A, the conductors are switched in the following sequence during the times T1 through T8:

T1: the terminals A, C, E, G, J and L are switched to 0, and the rotor poles are moved to the positions shown in FIG. 51B;

T2: the terminals A, E and J are switched to low (L), and the terminals C, G and L are switched to high (H), and the rotor poles are moved to the positions shown in FIG. 51C;

T3: the terminals B, D, F, H, K and M are switched to 0, and the rotor poles are moved to the positions shown in FIG. 51D;

T4: the terminals B, F and K are switched to low (L), and the terminals D, H and M are switched to high (H), and the rotor poles are moved to the positions shown in FIG. 51E;

T5: the terminals N, P, R, T, W and Y are switched to 0, and the rotor poles are moved to the positions shown in FIG. 51F;

T6: the terminals N, R and W are switched to high (H), and the terminals P, T and Y are switched to low (L), and the rotor poles are moved to the positions shown in FIG. 51G);

T7: the terminals O, Q, S, V, X and Z are switched to 0, and the rotor poles are moved to the positions shown in FIG. 51H;

T8: the terminals O, S and X are switched to high (H), and the terminals Q, V and Z are switched to low (L), and the rotor poles are moved to the positions shown in FIG. 51I.

The clockwise timing diagram of FIGS. 49A and 49B include hatching to show the relative movement of the first permanent magnet north pole (NO1) with respect to the stator windings. As illustrated in FIGS. 49A and 49B, as the time increases from T0 through T47, the shaded entries move downward in the timing diagrams, which corresponds to the rightward movement of the first permanent magnet north pole (NO1) in FIGS. 51A-51I.

As illustrated by the timing diagrams in FIGS. 48A and 48B and FIGS. 49A and 49B, each conductor is shut off for one time slot out of every 8 time slots. Accordingly, current is flowing through each conductor approximately 87.5 percent of the time that the motor is operating. In contrast, each winding in a typical three-phase motor is shut off for approximately one-third of the time with a resulting 66.67 percent utilization of each conductor.

Figure 52:
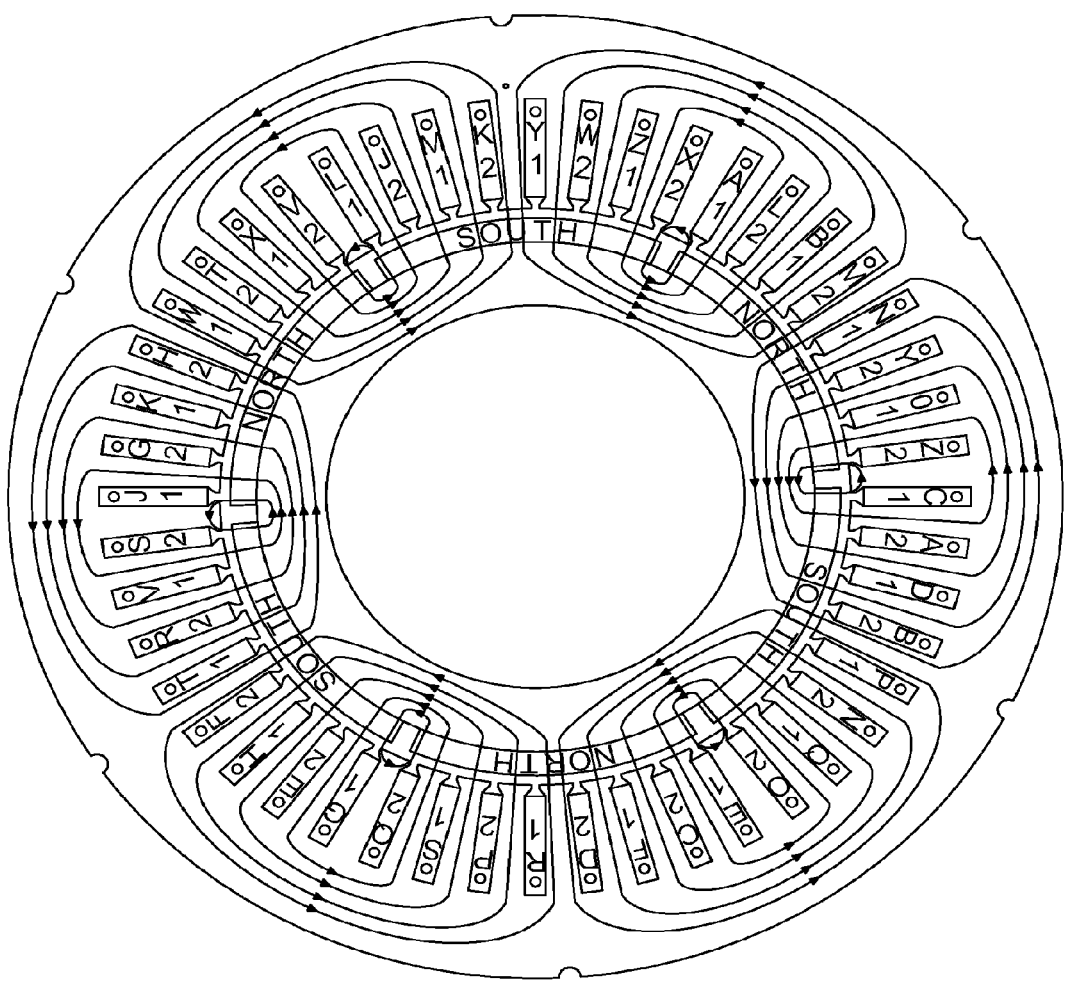
FIG. 52 illustrates an elevational view of the stator laminate and the conductors identified in accordance with FIG. 14, with the poles of the rotor assembly shown pictorially in concentric relationship with the stator laminate in accordance with the position shown in FIG. 50A, the figure further including a pictorial representation of the magnetic flux paths between the stator poles and the rotor poles.

The flux paths through the rotor 130 and the stator structure 400 are illustrated in FIG. 52 for the position of the rotor corresponding to FIGS. 50A and 51A. The illustrated flux paths rotate 7.5 degrees in the clockwise direction for each 7.5 degrees that the rotor rotates in the clockwise direction. Similarly, the flux paths rotate 7.5 degrees in the counterclockwise direction for each 7.5 degrees that the rotor rotates in the counterclockwise direction.

Figure 53:
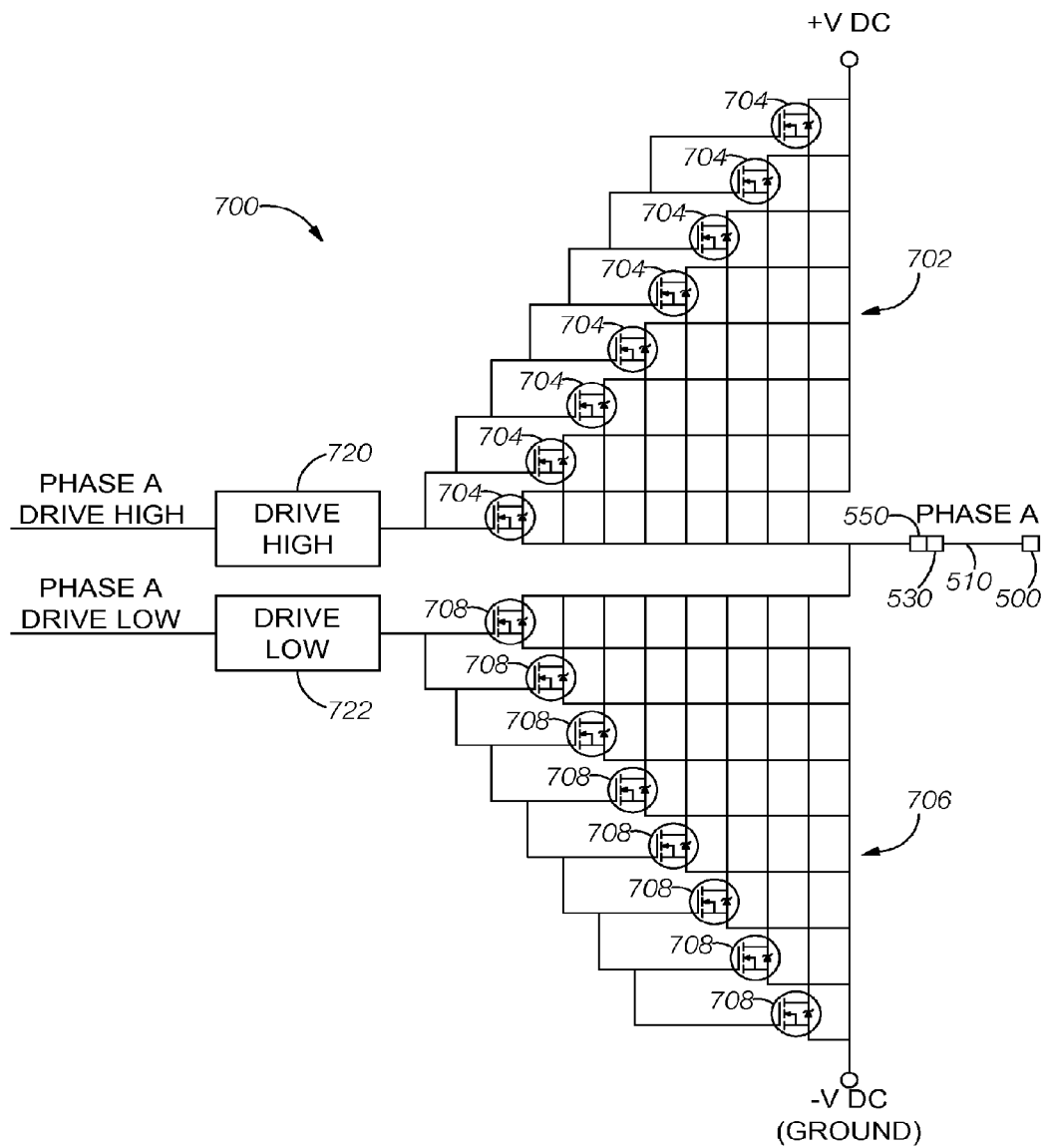
FIG. 53 illustrates a simplified schematic diagram of a driver circuit for one of the 24 phases of the stator of the motor.

FIG. 53 illustrates an exemplary drive circuit 700 for one of the 24 phases (e.g., phase A). The drive circuit comprises high current drive transistors configured in a push-pull configuration with an upper set 702 of transistors 704 connected to a relatively positive DC voltage (e.g., 50 volts) and a lower set 706 of transistors 708 connected to a relatively negative DC voltage (e.g., a ground reference).

In the illustrated embodiment, each upper transistor 704 comprises an IRFP4368PbF power metal-oxide semiconductor field effect transistor (MOSFET) that is advantageously provided in a conventional TO247 three-lead package, or an equivalent. For example, the IRFP4368PbF MOSFET is commercially available from International Rectifier of El Segundo, Calif. Each transistor has a very low on-resistance (e.g., less than approximately 2 milliohms. Each transistor is capable of conducting a current of at least 195 amperes.

Figure 54A:
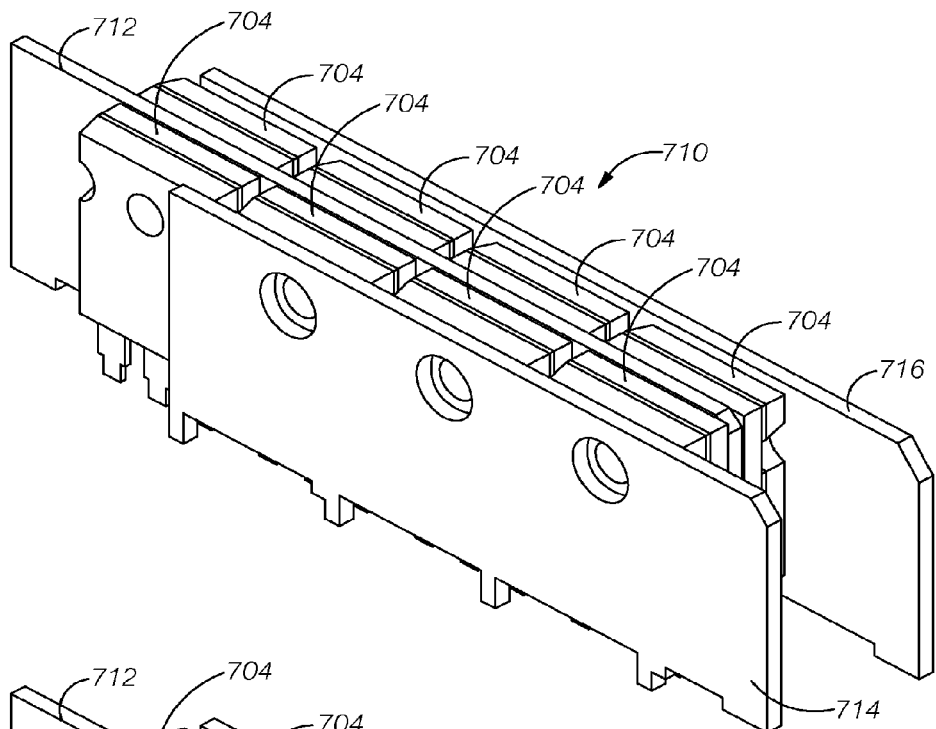
FIG. 54A illustrates a perspective view of the transistor array of the driver circuit of FIG. 53, including the heat sinks thermally coupled to the eight transistors in the array.
Figure 54B:
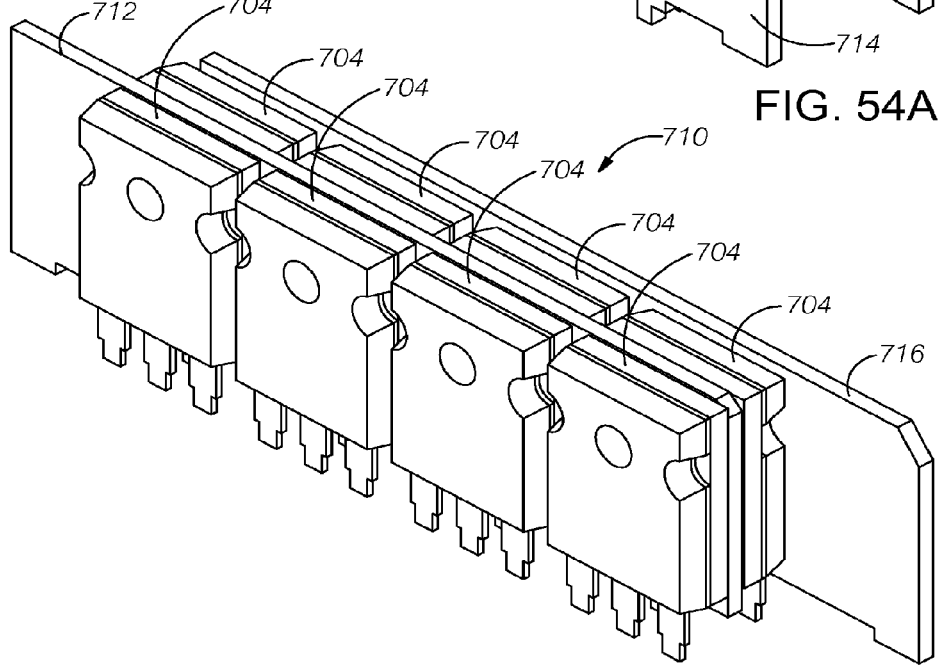
FIG. 54B illustrates the perspective view of the transistor array of FIG. 54A with one of the heat sinks removed to show four of the eight transistors in the array.

As illustrated in FIGS. 54A and 54B for one of the sets 702 of upper transistors, the eight transistors are mechanically interconnected in a module 710 that comprises two rows of four upper transistors 704. A middle heat sink 712 is interposed between the two rows of transistors. A first outside heat sink 714 is mounted on the outside of one row of transistors. The first outside heat sink is removed in FIG. 54B to show the arrangement of one of the two rows of transistors. A second outside heat sink 716 is mounted on the outside of the other row of transistors. When mounted to the respective drive board, the printed circuit pattern (not shown) on the drive board interconnects the transistors in the module such that all of the gates, sources and drains are connected in parallel to provide the effect of a single transistor with approximately eight times the current conducting capability. For example, as shown in FIG. 53, the commonly connected drains of the upper transistors are connected to the positive DC voltage. In the illustrated embodiment, the middle heat sink is also an electrical contact to the rear surfaces of the respective transistors mounted on either side of the middle heat sink. The rear surfaces of the transistors are electrically connected to the drains of the transistors. The printed circuit board on which the module is mounted is configured so that the middle heat sink is connected to the positive DC voltage source such that the current from the positive DC voltage source flows through the middle heat sink to the drains of the transistors. The two outside heat sinks are electrically connected via the circuit board to the respective sources of the transistors and are also connected to a respective one of the common output terminals 550 (FIGS. 22 and 23). The use of the heat sinks as conductive paths provides lower-resistance, higher-conductivity paths to the interconnection terminals and to the voltage source rather than having to increase the sizes of the printed circuit wiring.

Each of the lower transistors 708 also comprises an IRFP4968PbF MOSFET. The eight lower transistors are mounted and interconnected in a module 710 in a similar manner to the upper transistors 704, and are mounted to a set of heat sinks in the same manner as the upper transistors as illustrated in FIGS. 54A and 54B described above. Thus, the drains are connected together by the middle heat sink 712 and the sources are connected together by the two outside heat sinks 714, 716, as described above. In contrast to the wiring for the upper transistors, the printed circuit board is configured so that the commonly connected sources of the lower transistors are electrically connected to the negative DC voltage (e.g., ground) via the outside heat sinks 714, 716, and the commonly connected drains are electrically connected to the respective common output terminal 550.

The common output terminal 550 which is connected to the set 702 of upper transistors 704 and to the set 706 of upper transistors 708 receives the interconnection terminal 530 on the respective power wire 510, which is connected to the respective conductor engagement connector 500 for the respective phase (e.g., phase A).

The commonly connected gates in the upper transistors 702 are connected to the output of a upper drive circuit ("DRIVE HIGH") 720, which is driven by a first phase control drive signal (e.g., "phase A drive high" in FIG. 53). The commonly connected gates in the lower transistors 706 are connected to the output of a lower drive circuit ("DRIVE LOW") 722, which is driven by a second phase control drive signal (e.g., "phase A drive low"). The upper and lower drive circuits operate in a conventional manner to provide the appropriate drive voltages to the gates of the transistors to selectively turn the respective transistors on and off.

When the first phase control drive signal is active, the upper drive circuit activates the upper transistors to connect the common output terminal 730 to the relatively positive DC voltage to pull the respective phase (e.g., phase A) to a high voltage level to provide current through the eight transistors and through the respective conductors (e.g., the conductors A1 and A2) to the respective wye-connection (e.g., to WYE1).

When the second phase control drive signal is activated, the lower drive circuit 722 activates the lower transistors 706 to connect the common output terminal 730 to the relatively negative DC voltage (e.g., ground) to pull the respective phase to a low voltage level to sink current through the eight lower transistors from the respective conductors (e.g., the conductors A1 and A2) and from the respective wye-connection (e.g., to WYE1).

When neither the first phase control drive signal nor the second phase control drive signal is active, neither the upper transistors 704 nor the lower transistors 708 are activated. Accordingly, the common output terminal 730 is connected to neither voltage source and floats, and no current flows in either direction through the respective conductors (e.g., the conductors A1 and A2) of the phase, as illustrated, for example, in FIG. 50H.

The illustrated drive circuit 700 and the other 23 drive circuits connected to the other phases are activated in accordance with the timing diagrams of FIGS. 48A and 48B to drive the rotor in the clockwise direction as illustrated in FIGS. 50A-50I. Alternatively, the 24 drive circuits are activated in accordance with the timing diagrams of FIGS. 49A and 49B to drive the rotor in the counterclockwise direction as illustrated in FIGS. 51A-51I.

Although described above using MOSFETs, the drive circuits can also be implemented using insulated gate bipolar transistors (IGBTs). Designs of such drive circuits are well known and are not described in detail herein. It should be further understood that other components, such as diodes, capacitors and resistors that may be required for a complete design are not shown in the drive circuit of FIG. 53.

Figures 55, 55A:
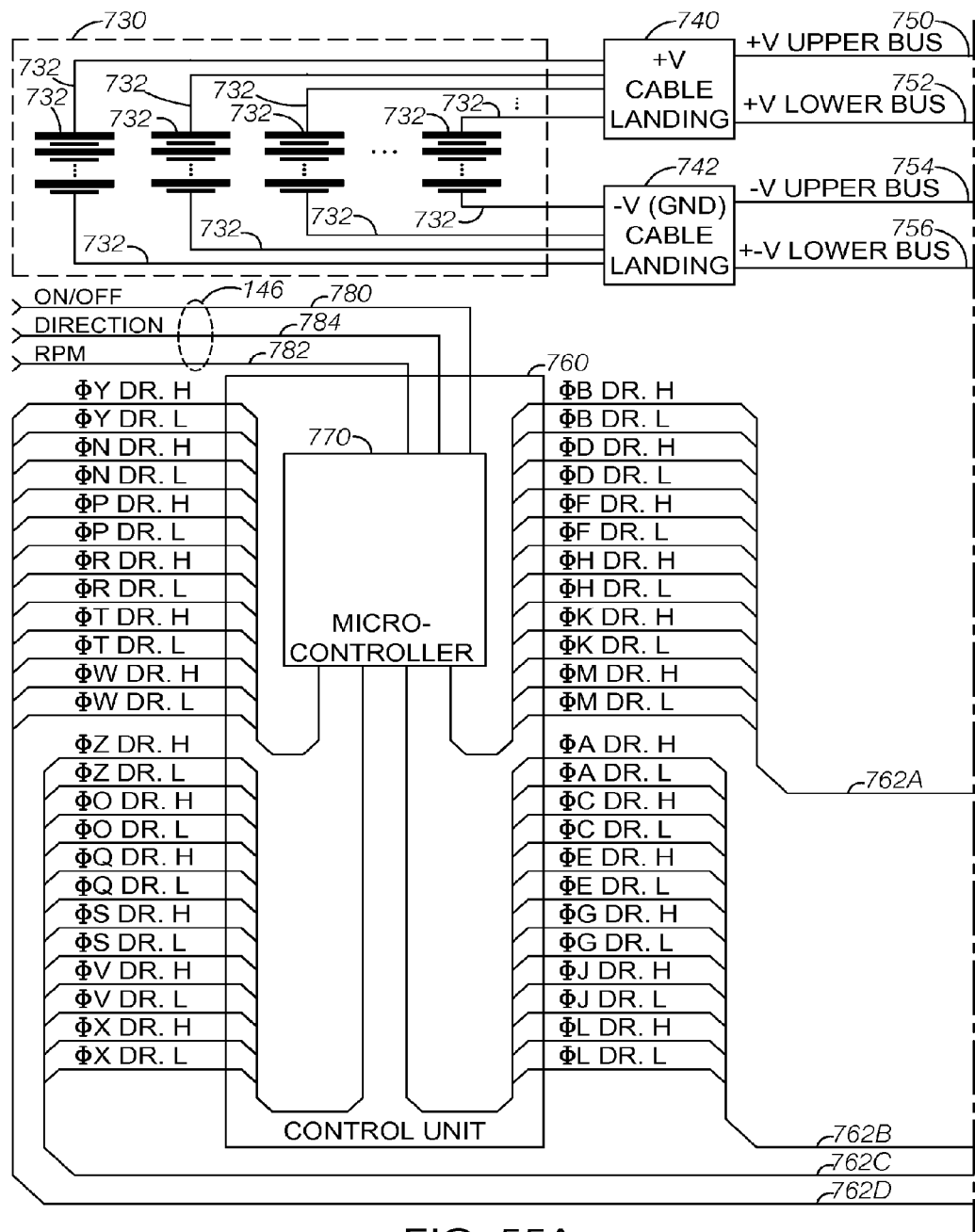
FIG. 55 (comprising FIGS. 55A, 55B and 55C) illustrates a simplified block diagram of the motor control circuit that drives the driver circuits for the 24 phases of the stator structure.

One drive circuit 700 is provided for each of the 24 phases with the voltage and current from each drive circuit being provided by a respective one of the output terminals 550 shown in FIGS. 19 and 20. As shown in FIG. 55 (comprising FIGS. 55A, 55B and 55C), the 24 drive circuits on the four motor drive boards 540, 542, 544, 546 (see FIGS. 22 and 23) are connected to a source of DC power (e.g., a bank 730 of batteries 732 shown in FIG. 55A). Although each battery in the bank is illustrated as a single battery, it should be understood that each battery advantageously comprises a plurality of series connected batteries to provide a selected voltage. For example, in a preferred embodiment, each battery represents eight six-volt batteries connected in series to provide a nominal 48 volts across the eight batteries. The nominal 48 volts will generally be around 56 volts when the batteries are fully charged and will decrease to about 48 volts when the batteries are nearly discharged. In view of impedance losses in the batteries, the cables and the like, each eight-unit battery can be considered to be a 50-volt battery. In the following description, "each battery" refers to the eight six-volt batteries connected in series or to other combinations of series connected batteries (e.g., four 12-volt batteries) that provide a nominal voltage of around 50 volts.

Figure 55B:
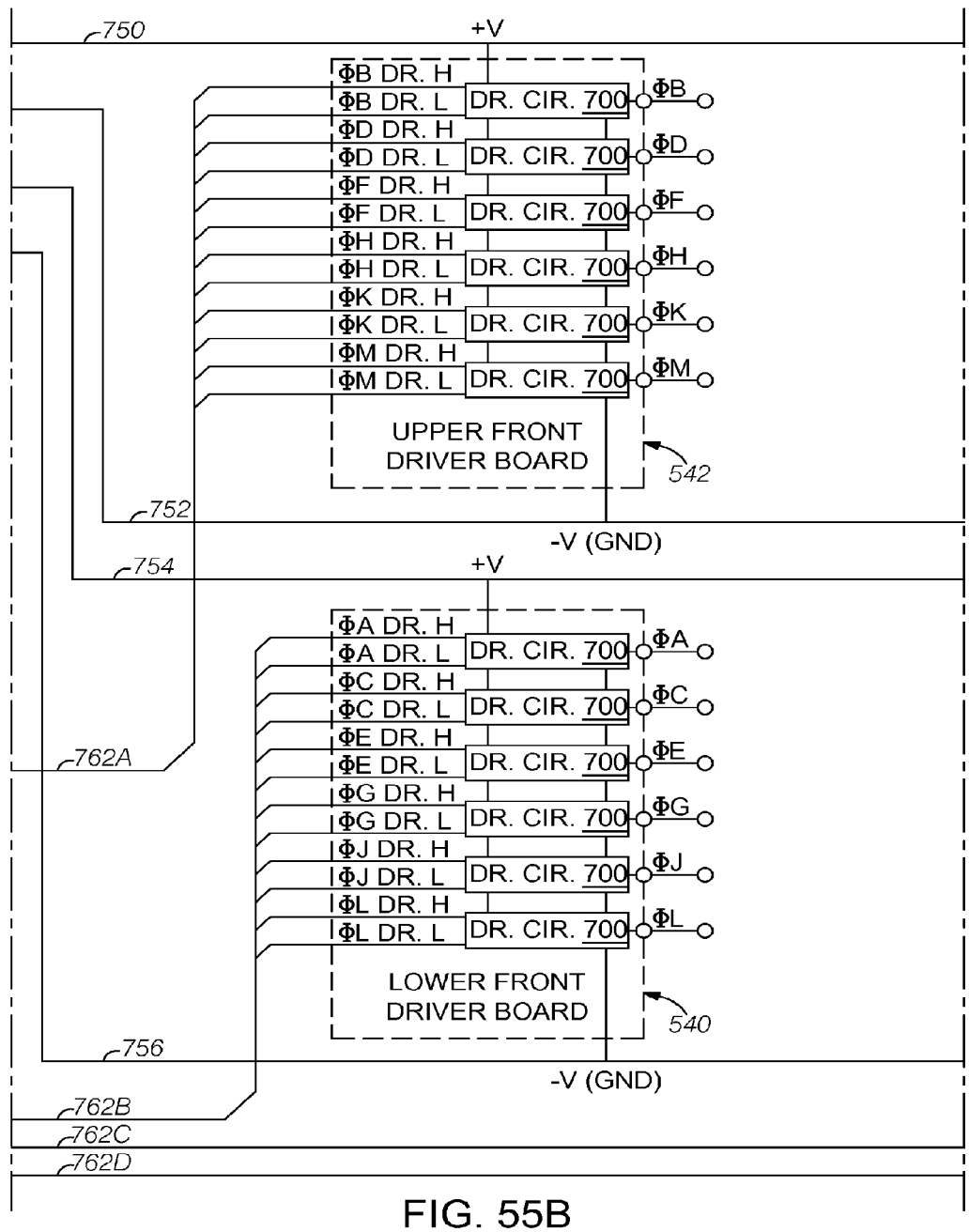
Figure 55C:
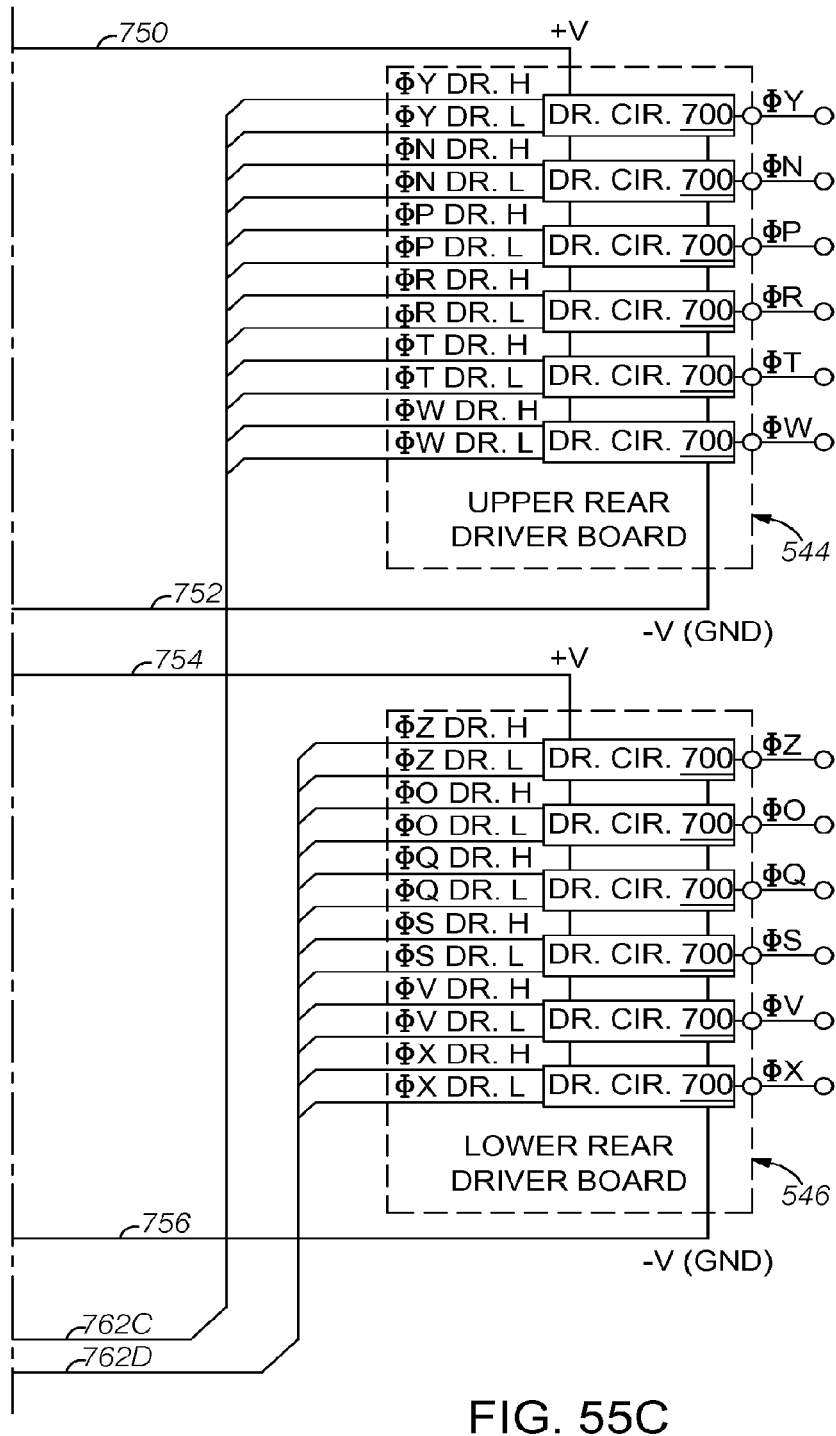

As illustrated, a respective positive voltage cable 734 is provided from the respective positive terminal of each battery in the bank of batteries, and a respective negative voltage cable 736 is provided from the respective negative terminal of each battery. The positive cables are all terminated in a +V cable landing 740 (also illustrated in FIG. 22); and the negative cables are all terminated in a −V (GND) cable landing 742 (also illustrated in FIG. 23). The +V cable landing is electrically coupled to a +V upper bus 750 and to a +V lower bus 752 (also illustrated in FIG. 22). The −V (GND) cable landing is electrically coupled to a −V upper bus 754 and to a −V lower bus 756 (also illustrated in FIG. 23). Accordingly, the currents provided by the batteries are consolidated at the cable landings before distribution to the drive circuits (as shown in FIGS. 55B and 55C). The currents flowing through each of the cables from the batteries is much less than if the current were conducted by a single cable for each polarity.

As further shown in FIGS. 55A-55C, the drive circuits are controlled by respective output control lines 762 (labeled as 762A, 762B, 762C and 762D) from a control unit 760. The control unit includes a microcontroller 770 and other circuitry (not shown) that is responsive to a power on/off input 780, a speed control input 782 and a direction control input 784 received via a control connector 146 (also shown in FIG. 22). The power on/off input and the direction control input are advantageously logic signals having a respective active state and a respective inactive state responsive to switches, levers or other manually operated devices or responsive to inputs via an electronic control panel, such as, for example, a touch screen. The speed control input is advantageously a digital signal generated by a speed selector, such as a lever, or such as an input to an electronic control panel. The speed control input may also be an analog input from a speed selector, and the microprocessor may include an analog-to-digital converter to convert the speed control input to a digital value.

The control unit is responsive to the control inputs to selectively generate a timed sequence of control signals ("PHASE A DRIVE HIGH", "PHASE A DRIVE LOW", . . . , "PHASE Z DRIVE HIGH", PHASE Z DRIVE LOW" identified as "φA DR. H", φA DR. L", φB DR. H", φB DR. L", etc. in FIGS. 55A-55C) to the 24 drive circuits to generate the timing signals shown in FIGS. 48A and 48B or FIGS. 49A and 49B to drive the motor at a selected rotational speed in either the clockwise direction or the counterclockwise direction.

The foregoing description of a multi-phase, permanent magnet brushless DC electric motor illustrates a high-power motor that operates at a sufficiently low voltage (e.g., around 50 volts DC) that the motor can be safely used to propel watercraft. By using multiple phases and by mirroring the phases from each end of the motor, the motor is sufficiently compact in both size and mass to enable the motor to fit into a conventional pleasure boat. In particular, the mirrored phases allow the wiring for 24 phases to be provided to 12 phases at one end of the motor and 12 phases at the other end of the motor, with each group of 12 phases being connected to a respective wye-connection. Although provided as two 12-phase configurations, the conductors for each of 24 phases extend for the full length of the stator structure. The two sets of phases operate together to drive a single six-pole rotor that also extends for the full length of the stator structure. The rotor comprises a central shaft that supports a hollow cylindrical rotor core, which has a plurality of ferrite ceramic magnets mounted the outside surface of the rotor core. The rotor configuration provides the benefits of a large diameter rotor without the mass that would result from the use of a solid rotor core. The current required to provide high horsepower at a relatively low voltage (e.g., 50 volts) is divided equally among the 24 phases so that the sizes of the wiring to the phases and the heating losses are minimized.

As various changes could be made in the above constructions without departing from the scope of the invention, it is intended that all the matter contained in the above description or shown in the accompanying drawings shall be interpreted as illustrative and not in a limiting sense.

What is claimed is:

1. An electric motor, comprising:
   a rotor comprising a plurality of permanent magnets organized as alternating poles of opposite polarities;
   a stator surrounding the rotor, the stator comprising a plurality of conductors positioned in a respective plurality of slots extending from a first end to a second end of the stator, a first set of conductors electrically connected as a first wye-connected circuit and a second set of conductors electrically connected as a second wye connected circuit, the conductors in the first wye-connected circuit receiving power from terminals at the first end of the stator and the conductors in the second wye-connected circuit receiving power from terminals at the second end of the stator, the conductors positioned in the slots with selected subsets of the conductors in the first set of conductors interleaved with selected subsets of the conductors in the second set of conductors; and
   a drive circuit that provides electrical currents to the conductors of the first and second wye-connected circuits, the drive circuit controlling the direction of flow and the timing of the currents in the conductors such that at any time the conductors of the first and second wye-connected circuits produce a plurality of stator poles, each stator pole produced by currents flowing through equal numbers of conductors in the first wye-connected circuit and conductors in the second wye-connected circuit.

2. The electric motor as defined in claim 1, wherein the first set of conductors comprises 24 conductors connected in a 12-phase wye configuration with a respective first conductor and a respective second conductor connected in series in each phase, the first conductor and the second conductor in each phase interconnected at the second end of the stator such that when current flows in the first conductor from the first end toward the second end, current flows in the second conductor from the second end toward the first end, the first conductor and the second conductor in each phase spaced apart by a pole distance such that when current flowing in the first conductor contributes to a magnetic polarity in a first direction, the current flowing in the second conductor contributes to a magnetic polarity in a second direction opposite the first direction.

3. The electric motor as defined in claim 2, wherein the second set of conductors comprises 24 conductors connected in a 12-phase wye configuration with a respective first conductor and a respective second conductor connected in series in each phase, the first conductor and the second conductor in each phase interconnected at the first end of the stator such that when current flows in the first conductor from the second end toward the first end, current flows in the second conductor from the first end toward the second end, the first conductor and the second conductor in each phase spaced apart by a pole distance such that when current flowing in the first conductor contributes to a magnetic polarity in a first direction, the current flowing in the second conductor contributes to a magnetic polarity in a second direction opposite the first direction.

4. The electric motor as defined in claim 1, wherein:
   the first wye-connected circuit comprises:
      a first set of conductors comprising 24 conductors, each conductor in the first set of conductors having a first end proximate to the first end of the stator and having a second end proximate to the second end of the stator, the first set of conductors comprising 12 pairs of conductors, each pair of conductors comprising a first conductor and a second conductor;
      a first set of 12 input terminals, each input terminal electrically connected to a respective first end of a respective first conductor in a respective pair of conductors in the first set of conductors;
      a set of 12 interconnection jumpers, each interconnection jumper electrically connecting a respective second end of a respective first conductor to a respective second end of a respective second conductor in a respective pair of conductors in the first set of conductors; and
      a first common node electrically connecting the respective second ends of the 12 second conductors in the pairs of conductors in the first set of conductors;
   the second wye-connected circuit comprises:
      a second set of conductors comprising 24 conductors, each conductor in the second set of conductors having a first end proximate to the first end of the stator and having a second end proximate to the second end of the stator, the first set of conductors comprising 12 pairs of conductors, each pair of conductors comprising a first conductor and a second conductor;
      a second set of 12 input terminals, each input terminal electrically connected to a respective second end of a respective first conductor in a respective pair of conductors in the second set of conductors;
      a set of 12 interconnection jumpers, each interconnection jumper electrically connecting a respective first end of a respective first conductor to a respective first end of a respective second conductor in a pair of conductors in the second set of conductors; and
      a second common node electrically connecting the respective second ends of the second conductors in the pairs of conductors in the second set of conductors; and
   the first set of conductors and the second set of conductors are positioned in the slots of the stators such that a group of 8 adjacent conductors comprises 4 conductors from the first set of conductors and 4 conductors from the second set of conductors, and such that the respective second conductor in a respective pair of conductors is spaced apart from the respective first conductor in the respective pair of conductors by at least 8 intervening conductor locations.

5. An electric motor, comprising:
   an enclosure having a first end and a second end;
   a rotor having a plurality of permanent magnet poles, the rotor rotating about a longitudinal axis that extends between the first end and the second end of the enclosure, the rotor having an outer diameter; and
   a stator structure surrounding the rotor, the stator structure having a first end nearer the first end of the enclosure and having a second end nearer the second end of the enclosure, the stator structure comprising a first wye circuit configuration and a second wye circuit configuration, wherein:
      the first wye circuit configuration comprises:
         a first set of stator conductor pairs, each conductor pair comprising a respective first conductor and a respective second conductor, each conductor having a respective first end proximate the first end of the stator structure and having a respective second end proximate the second end of the stator structure;
         a first set of input terminals, each input terminal in the first set of input terminals electrically connected to a respective first end of the respective first conductor of one of the conductor pairs;

a first set of interconnection jumpers located proximate the second end of the stator structure, each interconnection jumper electrically connecting the second end of the first conductor and the second end of the second conductor in a respective conductor pair; and a first common node jumper, the first common node jumper electrically connecting the first ends of the second conductors in the first stator conductor pairs;

the second wye circuit configuration comprises:

a second set of stator conductor pairs, each conductor pair comprising a respective first conductor and a respective second conductor, each conductor having a respective first end proximate the first end of the stator structure and having a respective second end proximate the second end of the stator structure;

a second set of input terminals, each input terminal in the second set of input terminals electrically connected to a respective second end of the respective first conductor of one of the conductor pairs;

a second set of interconnection jumpers located proximate the first end of the stator structure, each interconnection jumper electrically connecting the first end of the first conductor and the first end of the second conductor in a respective conductor pair; and a second common node jumper, the second common node jumper electrically connecting the second ends of the second conductors in the second set of stator conductor pairs; and the stator structure comprises a cylindrical stator laminate, the stator laminate comprising:

an inner cylindrical surface, an outer surface and a wall thickness between the inner surface and the outer surface, the inner surface having a diameter greater than the outer diameter of the rotor; and a plurality of slots extending from the inner surface toward the outer surface for a distance less than the wall thickness, each slot receiving a respective one of the conductors in the first set of stator conductor pairs and the second set of stator conductor pairs, the first and second sets of stator conductor pairs positioned in the slots such that the second conductor in a conductor pair is spaced apart from the first conductor in a conductor pair by slots having conductors from other conductor pairs.

6. An electric motor, comprising;

an enclosure;

a stator structure positioned within the enclosure, the stator structure having a central longitudinal axis, the stator structure comprising:

a generally cylindrical stator laminate having an inner surface and an outer surface, the inner surface centered about the central longitudinal axis, the stator laminate having a thickness between the inner surface and the outer surface, the stator laminate having a first end and a second end;

a plurality of slots extending longitudinally from the first end to the second end of the stator laminate, each slot extending from the inner surface toward the outer surface along a radial line from the central longitudinal axis, each slot having a radial length less than the thickness of the stator laminate;

a respective conductor positioned in each slot and extending longitudinally from at least the first end to at least the second end of the stator laminate, each conductor having dimensions selected to fit tightly within the respective slot, each conductor having a respective front end and a respective rear end; and a plurality of power supply wires and interconnection jumpers connected to the front ends and the rear ends of the conductors, the power supply wires and interconnection jumpers configured as a first multiple-phase circuit and a second multiple phase circuit, each multiple phase circuit interconnected in a wye-configuration, the configuration of the second multiple phase circuit being a rotated mirror of the configuration of the first multiple phase circuit such that a corresponding number of power supply wires and interconnection jumpers are connected to the first ends of the conductors and to the second ends of the conductors;

a rotor within the stator structure, the rotor comprising:

a central shaft aligned with the central longitudinal axis;

a cylindrical rotor yoke concentric to the central shaft, the rotor yoke having a first end, a second end and an outer surface, the rotor yoke coupled to the central shaft by a first end support and a second end support; and a plurality of permanent magnets mounted to the outer surface of the rotor yoke and arranged with magnetic poles oriented radially with respect to the central shaft, selected ones of the permanent magnets positioned with respective magnetic north poles oriented outwardly away from the central shaft and selected others of the permanent magnets positioned with respective magnetic north poles oriented inwardly toward the central shaft, the selected ones and selected others of the permanent magnets configured to provide a plurality of alternating north and south poles around the outer surface of the rotor yoke.

\* \* \* \* \*